US006570975B2

(12) United States Patent
Shaffer et al.

(10) Patent No.: US 6,570,975 B2
(45) Date of Patent: *May 27, 2003

(54) AUTOMATED TELECOMMUNICATIONS CALL PROCESSING METHOD

(75) Inventors: James D. Shaffer, Rancho Santa Fe, CA (US); George G. Moore, Great Falls, VA (US)

(73) Assignee: Murex Securities, Ltd., Douglas (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/053,290

(22) Filed: Jan. 18, 2002

(65) Prior Publication Data

US 2002/0076029 A1 Jun. 20, 2002

Related U.S. Application Data

(63) Continuation of application No. 09/100,567, filed on Jun. 19, 1998, now Pat. No. 6,385,312, which is a continuation-in-part of application No. 08/659,318, filed on Jun. 6, 1996, now Pat. No. 5,982,868, which is a continuation-in-part of application No. 08/598,392, filed on Feb. 8, 1996, now Pat. No. 5,848,131, which is a continuation-in-part of application No. 08/365,325, filed on Dec. 28, 1994, now Pat. No. 5,506,897, which is a continuation of application No. 08/020,653, filed on Feb. 22, 1993, now abandoned.

(51) Int. Cl.[7] ............................................... H04M 7/00
(52) U.S. Cl. ................................................ 379/220.01
(58) Field of Search ..................... 379/220.01, 201.02, 379/912, 127.01, 142.01, 202.01, 207.01, 265.01, 221.01, 230

(56) References Cited

U.S. PATENT DOCUMENTS 1,737,520 A   11/1929   Richardson
2,455,209 A   11/1948   Anderson
2,455,210 A   11/1948   Anderson
3,614,328 A   10/1971   McNaughton et al.
3,928,724 A   12/1975   Byram et al.

(List continued on next page.)

FOREIGN PATENT DOCUMENTS

EP   0 498 594 A2   8/1992
JP   03070075 JP A1   3/1991

(List continued on next page.)

OTHER PUBLICATIONS

Order in *Murex Securities Limited and Murex Licensing Corporation v. Vicinity Corporation and Pizza Hut*, U.S. District Court for the Eastern District of Virginia, Civil Action No. 01–1895–A, May 9, 2002.

(List continued on next page.)

*Primary Examiner*—Creighton Smith
(74) *Attorney, Agent, or Firm*—Knobbe Martens Olson & Bear LLP

(57) ABSTRACT

A system and method for automatically and seamlessly routing telephone calls across a telephone network. The system includes a telephone switch having a computer, a master file and client file stored in the computer, and means to dynamically link the master file with the client file at routing time to produce a selected client telephone number and transmit the number across the telephone network. The system utilizes Automatic Number Identification to identify the calling party. The master file has a plurality of records having a calling telephone number field and a spatial key field and is updated very frequently. The client file has a plurality of records having a spatial key field and a client telephone number. Methods of generating the client files for three client service area definitions are included in the present invention.

71 Claims, 25 Drawing Sheets

U.S. PATENT DOCUMENTS

| | | |
|---|---|---|
| 3,968,573 A | 7/1976 | Poliniere |
| 4,139,739 A | 2/1979 | von Meister et al. |
| 4,164,025 A | 8/1979 | Dubnowski et al. |
| 4,178,476 A | 12/1979 | Frost |
| 4,191,860 A | 3/1980 | Weber |
| 4,310,727 A | 1/1982 | Lawser |
| 4,311,876 A | 1/1982 | Endo et al. |
| 4,313,035 A | 1/1982 | Jordan et al. |
| 4,341,929 A | 7/1982 | Alexander et al. |
| 4,484,192 A | 11/1984 | Seitz et al. |
| 4,577,062 A | 3/1986 | Hilleary et al. |
| 4,608,460 A | 8/1986 | Carter et al. |
| 4,611,094 A | 9/1986 | Asmuth et al. |
| 4,645,873 A | 2/1987 | Chomet |
| 4,672,660 A | 6/1987 | Curtin |
| 4,737,916 A | 4/1988 | Ogawa et al. |
| 4,737,927 A | 4/1988 | Hanabusa et al. |
| 4,737,983 A | 4/1988 | Frauenthal et al. |
| 4,744,033 A | 5/1988 | Ogawa et al. |
| 4,757,267 A | 7/1988 | Riskin |
| 4,757,267 A | 7/1988 | Riskin |
| 4,760,531 A | 7/1988 | Yasui et al. |
| 4,761,742 A | 8/1988 | Hanabusa et al. |
| 4,766,555 A | 8/1988 | Bennett |
| 4,782,509 A | 11/1988 | Shepard |
| 4,788,643 A | 11/1988 | Trippe et al. |
| 4,797,818 A | 1/1989 | Cotter |
| 4,805,119 A | 2/1989 | Maeda et al. |
| 4,817,043 A | 3/1989 | Brown |
| 4,843,569 A | 6/1989 | Sawada et al. |
| 4,870,576 A | 9/1989 | Tornetta |
| 4,873,513 A | 10/1989 | Soults et al. |
| 4,924,510 A | 5/1990 | Le |
| 4,937,572 A | 6/1990 | Yamada et al. |
| 4,942,599 A | 7/1990 | Gordon et al. |
| 4,951,212 A | 8/1990 | Kurihara et al. |
| 4,953,204 A | 8/1990 | Cuschleg, Jr. et al. |
| 4,954,958 A | 9/1990 | Savage et al. |
| 4,974,170 A | 11/1990 | Bouve et al. |
| 4,987,587 A | 1/1991 | Jolissaint |
| 5,001,710 A | 3/1991 | Gawrys et al. |
| 5,008,930 A | 4/1991 | Gawrys et al. |
| 5,018,191 A | 5/1991 | Catron et al. |
| 5,023,904 A | 6/1991 | Kaplan et al. |
| 5,027,384 A | 6/1991 | Morganstein |
| 5,029,196 A | 7/1991 | Morganstein |
| 5,032,989 A | 7/1991 | Tornetta |
| 5,033,079 A | 7/1991 | Catron et al. |
| 5,036,535 A | 7/1991 | Gechter et al. |
| 5,046,088 A | 9/1991 | Margulies |
| 5,095,505 A | 3/1992 | Finucane et al. |
| 5,097,528 A | 3/1992 | Gursahaney et al. |
| 5,109,399 A | 4/1992 | Thompson |
| 5,136,636 A | 8/1992 | Wegrzynowicz |
| 5,148,522 A | 9/1992 | Okazaki |
| 5,163,087 A | 11/1992 | Kaplan |
| 5,168,515 A | 12/1992 | Gechter et al. |
| 5,179,652 A | 1/1993 | Rozmanith et al. |
| 5,197,009 A | 3/1993 | Hoffman, Jr. et al. |
| 5,214,688 A | 5/1993 | Szlam et al. |
| 5,237,323 A | 8/1993 | Saito et al. |
| 5,237,499 A | 8/1993 | Garback |
| 5,253,288 A | 10/1993 | Frey et al. |
| 5,255,183 A | 10/1993 | Katz |
| 5,259,023 A | 11/1993 | Katz |
| 5,287,498 A | 2/1994 | Perelman et al. |
| 5,289,195 A | 2/1994 | Inoue |
| 5,289,371 A | 2/1994 | Abel et al. |
| 5,293,163 A | 3/1994 | Kakihara et al. |
| 5,299,132 A | 3/1994 | Wortham |
| 5,329,108 A | 7/1994 | Lamoure |
| 5,333,266 A | 7/1994 | Boaz et al. |
| 5,334,974 A | 8/1994 | Simms et al. |
| 5,361,295 A | 11/1994 | Solomon et al. |
| 5,379,421 A | 1/1995 | Palazzi, III et al. |
| 5,381,338 A | 1/1995 | Wysocki et al. |
| 5,390,232 A | 2/1995 | Freeman et al. |
| 5,396,254 A | 3/1995 | Toshiyuki |
| 5,402,474 A | 3/1995 | Miller et al. |
| 5,422,809 A | 6/1995 | Griffin et al. |
| 5,430,782 A | 7/1995 | Brady et al. |
| 5,432,841 A | 7/1995 | Rimer |
| 5,436,965 A | 7/1995 | Grossman et al. |
| 5,457,738 A | 10/1995 | Sylvan |
| 5,465,286 A | 11/1995 | Clare et al. |
| 5,465,290 A | 11/1995 | Hampton et al. |
| 5,470,233 A | 11/1995 | Fruchterman et al. |
| 5,471,392 A | 11/1995 | Yamashita |
| 5,479,488 A | 12/1995 | Lennig et al. |
| 5,481,594 A | 1/1996 | Shen et al. |
| 5,481,603 A | 1/1996 | Gutierrez et al. |
| 5,488,652 A | 1/1996 | Bielby et al. |
| 5,506,897 A | 4/1996 | Moore et al. |
| 5,524,202 A | 6/1996 | Yokohama |
| 5,528,518 A | 6/1996 | Bradshaw et al. |
| 5,528,672 A | 6/1996 | Wert |
| 5,533,107 A | 7/1996 | Irwin et al. |
| 5,539,809 A | 7/1996 | Mayer et al. |
| 5,543,788 A | 8/1996 | Mikuni |
| 5,546,445 A | 8/1996 | Dennison et al. |
| 5,548,637 A | 8/1996 | Heller et al. |
| 5,553,119 A | 9/1996 | McAllister et al. |
| 5,555,299 A | 9/1996 | Maloney et al. |
| 5,559,707 A | 9/1996 | DeLorme et al. |
| 5,570,283 A | 10/1996 | Shoolery et al. |
| 5,584,025 A | 12/1996 | Keithley et al. |
| 5,588,048 A | 12/1996 | Neville |
| 5,590,186 A | 12/1996 | Liao et al. |
| 5,592,541 A | 1/1997 | Fleischer, III et al. |
| 5,596,634 A | 1/1997 | Fernandez et al. |
| 5,602,901 A | 2/1997 | Redden et al. |
| 5,633,922 A | 5/1997 | August et al. |
| 5,635,953 A | 6/1997 | Hayami et al. |
| 5,640,319 A | 6/1997 | Beuning et al. |
| 5,642,410 A | 6/1997 | Walsh et al. |
| 5,646,977 A | 7/1997 | Koizumi |
| 5,652,784 A | 7/1997 | Blen et al. |
| 5,666,400 A | 9/1997 | McAllister et al. |
| 5,668,852 A | 9/1997 | Holmes |
| 5,680,446 A | 10/1997 | Fleischer, III et al. |
| 5,680,448 A | 10/1997 | Becker |
| 5,682,525 A | 10/1997 | Bouve et al. |
| 5,684,870 A | 11/1997 | Maloney et al. |
| 5,692,038 A | 11/1997 | Kraus et al. |
| 5,710,886 A | 1/1998 | Christensen et al. |
| 5,715,299 A | 2/1998 | Mosley et al. |
| 5,721,832 A | 2/1998 | Westrope et al. |
| 5,724,408 A | 3/1998 | Morganstein |
| 5,727,057 A | 3/1998 | Emery et al. |
| 5,727,201 A | 3/1998 | Burke |
| 5,729,600 A | 3/1998 | Blaha et al. |
| 5,729,731 A | 3/1998 | Yajima et al. |
| 5,734,709 A | 3/1998 | DeWitt et al. |
| 5,754,850 A | 5/1998 | Janssen |
| 5,768,360 A | 6/1998 | Reynolds et al. |
| 5,771,283 A | 6/1998 | Chang et al. |
| 5,784,059 A | 7/1998 | Morimoto et al. |
| 5,796,634 A | 8/1998 | Craport et al. |
| 5,796,813 A | 8/1998 | Sonnenberg |
| 5,802,163 A | 9/1998 | Miloslavsky |
| 5,802,513 A | 9/1998 | Bowie, III |

| | | |
|---|---|---|
| 5,805,688 A | 9/1998 | Gillespie et al. |
| 5,805,689 A | 9/1998 | Neville |
| 5,812,654 A | 9/1998 | Anderson et al. |
| 5,812,950 A | 9/1998 | Tom |
| 5,815,551 A | 9/1998 | Katz |
| 5,822,416 A | 10/1998 | Goodacre et al. |
| 5,839,088 A | 11/1998 | Hancock et al. |
| 5,848,131 A | 12/1998 | Shaffer et al. |
| 5,848,373 A | 12/1998 | DeLorme et al. |
| 5,850,433 A | 12/1998 | Rondeau |
| 5,852,809 A | 12/1998 | Abel et al. |
| RE36,111 E | 2/1999 | Neville |
| 5,867,563 A | 2/1999 | Kato et al. |
| 5,878,126 A | 3/1999 | Velamuri et al. |
| 5,894,507 A | 4/1999 | Hatamura |
| 5,901,214 A | 5/1999 | Shaffer et al. |
| 5,905,773 A | 5/1999 | Wong |
| 5,907,608 A | 5/1999 | Shaffer et al. |
| 5,910,982 A | 6/1999 | Shaffer et al. |
| 5,930,764 A | 7/1999 | Melchione et al. |
| 5,946,618 A | 8/1999 | Agre et al. |
| 5,948,041 A | 9/1999 | Abo et al. |
| 5,948,061 A | 9/1999 | Merriman et al. |
| 5,956,397 A | 9/1999 | Shaffer et al. |
| 5,961,569 A | 10/1999 | Craport et al. |
| 5,961,572 A | 10/1999 | Craport et al. |
| 5,963,861 A | 10/1999 | Hanson |
| 5,966,695 A | 10/1999 | Melchione et al. |
| 5,970,131 A | 10/1999 | Sonnenberg |
| 5,974,133 A | 10/1999 | Fleischer, III et al. |
| 5,978,747 A | 11/1999 | Craport et al. |
| 5,982,868 A | 11/1999 | Shaffer et al. |
| 5,991,739 A | 11/1999 | Cupps et al. |
| 6,035,280 A | 3/2000 | Christensen |
| 6,041,103 A | 3/2000 | La Porta et al. |
| 6,047,236 A | 4/2000 | Hancock et al. |
| 6,058,179 A | 5/2000 | Shaffer et al. |
| 6,075,853 A | 6/2000 | Boeckman et al. |
| 6,078,657 A | 6/2000 | Alfieri et al. |
| 6,085,085 A | 7/2000 | Blakeney, II et al. |
| 6,091,810 A | 7/2000 | Shaffer et al. |
| 6,108,533 A | 8/2000 | Brohoff |
| 6,148,289 A | 11/2000 | Virdy |
| 6,154,535 A | 11/2000 | Velamuri et al. |
| 6,163,597 A | 12/2000 | Voit |
| 6,167,128 A | 12/2000 | Fuller et al. |
| 6,185,282 B1 | 2/2001 | Boeckman et al. |
| 6,185,290 B1 | 2/2001 | Shaffer et al. |
| 6,202,023 B1 | 3/2001 | Hancock et al. |

FOREIGN PATENT DOCUMENTS

| | | |
|---|---|---|
| JP | 03116379 JP A1 | 5/1991 |
| JP | 03196366 JP A1 | 8/1991 |
| JP | 05207676 JP A1 | 2/1993 |
| JP | 5165401 | 7/1993 |
| JP | 5191504 | 7/1993 |
| WO | 01258183 JP Al | 10/1989 |
| WO | WO 92/14215 | 8/1992 |
| WO | WO 94/27398 | 11/1994 |
| WO | WO 94/29808 | 12/1994 |
| WO | WO 94/29995 | 12/1994 |
| WO | WO 97/50002 | 12/1997 |

OTHER PUBLICATIONS

Deposition Transcript of Thomas Tulinski, *Murex Securities Limited and Murex Licensing Corporation v. Vicinity Corporation and Pizza Hut*, U.S. District Court for the Eastern District of Virginia, Civil Action No. 01–1895–A, May 9, 2002.

Deposition Transcript of John Matson, *Murex Securities Limited and Murex Licensing Corporation v. Vicinity Corporation and Pizza Hut*, U.S. District Court for the Eastern District of Virginia, Civil Action No. 01–1895–A, May 7, 2002.

Deposition Transcript of Donald Edward Blanchard, Jr., *Murex Securities Limited and Murex Licensing Corporation v. Vicinity Corporation and Pizza Hut*, U.S. District Court for the Eastern District of Virginia, Civil Action No. 01–1895–A, May 10, 2002.

Deposition Transcript of Rodney E. Vignes, *Murex Securities Limited and Murex Licensing Corporation v. Vicinity Corporation and Pizza Hut*, U.S. District Court for the Eastern District of Virginia, Civil Action No. 01–1895–A, Sep. 26, 2002.

Defendant Vicinity Corporation and Pizza Hut, Inc.'s Notice of Declaration of Rodney Vignes in Support of Defendants' Defenses and Counterclaims of "On–Sale Bar" and Inequitable Conduct and Declaration of Rodney Vignes (May 23, 2002) in *Murex Securities Limited and Murex Licensing Corporation v. Vicinity Corporation and Pizza Hut*, U.S. District Court for the Eastern District of Virginia, Civil Action No. 01–1895–A.

Defendant Vicinity Corporation and Pizza Hut, Inc.'s Notice of Declaration of Brian Follett in Support of Defendants' Defenses and Counterclaims of Invalidity and Declaration of Brian L. Follett (May 23, 2002) in *Murex Securities Limited and Murex Licensing Corporation v. Vicinity Corporation and Pizza Hut*, U.S. District Court for the Eastern District of Virginia, Civil Action No. 01–1895–A.

Voice/5 Reference Manual for Ross Stores, Inc., Revised Feb. 15, 1993, 70 pages.

Advanced Communication Design, Inc. Letter and Brochure, Jun. 26, 1991, 7 pages.

Target Store Locator System, Basic Call Flow, Ver. 1.0, Undated (reference to 1989), 2 pages.

Article, "AT&T Unveils Frame Relay: Data Service to be Offered Outside U.S. Next Year", Communications Week International, ISSN: 1042–6086, Dec. 16, 1991, New York, p. 21.

Article, "AT&T Set for Frame–Relay—American Tel & Tel: To unveil several data services, including frame–relay & low–speed dial–up", CommunicationsWeek, ISSN: 0764–8121, Nov. 18, 1991, p. 1.

Jay Morehead and Mary Fetzer, "Introduction to United States Government Information Sources", $4^{th}$ ed., Libraries Unlimited, Inc., Englewood, Colorado, 1992, p. 330–331.

Keith Dawson, "The Smart Way to Handle Incoming Callers", publication unknown, undated, 8 pages.

IBM, Special Advertising Report, "Networked Multimedia for the Masses", undated, 1 page.

Eric Freedman, "Mich. Launches Nations 'Most Complete' Tourism Data Base", TravelAge MidAmerica, undated, pp. 1, 50,.

Multimedia Monitor, "Geo Systems Involved in Two Mapping Projects", Sep. 1993, p. 8.

STATISTICA, Inc., Outline and Letter, undated, 2 pages.

GeoSystems pamphlet, undated, 25 pages.

Gerald Morris, Torrin Sanders, Anne Gilman, Stephen J. Adelson, and Sean Smith, "Kiosks: A Technological Overview", Los Alamos National Laboratory, Jan. 10, 1995, Los Alamos, NM, 23 pages.

"The Development of a GIS–Based Transit Advanced Traveler Information System", 1995 URISA Proceedings, pp. 695–709.

MapInfo 4.50 Release Notes, Mapping Information Systems Corporation, Troy, NY, undated, 167 Pages.

Don Crabb, MapInfo 2.0; "The Latest Release of MapInfo Goes to the Head of the Class for Geographic–Data Mapping"; MacUser, Aug., 1993; vol. 9; No. 8; p. 65; ISSN: 0884–0997; Troy, NY.

Ben Shneiderman, "Designing the User Interface, Strategies for Effective Human–Computer Interaction", Second Edition, Preface, Addison–Wesley Publishing Co., Reading, Mass. pp. 428–431, 1992.

Herman J.G.M. Benning, "Digital Maps on Compact Disc", SAE Technical Paper Series, International Congress and Exposition, Detroit, Michigan, Feb. 24–28, 1986, pp. 115–120.

Leo Lax and Mark Olsen, "NAPLPS Standard Graphics and the Microcomputer, Why a Graphics Standard is Important and How It Can Be Implemented in a Microcomputer", Jul. 1983, BYTE Publications Inc., p. 82.

Rich Malloy, "the World to Your Doorstep", Jul. 1983, BYTE Publications Inc., pp. 40–41.

Darby Miller, "Videotex—Science Fiction or Reality?", Jul. 1983, BYTE Publications Inc., pp. 42–56.

Graham Hudson, "Prestel: The Basis of an Evolving Videotex System—The first Videotex system in the world is flexible enough to adopt anticipated technological advances", Jul. 1983, BYTE Publications Inc., p. 61 et seq.

Peter Braegas, "Function, Equipment, and Field Testing of a Route Guidance and Information System for Drivers (ALI)" IEEE Transactions on Vehicular Technology, May 1980, vol. VT 29, No. 2, pp. 216–225.

MapInfo, "Microcomputer Mapping Software Version 2.00", Mapping Information Systems Corporation, Troy, NY, Undated, 287 pages.

MapInfo, MapInfo v. 5.0, Mapping Information Systems Corporation, Troy, New York, Undated, 401 pages.

American National Standards Institute, ANSI TI.112–1996, "American National Standard for Telecommunications—Signalling System No. 7—Signalling Connection Control Part (SCCP)", TOC and pp. 33–34, 46–52, Jan. 12, 1996, New York, New York.

American National Standards Institute, ANSI TI.113–1995, "American National Standard for Telecommunications—Signalling System No. 7 (SS7)—Integrated Services Digital Network (ISDN) User Part", TOC, Jan. 3, 1995, New York, New York, 4 pages.

American National Standards Institute, ANSI TI.609–1999, "American National Standard for Telecommunications—Interworking between the ISDN User–Network Interface Protocol and the Signalling System No. 7 ISDN User Part", TOC, May 24, 1999, New York, New York, 6 pages.

Bell Communications Research, Bellcore, Technical Reference TR–NWT–001284 Issue 1, "Advanced Intelligent Network (AIN) 0.1 Switching Systems Generic Requirements", Aug. 1992, 337 pages.

Bell Communications Research, Bellcore, Generic Requirements GR–1298–CORE, Issue 2, "Advanced Intelligent Network (AIN) Switching Systems Generic Requirements", TOC and pp. 1–9–1–10, 5–111–5–131, Dec. 1994, 31 pages.

Bell Communications Research, Bellcore, GR–1298–CORE, Issue 4, "AINGR: Switching Systems SSP Processing of SCP/Adjunct Messages Create Call", pp. 5–133–5–154, Sep. 1997, Revision 1, Oct. 1998, 22 pages.

Bell Communications Research, Bellcore, Special Report SR–NPL–001555, Issue 1, "Advanced Intelligent Network Release 1 Baseline Architecture", TOC and pp. 4–22–4–23, 5–20, Mar. 1990, 7 pages.

Bell Communications Research, Bellcore, Special Report SR–NPL–001623, Issue 1, "Advanced Intelligent Network Release 1 Network and Operations Plan", TOC and pp. 3–23–3–24, Jun. 1990, 6 pages.

Bell Communications Research, Bellcore, GR–1229–CORE, Issue 3, "AINGR: Switch—Intelligent Peripheral Interface (II) Non–Call Associted (NCA) Signaling for BRI", pp. 6–1–6–34, Sep. 1997, Revision 1, Oct. 1998, 34 pages.

American National Standards Institute, ANSI TI.110–1992, "American National Standard for Telecommunications—Signalling System No. 7 (SS7)—General Information", Jun. 2, 1992, New York, New York, 79 pages.

American National Standards Institute, ANSI TI.621–1992, "American National Standard for Telecommunications—Integrated Services Digital Network (ISDN) User–to User Signaling Supplementary Service", Sep. 1, 1992, New York, New York, 41 pages.

American National Standards Institute, ANSI TI.609–1999, "American National Standard for Telecommunications—Interworking between the ISDN User–Network Interface Protocol and the Signalling System No. 7 ISDN User Part", May 24, 1999, New York, New York, 84 pages.

"Vehicular Navigation & Location Systems Technology", Navigation Technology Seminars, Inc., Syllabus for Course 231 on Dec. 2–4, in San Diego, California, 2 pages.

Krista Poli, "The Big Switch to Data Over Cellular", Communications, Apr. 1987, pp. 56 et seq., 6 pages.

Stanley K. Honey, Marvin S. White, Walter B. Zavoli, "Extending Low Cost Land Navigation Into Systems Information Distribution and Control", ETAK, Inc., Paper Prepared for IEEE Position Location & Navigation Symposium, Las Vegas, Nevada, Nov. 4–7, 1986, 6 pages.

J.L. Schroeder and Jeff Green, "The Emergence of Smart Traveler Kioks and the User Interface Requirements for their Successful Deployment", IVHS American, Atlanta, GA, 1994 Annual Meeting, Apr. 17–20, 1994, 18 pages.

Screen Prints, "Travel Match Express", AAA, undated, 8 pages.

Dr. Walter Zavioli, Mr. Michael Sheldrick, and Dr. Lawrence E. Sweeney, ETAK, Inc., "A System View of Digital Road Map Databases in an IVHS with Emphasis on Subsystem Interface Requirements", The $3^{rd}$ International Conference on Vehicle Navigation & Information Systems RTI/IVHS, Conference Record of Papers, Sep. 1992, pp. 600–606.

Frank Vizaro, "Orienteering in the Electronic Age", Inside Track, San Francisco International Auto Show, Nov. 23, 1986, pp. 31, 35, 36.

Loren Marshall, "Tracking the Wild Ambulance Fleet", JEMS, vol. 12, Sep. 1987, pp. 58–61.

Robert H. Anderson and Norman Z. Shapiro, "Design Considerations for Computer–Based Interactive Map Display Systems", Computer Graphics Hardware, Santa Monica, CA, 1980, pp. 9–34.

Shinzo Totani, Takasaki Kato and Kazuo Muramoto, "Automotive Navigation System", The Second International Pacific Conference on Automotive Engineering, Motor Vehicle Technology: Progress and Harmony, Proceedings vol. 2, Japan, Nov. 7–10, 1983, 11 pages.

Stanley K. Honey, Marvin S. White, Jr., Walter B. Zavoli, "Extending Low Cost and Navigation Into Systems Information Distribution and Control", Paper Prepared for IEEE Position Location & Navigation Symposium, Nov., 4–7, 1986, Las Vegas, Nevada, pp. 1–6.

Lawrence E. Sweeney, Jr., Ph.D., "An Overview of IVHS Sensor Requirements", Proceedings, Sensors Expo West, Mar. 2–4, 1993, San Jose, California, pp. 229–233.

Brochure, "Covia Partnership", GEO Systems, Lancaster, PA, undated, 1 page.

Donald F. Cooke, "Map Storage on CD–ROM", BYTE Jul. 1987, pp. 129–130, 132, 134–136, 138.

Mark D. Hamlen, "Fleet Management with Automatic Vehicle Location", 36$^{th}$ IEEE Vehicular Technology Conference, May 20–22, 1986, Dallas, Texas, pp. 374–380.

Caliper Corporation Brochure, "TransCAD Transportation GIS Software", undated, Newton, Mass., 24 pages.

David Forrest, "Seeing Data in New Ways", Computer-World, Jun. 29, 1992, pp. 85–86.

Ginger M. Juhl, "California's Sins, GIS–based Information Network Helps Law Enforcement Efforts to Curtail Drug Traffic", GEO Info Systems, Aug. 1993, Eugene, OR, pp. 36–45.

Robert L. Dupree, "Amoco Graphics System", Harvard University, Management's Use of Maps: Commercial and Political Applications, 1979, Cambridge, Mass. pp. 13–18.

Glenn M. Fishbine, "Future Directions in Public Service Computer Cartography: The Challenge of the Pinball Mentality", Harvard University, Urban, Regional, and State Government Applications of Computer Mapping, 1979, Cambridge, Mass., vol. 11, pp. 61–67.

Randall E. Gregg, "Application of Thematic Maps in Management Information Systems: The Experience of Upland Industries Corporation Market Research Department", Harvard University, Management's Use of Maps, undated, Cambridge, Mass. vol. 7, pp. 33–40.

Peter H. Van Demark, "Development Surveillance using GBF/DIME Technology", Papers From the Annual Conference of the Urban and Regional Information Systems Association; Urban, Regional, and Environmental Information: Needs, Sources, Systems, and Uses; Aug. 16–19, 1981 New Orleans, LA, pp. 307–314.

Michael J. Kevany, "The Evolution of Automated Mapping Systems Over the Past Dozen Years", Papers From the 1986 Annual Conference of the Urban and Regional Information Systems Association; Conference Theme: What's the Difference?, vol. IV, Denver, CO, pp. 139–147.

Peter L. Croswell, "Developments in Data Transfer Between Geographic Information Systems and Mainframe Computer Databases", Papers From the 1986 Annual Conference of the Urban and Regional Information Systems Association; Conference Theme: What's the Difference?, vol. II, Denver, CO, pp. 47–61.

William Folchi and Ann Badillo, "A New Perspective in GIS: Databases and Emerging Markets", GIS World, Aug./Sep. 1990, Fort Collins, CO., pp. 66 et seq.

Article, "Ancient Pompeii Culture Revealed By GIS", GIS World, Dec. 1990, Fort Collins, CO, pp. 27–31.

Gilbert H. Castle, III, "Profiting From A Geographic Information System", Stet, ed, 1993 GIS World Book, Fort Collins, CO, pp. 23, 30, 31, 85, 90.

Ginger M. Juhl, "Coping With Rapid Development County "Reinvents" Government with GIS Assistance", GIS World, Jan. 1994, Fort Collins, CO, pp. 30–34.

Rick Tetzeli, "Mapping for Dollars", Fortune, Oct. 18, 1993, pp. 91 et seq.

Pamphlet Excerpt, "Section 3, Exemplary Systems and Critical Performance Factors Accessibility Evaluation", Undated, pp. 3–1 to 3–11, H–1 to H–4.

Article, "Kiosk", NASIRE 1993 Annual Meeting, Sep. 1, 1993, 29 pages.

Article, "Real Life Multimedia", ComputerLand Magazine, May/Jun. 1992, pp. 20–22, 26.

Article, "Multimedia Makes the 1996 Olympic Team", Government Technology, vol. 5, No. 9 Sep. 1992, pp. 1, 50, 53.

Article, "When Will Multimedia Meet Expectations?", Government Technology, vol. 5, No. 9, Sep. 1992, pp. 30, 32–33.

Advertisement, "About Touch New York", Touch City Guide Network, Jul. 22, 1993, 1 page.

Article, "Access Idaho", Official Idaho Recreation Guide, 1992, 7 pages.

Advertisement, "IBM Creative Services and Federal Express: Multimedia Express", IBM Multimedia Innovations, Special Advertising Report, Undated, pp. IBM–1–IBM–6.

"Network Multimedia Servers, The Maitre D' of Multimedia New IBM Solutions Provide "Five–Star" Multimedia Service on a Network", IBM Multimedia Innovations, Special Advertising Report, Undated, pp. IBM–1–IBM–5.

Elisheva Steiner, "SCO and Pizza Hut Announce Pilot Program for Pizza Delivery on the Internet—'PizzaNet' Program Enables Computer Users to Electronically Order Deliveries", Wichita, KS and Santa Cruz, CA SCO Forum 94, Aug. 22, 1994, http://www.Interesting–people.org/archives/interesting–people/199408/msg00057.html.

Article, "Strategic Mapping introduces next generation of desktop mapping software" Business Wire, Nov. 1, 1993, Santa Clara, CA, 2 pages.

Advertisement, "R. R. Donnelley GeoSystems Introduces GEOLOCATE Plus", GeoSystems, Mar. 10, 1992, San Francisco, CA, 3 pages.

Article, "Geosystems Electronic Future", Directory World, Fall 1993, 1 page.

Claire Gooding, "Charting a New Course—Claire Gooding looks at the benefits of an innovative geographical information system, in a series on getting the most out of software/Software at Work", The Financial Times, Oct. 28, 1993, London, p. 20.

Bob Schwabach, "Computerized Maps Go Beyond Paper Versions", Star Tribune, Sep. 23, 1993, Minneapolis, MN, p. 2D.

Jeff Angus, "Map Software; CityGuide Takes the Guesswork Out of Business Travel", InfoWorld, Mar. 1, 1993, p. 81.

Rik Fairlie, "Software Integrates City Data, Maps; Personal Travel Technologies Develops Pathfinding Systems for Travelers; Personal Travel Guide; Automation Report", Travel Weekly, vol. 51, No. 94, ISSN: 0041–2982, Nov. 23, 1992, p, 53.

Lee Michaelides, "Lyme Firm Intent on Digitizing the Nation", Vermont Business, Section 1, May 1986, p. 76.

Robert Reinhold, "Revolution Changes the World of Maps", The New York Times, Sep. 23, 1990, Section C, Col. 1, p. 2.

Brochure, "The Worlds First Automotive Navigation System The Etak Navigator", publisher unknown, undated, 5 pages.

Article, "Computer Navigation Coming to Law Enforcement", Law and Order, vol. 33, Feb. 1985, pp. 24 et seq.

John McCarron, "Supermaps; Computers Put Big Cities on Road to High Efficiency", Chicago Tribune, Aug. 3, 1986, Tomorrow Section, p. 1.

Edware Warner, "Smart Maps: New Route to Profits: Digital–Map Systems Can Save Business Up To $ 50 Billion Annually", High Technology Business, vol. 8, No. 12, ISSN: 0895–8432, Dec. 1998, p. 20.

Mobile World, Conference Proceedings, Table of Contents, Undated, 2 pages.

Christopher B. Hrut, "Navigation Technologies: Executive Summary", Undated, 19 pages.

MapInfo for DOS, Command Reference Version 5.0, MapInfo Corporation, Troy, New York, Copyright 1985–91, 272 pages.

"LSSGR: CLASSM Feature: Calling Name Delivery Generic Requirements", Bellcore, Technical Reference, TR–NWT–001188, Issue 1, Dec. 1991, 120 pages.

"LSSGR: Class Feature: Calling Number Delivery", Bellcore, Technical Reference, TR–NWT–000031, Issue 4, Dec. 1992, 35 pages.

Dr. Amir Atai and Dr. James Gordon, "Architectural Solutions to Internet Congestion Based on SS7 and Intelligent Network Capabilities", Telcordia Technologies, pp. 1–19.

H.G. "Ike" Isaacson, "A Technical Overview Of BellSouth Telecommunications' Advanced Intelligent Network", BellSouth Telecommunications, AIN IBU—Network, March 1994, pp. 1–41.

L.R. Bowyer, R. J. Baseil, "The Line Information Data Base", International Switching Symposium, vol. 4 of 4, 1987, Phoenix AZ, pp. 959–963.

Von K. McConnell, Margaret E. Nilson, and Elenita E. Silverstein, "Feature Interaction Analysis in the Advanced Intelligent Network: A Telephone Company Perspective", IEEE, 1993, pp. 1548–1552.

Richard B. Robrock II, "The Intelligent Network—Changing the Face of Telecommunications", Proceedings of the IEEE, vol. 79, No. 1, Jan. 1991, pp. 7–20.

L.R. Bowyer, R. B. Robrock, "Intelligent Network Services for Data Customers" Supercomm ICC '90 Conference Record, vol. 2 of 4, pp. 602–606.

R. K. Berman, S.F. Knapp, R.F. Baruzzi, "Evolvability of the Advanced Intelligent Network", IEEE, 1991, pp. 622–626.

René R. LeBlanc, "Intelligent Network Basic Call Model Rapid Prototype", IEEE, 1993, pp. 1543–1547.

E. M. Worrall, Virtual Network Capabilities—The Next Phase of the 'Intelligent Network', Globecom Tokyo'87, Sponsored by IEEE Comsoc IEICE and FAIS, 1987, pp. 40.2.1–40.2.4.

N. Natarajan and G.M. Slawsky, "A Framework Architecture for Multimedia Information Networks", IEEE Communications Magazine, Feb. 1992, vol. 31, No. 2, pp. 97–104.

Vincent Lapi, Pete Vapheas, Jorge Brana, Anand Ramani, Alan Gopin, & Dave Marutiak, "Diverse Service Architectures Using Alternate AIN Elements", IEEE, 1990, pp. 1633–1639.

H.W. Kettler, G. Natarajan, E.W. Scher, P.Y. Shih, "Evolution of the Intelligent Network to Support Global Services", International Switching Symposium, vol. 2, Oct. 1992, pp. 53–57.

Surinder K. Jain, "Intelligent Peripheral: Signaling and Protocols", International Switching Symposium, vol. 2, Oct. 1992, pp. 117–121.

Bernard C. Parenteau, Naphtali D. Rishe, "Internet Pricing and Priorization", Publication Unknown, Undated, 10 pages.

Roger K. Berman, "Advanced Intelligent Network: 1993 Snapshot", Globecom '90 IEEE Global Telecommunications Conference & Exhibition, vol. 3 of 3, Dec. 2–5, 1990, pp. 1628–1632.

R.K. Berman, S.F. Knapp, R.F. Baruzzi, "Evolvability of the Advanced Intelligent Network", IEEE International Conference on Communications, ICC '91, Conference Record, vol. 2 of 3, pp. 622–626.

Naphtali Rishe, "Managing Network Resources for Efficient, Reliable Information Systems", IEEE, 1994, pp. 223–226.

T.E. Newman, R. B. Robrock, "Customer Control of Intelligent Network Services", IEEE Global Telecommunications Conference & Exhibition "Communications for the Information Age", 1988, pp. 7–10.

I.Y. Chiou, W.L. Chan, E.C. Tsai, "FNMS Communications Platform", IEEE International Conference on Communications, ICC 91, Conference Record, vol. 3 of 3, Jun. 1991, pp. 1586–1590.

Naoki Uchida, Akira Miura, "Customer–Defined Service Model and Definition Method for Intelligent Networks", IEEE International Conference of Communications, ICC 91, Conference Record, vol. 2 of 3, Denver, Jun. 1991, pp. 954–958.

Anand S. Ramani, John R. Rosenberg and Praful B. Shanghavi, "Placement of Feature Management Functionality in IN", IEEE International Conference on Communications, ICC '91, vol. 2 of 3, Denver, Jun. 23–26, 1991, pp. 632–636.

Ronald B. Greenfield, "The Provisioning Operation Support System Impacts of Intelligent Network Deployment", IEEE international Conference on Communications, ICC '91, vol. 2 of 3, Denver, Jun. 23–26, 1991, pp. 627–631.

Eric Bierman, "Distributed Network Control", International Switching Symposium 1987, Mar. 20, 1987 vol. 4 of 4, Phoenix, AZ, pp. 952–958.

Sameh Rabie, Vicky Snarr Carter, Greg Wilbur, "Activity-–Based User Interface for Network Management", IEEE Dallas Globecom '89 Conference Record vol. 1 to 3, Dallas, Texas, Nov. 27–30, 1989, pp. 196–200.

"Technical Program Chairman's Message", IEEE ICC '93 Geneva, May 23–26, 1993, Geneva, Switzerland, 1 page.

Jun Maeda, Moo Wan Kim, Naoto Ito, Toshihiro Ide, "An Intelligent Customer–Controlled Switching System", IEEE Global Telecommunications Conference & Exhibition, Hollywood, Florida, Nov. 28–Dec. 1, 1988, Conference Record vol. 3 of 3, pp. 1499–1503.

Matthew G. Ryan "Software Application and Management Issues for AIN", IEEE ICC '91, Jun. 23–26, 1991, vol. 2 of 3, Denver, pp. 637–641.

Allen Jackson, Mary Jean McAllister, "Integrated Services for the 1990's", IEEE ICC '91, Jun. 23–26, 1991, vol. 2 of 3, Denver, pp. 959–963.

T.S. Chow, B.H. Hornbach, M.A. Gauldin, D.A. Ljung, "CCITT Signalling System No. 7, The Backbone for Intelligent Network Services", Globecom Tokyo '87, Nov. 15–18, 1987 Tokyo, Japan, pp. 40.1.1–40.1.5.

Walter C. Roehr, Jr., "Signalling System No. 7", Open Systems Data Transfer, Feb. 1985, pp. 1–16.

Frank Salm, Dave Gerads, "Exploring Intelligent Network Control of Active Calls on a CO Switch", IEEE, 1993, pp. 1558–1562.

S. Shehryar Qutub, Marie B. Macaisa, "A Knowledge-based Information-Access System for the Telecommunications Environment", IEEE, 1991, pp. 408.2.1–408.2.7.

Frank J. Weisser, Randall L. Corn, "The Intelligent Network and Forward–Looking Technology", IEEE Communications Magazine, Dec. 1988, pp. 64–69.

Stephanie M. Boyles, Randall L. Corn, Lorina R. Moseley, "Common Channel Signalling: The Nexus of an Advanced Communications Network", IEEE Communications Magazine, Jul. 1990, pp. 57–63.

Duane M. Figurski, Matt Yuschik, Ph.D., "User–Centered Programmability of Intelligent Network Features", IEEE ICC '91, Jun. 23–26, 1991, vol. 2 of 3, Denver, pp. 936–940.

R.L. Corn, H.E. Smalley, Jr., R.J. Wojcik, "Service Deployment in the Advanced Intelligent Network Moving Toward Implementation", ISS '92, Oct. 1992, vol. 2, pp. 182–186.

S. Harris, N. Psimenatos, P. Richards, I. Ebert, "Intelligent Network Realization and Evolution: CCITT Capability Set 1 and Beyond", ISS '92, Oct. 1992, vol. 2, pp. 127–131.

N. Natarajan and G.M. Slawsky, "A Framework Architecture for Multimedia Information Networks", IEEE Communications Magazine, Feb. 1992, vol. 31, No. 2, pp. 97–104.

Rungroj Kositpaiboon and Bernie Smith, "Customer Network Management for B–ISDN/ATM Services", IEEE ICC '93, May 23–26, 1993, Geneva, Switzerland, Technical Program Conference Record vol. 1 of 3, pp. 1–7.

N. Natarajan and Gary Slawsky, "A Framework Architecture for Information Networks", IEEE Communications Magazine, Apr. 1992, pp. 102–109.

Thomas Bowers, "Alternatives for the Transport of ISDN Customer Network Management Messages", IEEE Globecom '89, Dallas, Texas, Nov. 27–30, 1989, Conference Record vol. 2 of 3, pp. 0856–0860.

Thomas Magedanz, "Preliminary Model for an Integrated Intelligent Network Management Support System", Supercomm/ICC '92, Conference Record vol. 1 of 4, pp. 169–173.

Javier Huélamo, "Multimedia Control Stations for ATM Broadband Networks Providing Multimedia Intelligent Network Services", IEEE ICC '93 Geneva, May 23–26, 1993, Geneva, Switzerland, Technical Program, Conference Record vol. 2 of 3, pp. 650–655.

Joey De Wiele and Sameh Rabie, "Meeting Network Management Challenges: Customization, Integration and Scalability", IEEE ICC '93, Geneva, May 23–26, 1993, Geneva Switzerland, Technical program, Conference Record vol. 2 of 3, pp. 1197–1204.

Sameh Rabie, Xi–Nam Damn, "An Integrated Architecture for LAN/WAN Management", IEEE NOMS 1992 Symposium Record, vol. 2 of 3, pp. 254–264.

Robert Weihmayer and Richard Brandau, "A Distributed AI Architecture for Customer Network Control", IEEE Globecom '90, San Diego, CA, Dec. 2–5, 1990 Conference Record, vol. 1 of 3, pp. 656–662.

Pamela J. Zanella, "Customer Network Reconfiguration Applications Utilizing Digital Cross–Connect Systems", IEEE Global Telecommunications Conference & Exhibition, Hollywood, FL, Nov 28–Dec. 1, 1988, vol. 3 of 3, pp. 1538–1543.

Christopher F. Foard, Leslie A. Spindel and Pramode K. Verma, ". . . In the Nineties: The Evolution of AT&T's Switch–Computer Interfaces", AT&T Technical Journal, Sep./Oct. 1991, pp. 45–58.

Robert L. Capell, David A. Kettler, Randall L. Corn, and Robert Morris, "Evolution of the North Carolina Information Highway", IEEE Network, Nov./Dec. 1994, pp. 64–70.

Dean E. Harvey, Shannon M. Hogan, John Y. Paysour, "Call Center Solutions", AT&T Technical Journal, Sep./Oct. 1991, pp. 36–44.

Peter A. Russo, "Advanced Intelligent Network Service Model", Intelligent Network Requirements Planning District, Bell Communications Research, Publication Unknown, Undated, 7 pages.

Hardeep Minhas, "Intelligent Network Services and Architecture", IEEE MILCOM '91, 1991, pp. 207–211.

Sadahiko Kano, Shuji Tomita, Fumito Sato, "Network Architectures and Switch Interface Scenarios", NTT, Tokyo, Japan, Publication Unknown, Undated 5 pages.

Cartography Specialty Group, "Words From the Chair", vol. 17, No. 1, Fall 1996, http://www.csun.edu~hfgeg003/csg/fall96.html.

Newsletter, "Sites to see on the Web—ATM Locator Guide", Campus Computing & Communications, University of British Columbia, Sep. 1995, www.cc.ubc.ca/campus–computing/sep95sites.html.

Donald F. Hemenway, Jr., "Internet Users Select Favorite Web Sites—Best Nonprofit GIS Site", GEOWorld, vol. 9, No. 1, Jan. 1996, www.geoplace.com/gw/1996/0196/0196feat.asp.

Table of Contents, Business GEOgraphics, vol. 4 No. 5, May 1996, http:/www.geoplace.com/by/1996/0596/0596toc.asp.

Proposal to The Corporation for Public Broadcasting, "Mapping a Brighter Future: Expanding St. Louis' Community Information Network", St. Louis Development Corporation, Aug. 16, 1996, http://stlouis.missouri.org/cin/grants/cpb/cpbgrant.htm.

Article, "Yahoo!'s Picks of the Week", Sep. 9, 1996, http://docs.yahoo.com/picks/960909.html.

Thomas R. Fasulo, "I hate Computers", Do we communicate in cyberspace, or just talk?, vol. 3, No. 31, Sep. 13, 1996, http://extlab7.entnem.ufl.edu/IH8PCs/vol3/V3N31.htm.

Scott Treadway, Topic Posting, "CPSC 2263—Periodicals", SWU's OnLine Classroom Forum, Dec. 9, 1996, http://medsch.wisc.edu/cgi–netforum/swuclass/a/3—16.

Supplemental Information Disclosure Statement with Declaration of James D. Shaffer for ONE NUMBER INTELLIGENT CALL PROCESSING SYSTEM (U.S. patent application Ser. No. 08/748,192) Sep. 22, 1998.

Information Disclosure Statement with Declaration of James D. Shaffer for AUTOMATIC INFORMATION AND ROUTING SYSTEM FOR TELEPHONIC SERVICES (U.S. patent application Ser. No. 08/598,392) Jun. 19, 1997.

Applied Telematics, Inc., "Instalink," brochure.

Peterson, James L. and Abraham Silberschatz, Second Edition, Section 3.3.3, pp. 70–71, "Operating System Concepts."

Targus Information Corporation, brochure, Mar. 19, 1993, "DART Intelligent Call Processing."

Targus Information Corporation, brochure, Jan. 17, 1995, "DART Intelligent Call Processing."

TIGER Technical Guide, Oct. 1991, pp. 3–5, "Topolgical Integrated Geographic Encoding and Referencing System/Zone Improvement Plan."

"Domino's delivers using new call routing service"; *Network World*, vol. 8, No. 32, dated Aug. 12, 1991, pp. 1 and 55.

"Weight Watchers reduces customers' wait for service"; *PBX/Key/Centrex*, dated Jul. 1995, p. 11.

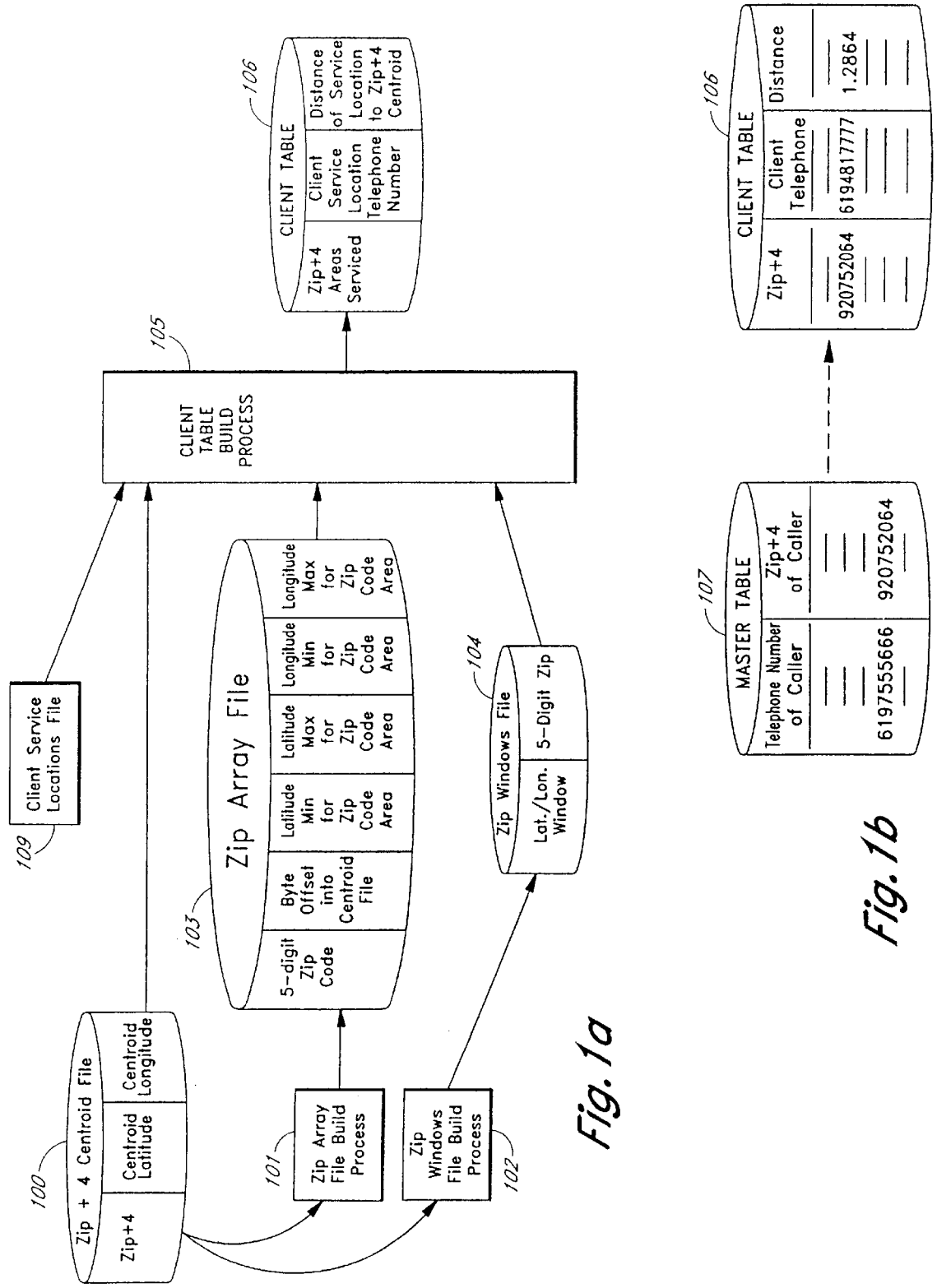

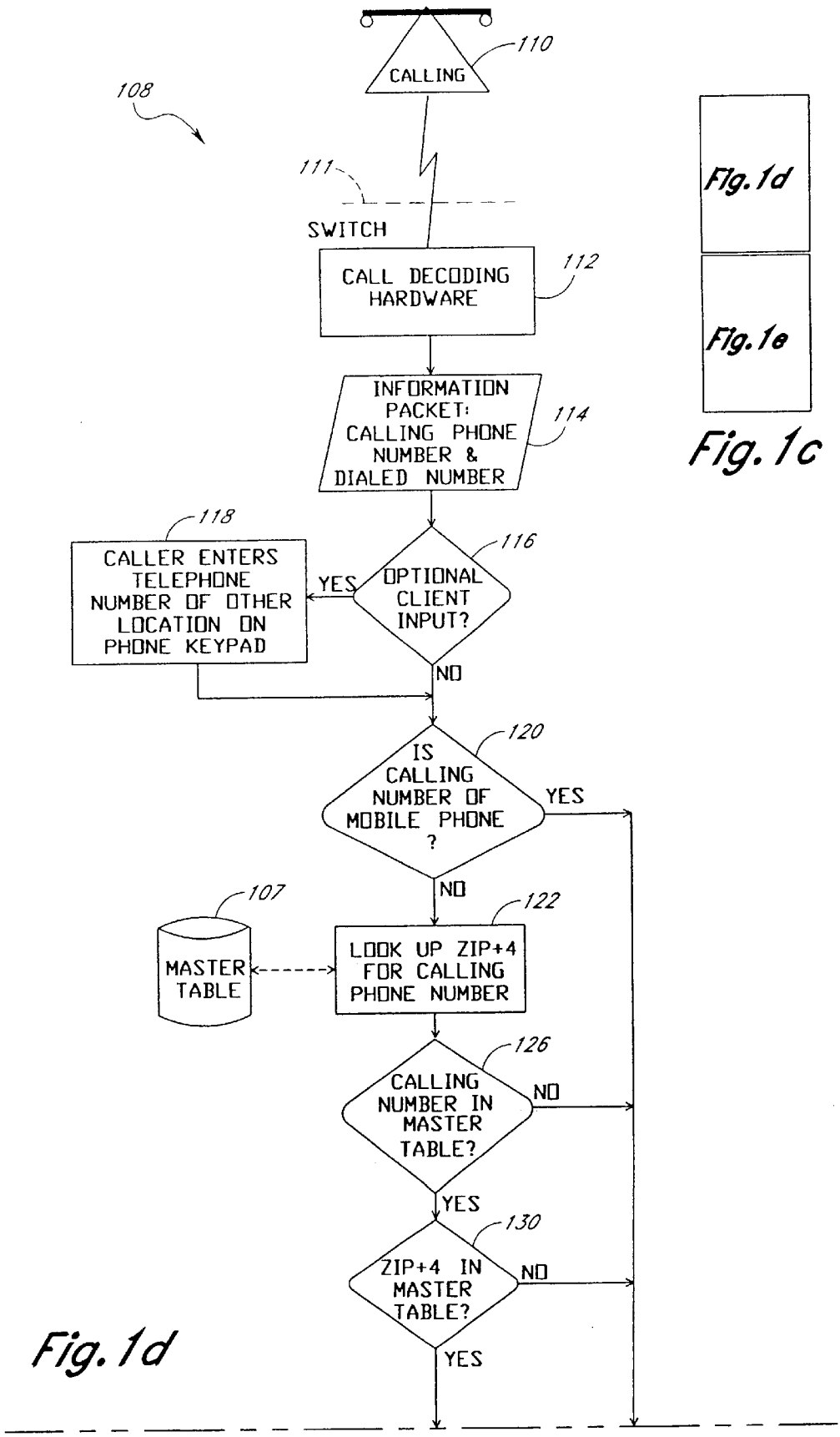

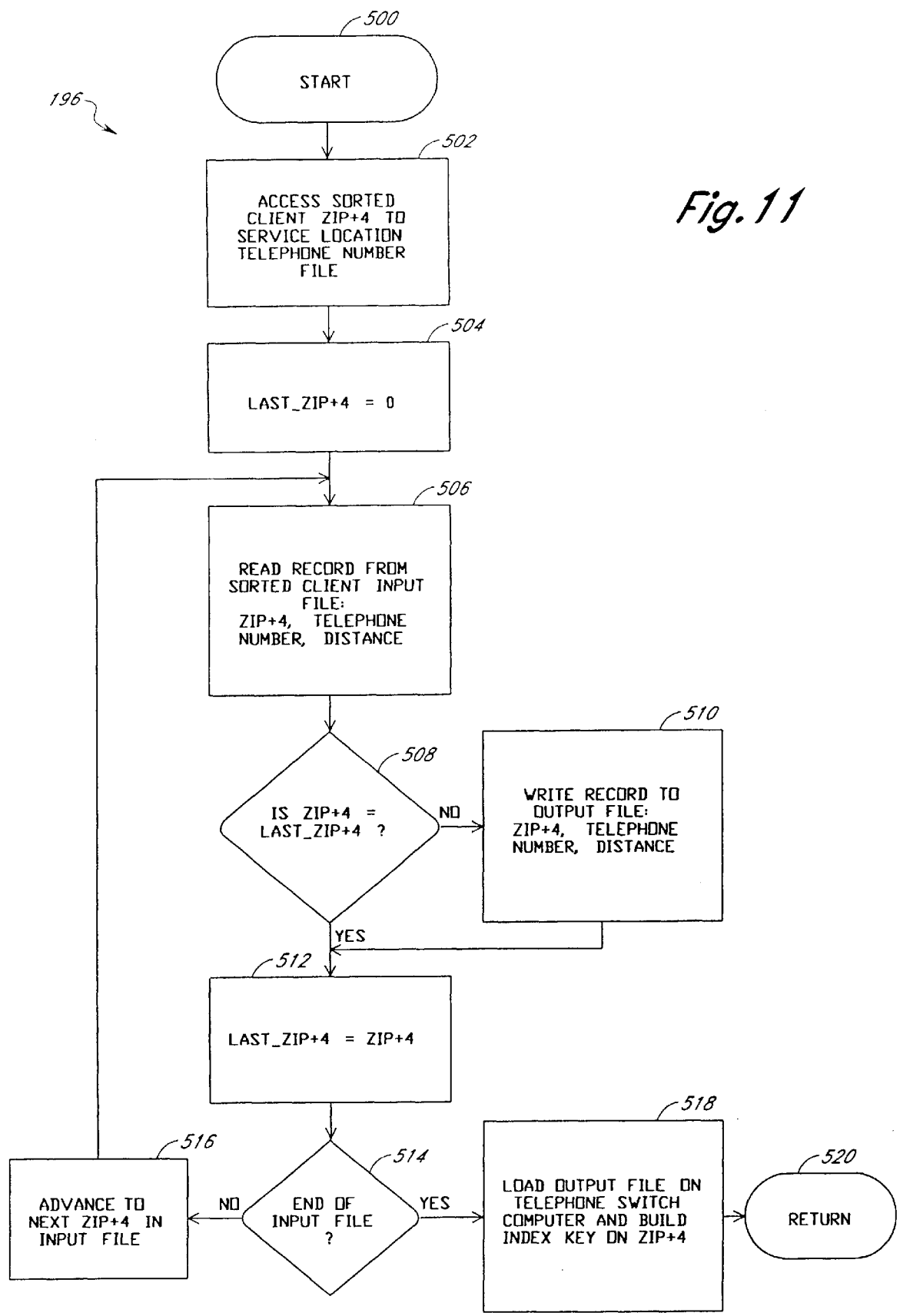

AUTOMATED TELECOMMUNICATIONS CALL PROCESSING METHOD

CROSS-REFERENCE TO RELATED APPLICATIONS

This application is a continuation of U.S. patent application Ser. No. 09/100,567 filed on Jun. 19, 1998, which is a continuation-in-part of U.S. patent application Ser. No. 08/659,318 (now U.S. Pat. No. 5,982,868) filed on Jun. 6, 1996, which is a continuation-in-part of U.S. patent application Ser. No. 08/598,392 (now U.S. Pat. No. 5,848,131) filed on Feb. 8, 1996, which is a continuation-in-part of U.S. patent application Ser. No. 08/365,325 (now U.S. Pat. No. 5,506,897) filed on Dec. 28, 1994, which is a file-wrapper continuation of U.S. patent application Ser. No. 08/020,653 (now abandoned), filed on Feb. 22, 1993.

BACKGROUND OF THE INVENTION

1. Field of the Invention

The present invention generally relates to telephonic services and routing technologies and, more specifically, to a system for automatically routing telephone calls.

2. Background of the Invention

In the increasingly competitive business world, there have been various attempts to automatically route telephone calls made to an "1-800" number or equivalent for a local store, franchise, branch, dealer or service company (henceforth, service location), whose service area encompasses the caller location for the product or service associated with the "1-800" number. For example, a person would dial 1-800-Italian from any Touch Tone® phone (93 percent of U.S. phones are Touch Tone) in the United States, and the phone would ring at the MyPizza (a fictitious business) service location that delivers pizza to the location of the calling telephone.

There have been several previous simplistic attempts to automatically route calls to a service location that is geographically proximate to the caller. These routing technologies are based on routing the incoming call to a location with the same telephone prefix as the originating call, to the same 5-digit zip code, to all zip codes that have the same city name, or a combination of the above. A telephone prefix or exchange is identified by the middle three digits of a ten digit telephone number. For example, in 619-942-9999, the prefix or exchange is 942. Usually all telephone numbers with the same prefix are serviced by the same wire center. A wire center is the geographical area serviced by a single telephone company office. The wire center is usually one switch, but can be multiple switches, and usually provides service to about ten exchanges. By definition of the telephone companies, wire centers do not overlap.

A. Prior Routine System Structure

The earth is a sphere, and any point on its surface can be defined by a latitude and longitude spherical coordinate system developed several centuries ago. Using this coordinate system, spherical trigonometry, and a computer, it is possible to calculate the distance between any two locations on the earth and determine if one location lies within a specified radius of another or determine if a location is contained within an irregular service area defined as a spherical polygon.

Several years ago, AT&T instituted the technology of passing the calling telephone number along the telephone network, by use of Automatic Number Identification (ANI), to facilitate billing. The "Caller ID" feature, available on some telephone networks, utilizes the ANI technology to identify the telephone number of the calling party. Since a modern telephone switch is just a special purpose computer, it is a simple process for the switch handling the call to look up in a record table (of over one hundred million records) the calling telephone number with an assigned service location telephone number and route the call to the service telephone number.

However, there were some fairly formidable problems that needed to be solved before this routing process could be a commercially viable and practical service. The first problem was initially determining the latitude and longitude of every telephone number in the United States and keeping them updated when twenty percent of the consumer population moves every year and businesses are continually opening and closing locations. The second problem was performing the multitude of spherical trigonometric calculations which is several orders of magnitude beyond today's most powerful computers that are required to create the calling telephone number to the service location telephone number tables and to keep them updated in a constantly changing environment.

Several key databases and technologies are necessary to solve these problems. The United States Census Bureau, as part of the 1990 census, built a national latitude and longitude cartographic map of the United States called TIGER (Topological Integrated Geographical Encoding and Referencing) that contains almost every street link in the United States. A street link is a street segment intersected by other streets at each end. The TIGER record for all street links contains the latitude and longitude coordinates at each end of the street segment accurate to within plus or minus thirty feet and, for most street segments, the starting and ending address ranges for each side of the street. Where the Census Bureau did not complete the address ranges, private companies have filled in the gaps and are updating TIGER as new streets are built.

In the past, the U.S. Postal Service (the "Post Office") divided the U.S. into postal delivery areas called zip (zone improvement plan) codes to help automate the routing of mail. At the nine digit level (called "zip+4"), these zip codes usually correspond to a single side of a street link. In addition to geographically dividing the United States into small postal delivery areas, the Post Office also set standards for the naming of places and streets. For direct mailers to get discounts, they had to standardize their mailing addresses to match the Post Office's naming conventions and provide a zip+4 code. To facilitate the process of postal address standardization and zip+4 coding, the Post Office provides a national Zip+4 Address Coding Guide and has certified several commercially available software packages that correctly address standardize and zip+4 code 99 percent plus of the address records on a Post Office test file. It is well known that file or table records comprise one or more fields.

Recently, the Post Office and some private companies have matched the Post Office's Zip+4 Address Coding Guide with TIGER and have created files containing zip+4 codes with latitude and longitude centroids (a zip+4 centroid is the approximate geographical mid-point of a zip+4 code). This type of file is referred to as a zip+4 latitude and longitude centroid file 100 (FIG. 1a). These centroids are accurate 95 percent of the time to within plus or minus 105 feet in relation to a house or business receiving mail at a street address assigned to a given zip+4 code. Today, it is a very reliable and economical process to address standardize and zip+4 code a list identifying physical locations, such as a master list of phone numbers of the present invention.

Other changes and improvements in telecommunications technology were needed to make the automated telephone call routing process a commercially viable and practical service. Improvements in the telecommunication infrastructure in the U.S. have changed the telecommunication cost structure. Presently the cost of a telephone call from Los Angeles to New York is about the same as for a call from Los Angeles to San Diego. Therefore, the physical location of a central routing switch is no longer critical, or in other words, can be anywhere in the continental U.S.

Another improvement of telecommunications technology is the advent of Geographic Information Systems, commonly called GIS. These systems allow the aggregation and display of almost any data for any area, any size or shape, anywhere in the United States by interactive maps. The popularity of these systems has lead to the development of sophisticated techniques and algorithms to handle geographically based information. Of primary interest is the linking of the geographic information to telephone numbers, especially at the 10-digit level (area code-prefix-suffix).

The complex process of spherical trigonometric distance calculations on billions of possible permutations has been alleviated by making the process less computer intensive. Instead of performing complex trigonometric spherical calculations, a technique that is less than one-thousandth as computer intensive is used. This technique is based on doing a polyconic projection from each service location and performing simple two dimensional distance squared tests. There are approximately 68.9404 miles per degree latitude. However, the miles per degree longitude varies with the latitude. At a given latitude, the miles per degree longitude is equal to the cosine of the latitude multiplied by 68.9404. By using the service location as the latitude point and knowing the latitude and longitude of calling points, it is easy to obtain a delta latitude and longitude, translate them into miles, and perform a simple distance calculation, i.e., "distance=SQRT(X2+Y2)". This polyconic projection technique results in a distance calculation error of approximately 12 feet for two locations that are 100 miles apart at 40 degrees latitude. However, additional reduction of the computational effort is necessary to have a practical, efficient, and commercially viable routing process.

B. Prior Routing System Operation

Previous technologies for routing "1-800" telephone number calls to a service location have one or more of the following three problems:

(1) Many such routing systems are very coarse in their level of precision and cannot handle small service areas with legally defined franchise territories like pizza delivery. A much more precise system is desired that is accurate to within 105 feet rather than previous accuracies to within 10 miles. Such a system would utilize very precise distance calculations made possible by knowing the physical location on the earth, most typically expressed as a latitude and longitude, of nearly every non-mobile telephone in the United States. Other coordinate systems could be used in other countries. A business also may like the ability to route a telephone call to a specific franchise territory, which may be an irregularly shaped polygon.

(2) Another problem in routing systems is that they divide the United States into many large arbitrarily defined areas and there is no ability to route a call to the closest service location if the closest location is not located in the same artificially created area as the caller. In many instances, a caller located near the border of an exchange area or 5-digit zip code is much closer to a service location with a different zip code or telephone prefix than the one to which it is routed. A seamless system is desired that does not use artificially created areas such as telephone wire centers, telephone prefixes, or 5-digit zip codes where calls can only be routed within their area. A business may want an option of choosing to route a call to the closest branch or to any branch, for example, in a 5 mile radius of the caller.

(3) Finally, known routing systems often rely on third party telephone directories that are always outdated due to publishing, key entry, and optical character recognition (OCR) scanning time lags and which do not include unlisted numbers. Over 30 percent of the U.S. telephone numbers are unlisted, which includes public pay phones and multiple lines going into businesses and households where only one line is listed. Because consumers and businesses throughout the country change locations on a daily basis, a system is desired that correctly routes a much higher percentage of calls than the previous attempts. In the U.S., such a system would require direct access to the AT&T universe of telephone numbers. Such a system would preferably utilize daily updated and unlisted telephone numbers and involve passing information between regulated telephone databases maintained by the telephone companies and client databases maintained by third parties.

These three deficiencies result in lower customer service and satisfaction, higher costs because of manual exception handling for calls that cannot be routed due to a variety of reasons, costs of misrouting, and high on-going maintenance costs. Manual exception handling generally requires operator intervention in the "1-800" call.

Other previous systems require the consumer to enter their zip code or telephone prefix on the Touch Tone keypad in response to voice prompting from the system. Based on the caller-entered data on the keypad, the telephone call is forwarded to a destination telephone. Other similar systems will simply inform the consumer, by a voice message, of another telephone number for the local dealer, which must be manually dialed rather than forwarding the call automatically. A system is desired that does not require any additional customer interaction or input. Such a system would be totally automatic by utilizing, at a minimum, the 10-digit telephone numbers in the standard telephone packet that can only be accessed and utilized by regulated telephone companies on a national basis. The telephone packet includes the complete origin and destination telephone numbers.

The basis of an automatic telephone routing system must include a means to automatically identify the telephone number of the calling party. Such a system is disclosed by Kaplan, U.S. Pat. No. 5,163,087. This system translates an Automatic Number Identification (ANI) of the calling party into a customer database key previously defined by the called party. The database key, e.g., customer account number, is then provided to the called party instead of the ANI information such that a computer at the called business can process the key to look up and present customer information to an agent of the business. This system assumes that the caller has called this business at a previous time to provide information to the agent of the business to create a customer record or other similar information. The Kaplan system delivers the database key to one business location rather than a plurality of service locations throughout the country. The delivery of the database key to the business requires an Integrated Services Digital Network (ISDN) or similar facility, which is an additional burden for the business.

An automatic routing system should not need to deliver a database key or message to the final destination, but would merely utilize the ANI information as an index to a table containing partitions of a country into small geographic areas, such as postal service zip+4 codes. These partitions would be further utilized to access one of a plurality of service locations that may be anywhere within the country.

A current system for telephone call routing is described in U.S. Pat. No. 4,757,267 to Riskin. Riskin employs automatic number identification (ANI) for routing calls from a caller to a dealer located within the same area code and prefix (first six digits of a 10-digit telephone number, the "6-digit number") as the caller. Because the area identified by the 6-digit number is fairly large and there may be several dealers within the area, the dealer location is usually selected from a list of several locations based on random selection, or weighted percentage assigned to each location. Alternatively, the caller is presented with a list of possible dealer locations for the large geographic area because the system does not know which service locations are closer than the others. Riskin uses the 6-digit number to determine the location of both the caller and the service location. Riskin assumes the location of the caller to be the location of the central office switch that services the caller's 6-digit exchange (which can be 0 to 5 miles from its true location), and assumes the location of the dealer location to be the location of the central office switch that services the dealer location's 6-digit exchange (which can be 0 to 5 miles from its true location) utilizing a coordinate system that is accurate to plus or minus 2300 feet. What is desired is a system that uses all ten digits of the calling and service location telephone numbers and the physical street address of the location of the numbers in connection with a GIS-type database (utilizing a coordinate system that is accurate to within 30 feet) to provide geographic precision to within 105 feet for the location of the calling and destination telephones.

Consequently there is a need for an automated telephone routing system that provides the ability to reduce costs by routing a very high percentage of calls made to a single national telephone number without any human intervention; the marketing advantage for a client of a single, easy to remember, toll free or nominal fee national telephone number; geographically precise results; and the ability of a business to choose among different types of destination service area definitions. Preferably, these service area definitions may include the closest service location to the caller within a predefined distance; all service locations within a specific radius of the caller; and a service location whose service area is defined as an irregular shaped polygon that may or may not overlap with any other polygons.

SUMMARY OF THE INVENTION

The above-mentioned needs are satisfied by the present invention which includes a system and method for automatically routing telephone calls from a caller to a service location.

The present invention provides a method of routing all published and unpublished telephone numbers, including unlisted numbers, secondary unpublished business lines, and public pay phones without any violation of federal, state and local laws. The present invention also provides a method for legally conforming to contracted franchise territory definitions executed between franchisers and franchisees by routing customer's calls precisely to the correct legal franchisee area. Additionally, the present invention provides a method for precisely routing telephone calls based on any geographic definition including postal geography, census geography, telecommunications geography, special grid coordinate geography, and all custom geography.

The present invention provides a method for automatically routing and processing customer calls that do not meet the pre-set client protocols. This "exceptions handling" process routes to a "live" operator who executes preset exceptions handling protocols. The present invention also provides for a method of integrating unrelated geographic information systems and database technology, telecommunications systems and database technology, postal systems and database technology, and computer technology into a common applications driven architecture. Additionally, the present invention provides a method for dynamically and instantaneously updating and integrating Client and Master Tables with no time lags. Furthermore, the present invention provides a method for automating the processing of information that is input by a customer using a customer interface that automatically routes telephone calls to customer requested destinations.

In one aspect of the present invention there is, in a telephone network, an automatic routing system, comprising means for receiving a calling number of a source location, means for converting the entire calling number into a spatial key, means for converting the spatial key into a client number of a destination location, and means for transmitting the client number to the telephone network, wherein the source location is connected to the destination location by the routed telephone call.

In another aspect of the present invention there is a call routing system, comprising a telephone network; a switch connected to the telephone network, the telephone switch having a computer with a memory; a master file comprising a plurality of records, each record having a caller telephone number field and a spatial key field, the master file stored in the computer; a client file comprising a plurality of records, each record having a spatial key field and a client telephone number, the client file stored in the computer; means, within the switch, for receiving a selected caller telephone number from the telephone network; means, within the switch, for linking the master table and the client table to produce a selected client telephone number, wherein the master table is indexed by the selected caller telephone number to provide a selected spatial key, and wherein the client table is indexed by the selected spatial key to provide a selected client telephone number; and means, within the switch, for transmitting the selected client telephone number to the telephone network.

In yet another aspect of the present invention there is, in a telephone network, a method of automatically routing a telephone call, comprising the steps of generating a client table comprising a plurality of records, each record comprising a spatial key and a client telephone number indicative of a service location, storing the client table and a master table comprising a plurality of records, each record comprising a calling telephone number and a spatial key, in the telephone network, receiving a selected calling telephone number from the network, indexing the master table with the selected calling telephone number to obtain a selected master table record, retrieving a selected spatial key from the selected master table record, indexing the client table with the selected spatial key to obtain a selected client table record, and retrieving a selected client telephone number from the selected client table record.

In another aspect of the present invention there is a table generation process, comprising the steps of providing a plurality of service locations comprising two coordinates, each location having a specified service area; windowing the coordinates with a plurality of prestored spatial key windows, each window having an associated spatial key list, each spatial key list having one or more spatial keys, wherein the spatial key is indicative of a spatial key area, thereby providing a selected spatial key list; intersecting spatial key windows with the service area; and creating a client table record including one of the spatial keys from the spatial key list of an intersected spatial key window and the client telephone number of the service area.

BRIEF DESCRIPTION OF THE DRAWINGS

FIG. 1a is a block diagram of the files utilized in the presently preferred Client Table build process of the present invention;

FIG. 1b is a block diagram of a portion of a dynamic central switch linking process of the present invention that uses the result of the table build process of FIG. 1a;

FIG. 1c is a system level diagram of a presently preferred embodiment of the central switch linking process interconnecting a calling telephone and a destination telephone of the present invention;

FIG. 11 is a flow diagram of the service location closest to the caller function indicated at 196 in FIG. 3;

FIG. 12b is a block diagram of the files utilized in the process of FIG. 12a;

FIG. 13 is a diagram illustrating an example area utilized in the description of the process shown in FIG. 12a;

FIG. 14 is a flow diagram of the zip window list function indicated at 612 in FIG. 12a;

FIG. 16 is a flow diagram of the initial zip list function indicated at 614 in FIG. 12a;

FIG. 18 is a flow diagram of the final zip list function indicated at 616 in FIG. 12a;

FIGS. 19a and 19b are a flow diagram of the line index file function indicated at 618 in FIG. 12a;

FIG. 20 is a flow diagram of the zip+4 site polygon check function indicated at 620 in FIG. 12a.

DETAILED DESCRIPTION OF THE PREFERRED EMBODIMENTS

The following detailed description of the preferred embodiments presents a description of certain specific embodiments to assist in understanding the claims. However, the present invention can be embodied in a multitude of different ways as defined and covered by the claims.

Reference is now made to the drawings wherein like numerals refer to like parts throughout.

For convenience, the discussion of the preferred embodiments will be organized into the following seven principal sections:

I. System Overview;
II. Routing Example;
III. General Client Table Build Process;
IV. Client Table Build Process for a Radius Defined Service Area;
V. Client Table Build Process for the Service Location Closest to the Caller Within a Distance Limit;
VI. Client Table Build Process for a Polygon Defined Service Area; and
VII. Summary.

I. System Overview

The present invention includes an automated telephone routing system which receives input from a common carrier, such as AT&T and AT&T American Transtech. This input includes an updated national list of telephone numbers, telecommunication infrastructure, and exception handling support.

A system and method for automatically and seamlessly routing a telephone call from a calling telephone to a destination telephone selected by a client will be described. In addition, a method of creating the tables utilized by the routing system, according to criteria established by the client, will also be described.

Figure 1E:
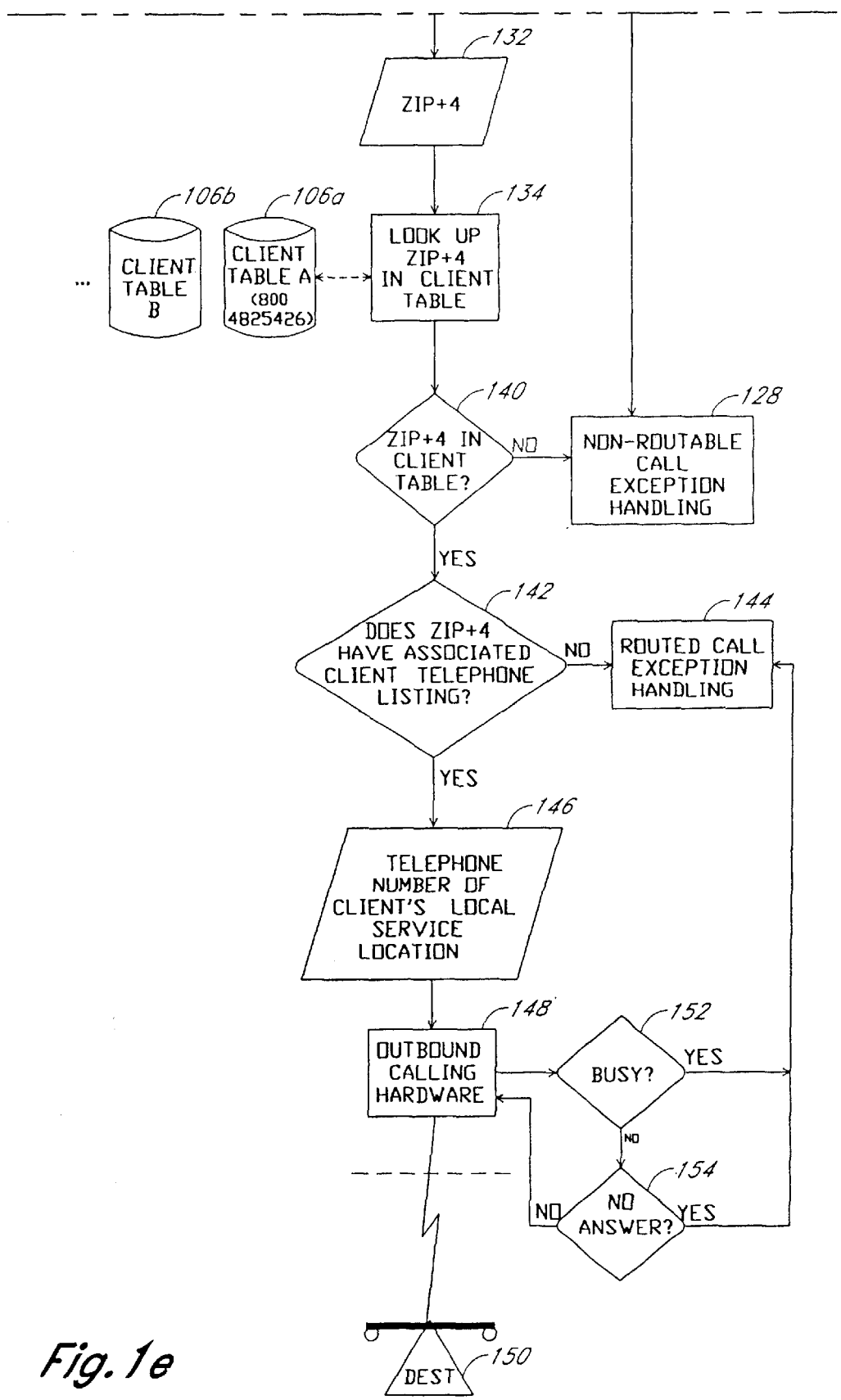

Referring to FIG. 1a, the number of calculations to be performed and permutations that must be tested is reduced in creating the calling telephone number-to-service location telephone number tables used in the "1-800" routing of the present invention. Accordingly, a zip windows file 104 (FIG. 1a) and a process 105 to spatially access and operate on this file are a part of the present invention. It will be understood that the zip windows file 104 is just one embodiment of a spatial windows file which could include different types of spatial keys. The zip windows file 104 contains a list of all zip codes that potentially touch a tenth of a degree (0.1°) latitude and longitude spatial window. By utilizing a set of latitude and longitude extremes (minimums and maximums) for a service area in process 105, a list of 5-digit zip codes that could overlap with the service area is generated. It is then only necessary to calculate distance or perform a point-in-polygon calculation between each service location and a small subset of zip+4 codes contained within each service area's returned list of 5-digit zip codes. File 104 and process 105 will be explained further and an example given hereinbelow.

Update problems and costs associated with continually updating and periodically rebuilding a hundred million plus record, telephone number-to-telephone number table for each business or client using the automated telephone routing system is solved by creating a dynamically linked, updatable system. Instead of creating a telephone number-to-telephone number table for each client, two tables linked by zip+4 codes, as shown in FIG. 1b, are created. A telephone number with its corresponding physical street address is assigned to a zip+4 code, and a Master Telephone Number to Zip+4 Table 107 (FIG. 1b) (the "Master Table") is built using the Postal Service's Zip+4 Address coding Guide, and commercially available software, e.g., CODE-1® available from GROUP 1 Software, Inc. The preferred Master Table, presently maintained by AT&T American Transtech, is indexed or keyed by telephone number, and is updated on a daily basis. When phone numbers are added, changed or deleted, the table is updated. This table is also updated on a periodic basis to handle the approximate one hundred 5-digit zip code changes per quarter year, e.g., when a new zip code is created, telephone numbers in the new code area must be assigned a new zip+4 code. This represents a fairly small amount of change in relation to the 43,000 zip codes (5-digit) in the United States. At routing time, the present system allows all clients to use the same Master Telephone Number to Zip+4 Table 107.

Independently, and on an individual client basis, each of over 20 million zip+4 codes is assigned, based on their latitude and longitude centroid coordinates, to one or more service locations using standard distance or point in polygon calculations. Hence, the present invention builds a Client Zip+4 to Service Location Telephone Number Table 106 (the "Client Table", FIGS. 1a and 1b). A different table is built for each client or for every "1-800" telephone number that a client may have. The client selects the type of service area definition that is desired for his needs. Three different types of service area definitions are presently utilized: (1) the closest service location to the caller within a predefined distance; (2) all service locations within a specific radius of the caller (there may not be any service location within a particular radius); (3) and a service location whose service area is defined as an irregular shaped polygon that does not overlap with any other polygons. The polygon service area is typical of a franchise type business. The building of Client Tables using these service area definitions will be described hereinbelow.

The Client Table 106 is then preferably provided to AT&T American Transtech for centralized routing at a telephone switch. This table is indexed or keyed by zip+4 code and is updated for each client as they add and delete locations, when they change telephone numbers, and on a periodic basis to handle Post Office zip code changes.

Using the presently preferred system, both the Master Table 107 and the Client Tables 106 are independently maintained by separate organizations. Using the zip+4 code as a spatial key linkage, a calling phone number in the Master Table 107 is then dynamically linked, as shown in FIG. 1b, to a service location phone number in the Client Table 106 and the call is automatically routed. The spatial key is a single number that identifies a specific geographically defined area, line, or point that is defined by a set of coordinates. For simple geographies like points and rectangles the spatial key can be a coded version of the coordinate description of the geography.

The postal zip+4 code is the preferred spatial key used to link the master table to the client table, but there are other small geographic areas capable of having unique spatial keys, such as zip+6 code areas, census blocks, or very small latitude/longitude grids, tiles, windows, or quad-trees. This two-table indexing approach provides a much higher automated routing rate and a higher percentage of correctly routed calls in an environment where consumers are continually moving and businesses are opening, closing, and/or moving. In addition, the two-table indexing approach also acts as a "fire wall" or buffer between regulated telephone number information and client marketing information to satisfy government regulations.

The system of the present invention directly routes the telephone call from the caller to the closest service location in approximately 40 milliseconds using the AT&T telecommunications network. The system described by Riskin intercepts the call with a private switch, answers the call with a client recorded message and asks the caller to wait, while it takes approximately 15,000 milliseconds to find the closest service location and then call forwards the call to the service location.

To route a call, the system of the present invention looks up the caller's 10-digit telephone phone number in its 100,000,000 plus record Master Table, retrieves the spatial key that identifies the location of the caller's phone, looks up the spatial key in the 20,000,000 plus record Client Table, and retrieves the telephone number of the location that services the caller's spatial key or location. The system described by Riskin looks up the caller's 6-digit exchange in its 13,000 record Exchange file having only 2,500 unique coordinates, retrieves the V-H (vertical-horizontal) coordinates of the exchange, interleaves the V-H coordinates, and starts a binary-iterative, V-H key based, size search of the N record client service location database. The Riskin system iterates through this process, adjusting the size of the geographic areas searched, until it retrieves a number of service locations that fall within a predetermined range. Riskin then calculates the distance to each service location. If more than one location fits the criteria to be considered the closest distance, one location is randomly selected as the closest service location.

II. Routing Example

Figure 2:
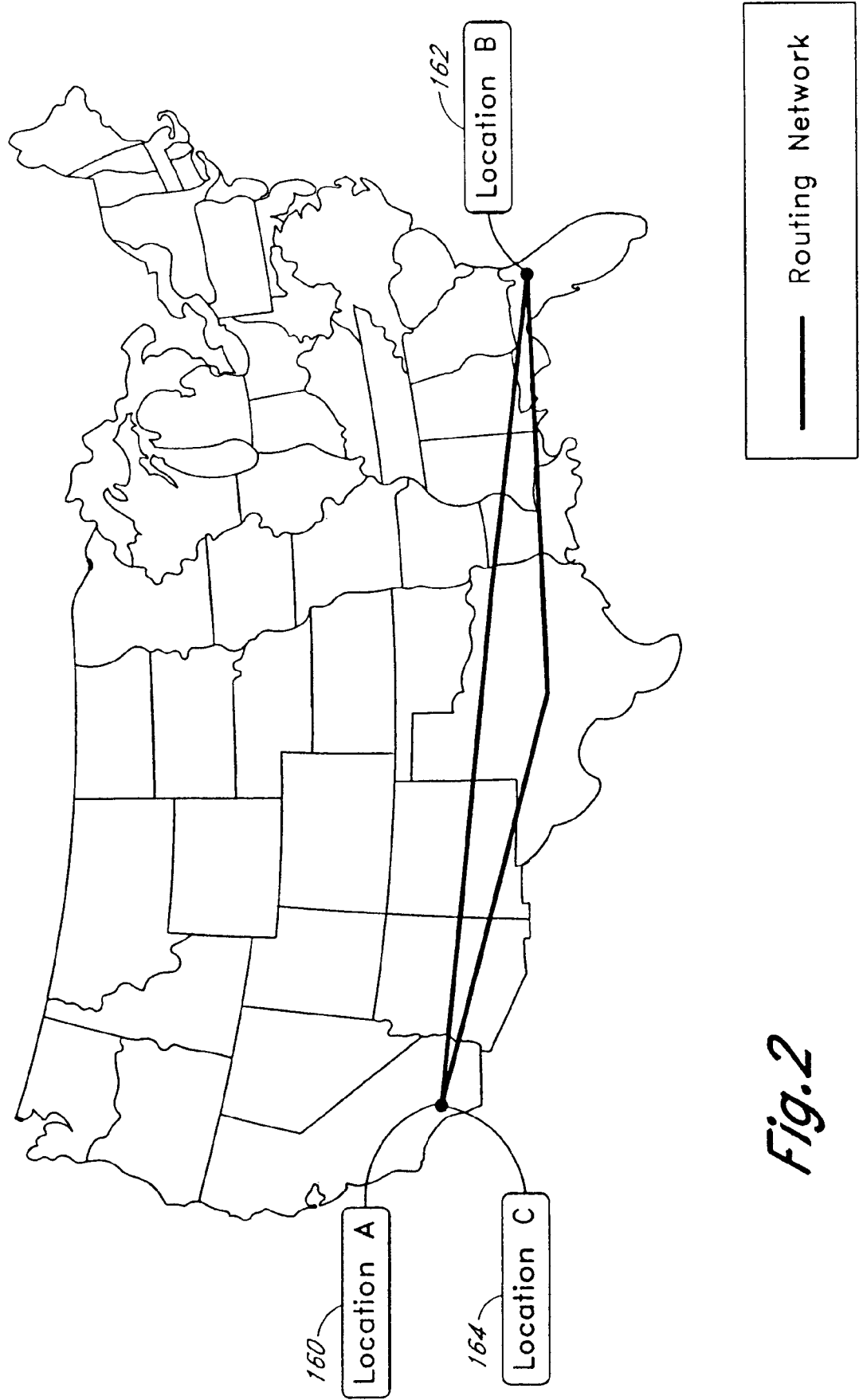
FIG. 2 is a map diagram illustrating an example of a routing network for the system of FIG. 1c.

Prior to discussing the building of Client Tables in more detail, it will be helpful to first discuss use of this table and the Master Table in a "1-800" routing example. Referring to a central switch process 108 shown in FIG. 1c and a routing network shown in FIG. 2, an example of telephone call routing will now be given. In this example, a caller dials 1-800-Italian to order a "MyPizza" pizza from his phone (619-755-5666) located at 498 Stevens Avenue in Solana Beach, Calif. 92075-2064. Of course, the present invention is not limited to use of "800" telephone numbers as other numbers may be used in other embodiments.

FIG. 1c includes process states and also data at 114, 132, and 146, indicated by parallelogram blocks. Also, the central switch process is handled inside a switch as will be described below.

The steps involved in having this call automatically routed to the caller's local MyPizza Restaurant are as follows:

1. A caller at "Location A" 160 (FIG. 2), dials 1-800-Italian at block 110 (FIG. 1c) to order, for example, a pizza.

2. Based on the 1-800 dialed and the caller's long distance carrier, the call is routed by various telephone companies to an intelligent central switch in Jacksonville, Fla., indicated on FIG. 2 by "Location B" 162. The process associated with the switch is shown in FIG. 1c as being below the dotted line just before state 112 and above the dotted line just after state 148. The central switch 111 is preferably a "4 ESS™" digital switch available from AT&T. The switch includes a general purpose computer (not shown) such as a network control point computer with a memory.

3. Once the Jacksonville switch has the call, it pulls the caller's telephone number from the calling information packet 114, by call decoding hardware 112 which performs Automatic Number Identification (ANI). The preferred information packet 114 corresponds to the operation parameter field of the SS7 TCAP message available at the switch 111. The hardware to perform ANI is described in U.S. Pat. No. 5,163,087 to Kaplan, and is hereby incorporated by reference. The number equivalent of 1-800-Italian is 1-800-482-5426, and the information packet looks as follows:

Packet: . . . 6197555666 . . . 18004825426 . . .

If the caller is using a non-Touch Tone telephone, the Caller ID or ANI is "000 000 0000". The "1-800" number is an IN-WATS (inbound wide area telephone service) number and must be translated by a wide area carrier to a POTS (plain old telephone service) number to be routed to the switch 111. Upon receiving the POTS number, the switch 111 translates the number back to the WATS format.

4. Then, at decision state 116, the process 108 determines whether the client has chosen to give the caller an option to enter a telephone number on a Touch Tone telephone keypad or other means. In other embodiments, other characters are entered, such as a credit card number, an account number, or product order information, to enable other features of the system. In the presently preferred embodiment, the telephone number represents the location where the caller desires, for example, a product to be delivered or a service to be performed. As an example, if a client had a telephone number such as 800-FLORIST and desires the optional input feature, the caller could choose to have the flowers delivered to the address corresponding to a caller entered telephone number. If the decision state 116 is determined to be true, the process 108 moves to state 118 to capture the telephone number entered by the caller. This number is then used in place of the calling number in the information packet for further handling. However, if the decision state 116 is determined to be false, the original calling number is unchanged, and the process 108 moves to a decision state 120.

5. At decision state 120, the process 108 determines if the calling number in the information packet is that of a mobile telephone. A file in the computer of the switch 111 listing mobile telephone numbers is presently maintained by AT&T American Transtech and is updated on an as-needed basis. Mobile telephones are assigned a number from a set of prefixes unique to each area code in the U.S. Therefore the mobile telephone number file only needs to contain the area code and prefix combination (6 digits) to identify that the calling number is that of a mobile telephone. Because the mobile telephone user, as determined at decision state 120, is not associated with a fixed location, the process 108 moves to a state 128 for handling non-routable exceptions. An operator will then request location information from the mobile telephone caller. Additional information about state 128 will be provided below. If the caller is not using a mobile telephone, the process 108 continues from state 120 to state 122.

6. At state 122, the process 108 looks up the caller's telephone number preferably using the well-known Indexed Sequential Access Method (ISAM) to index the Master Telephone Number to Zip+4 Table 107 (FIG. 1b). ISAM is a well known method of searching described in the book *Operating System Concepts* by Peterson and Silberschatz. Other searching techniques may be used in other embodiments. The Master Table 107 was described in the System Overview section. As an example, a segment of a Master Table 107 is shown in Table 1. This table is indexed by phone number and also contains the zip+4 code 132 of the physical address where the calling phone is physically located.

TABLE 1

Example: Master Telephone Number to Zip + 4 Table segment

| | Phone # | Zip + 4 |
|---|---|---|
| | . | . |
| | . | . |
| | . | . |
| | 6197555664 | 920751111 |
| | 6197555665 | 920141313 |
| > | 6197555666 | 920752064 |
| | 6197555668 | 920071234 |
| | . | . |
| | . | . |
| | . | . |

7. A test is performed at a decision state 126 to determine if the calling number is listed in the Master Table 107. If not, the process 108 moves to state 128 wherein operator assistance is provided to route the call. The non-routable exception handling at state 128 is for situations wherein a Master Table 107 or Client Table (FIG. 1a) entry is missing, incorrect, or the caller is using a mobile telephone. In the presently preferred embodiment, operator assistance is provided by AT&T American Transtech. In general, only a small percentage of the calling numbers are not listed in the Master Table 107. If the calling number is listed in the Master Table 107, the process 108 advances to a decision state 130 to determine if there is a zip+4 code 132 corresponding to the calling number in the packet 114. If not, the process 108 moves to state 128 wherein operator assistance is provided to route the call as mentioned previously. If a zip+4 code 132 is located in the Master Table 107, the process 108 moves on to state 134.

8. Since the information packet 114 also contains the number dialed, at state 134 the process 108 opens the Client Zip+4 to Service Location Table A 106a that is associated with the client having the telephone number 800-482-5426. The Client Table 106 is selected from a plurality of Client Tables based on the telephone number dialed by the caller. Client Table B 106b and additional tables, as necessary, are for other clients or other phone numbers, e.g., another "800" number, of the same client. The Client Tables are built by the assignee of the present invention, the client, or a third party to the assignee's specifications. There are two types of Client Tables. If calls are to be routed to the closest location or to a service location servicing a non-overlapping polygon trade area, the first type of Client Table contains only a single entry per zip+4 code with its corresponding service phone number 146 and distance. In cases where the client wants a random or weighted selection, from multiple selections, whose service areas service the caller or provide the caller a choice, the second type of Client Table can have multiple records per zip+4 code, with each record having a different service telephone number and distance. The process 108 looks up the caller's zip+4 code in the MyPizza Client Table 106a using the Indexed Sequential Access Method.

9. A test is performed at a decision state 140 to determine if the zip+4 code 132 is listed in the Client Table 106a. If not, the process 108 moves to state 128 wherein operator assistance is provided to route the call. If the zip+4 code is in the Client Table 106a, the process 108 proceeds to a decision state 142 to determine whether there is a client telephone listing for the zip+4 code 132. If not, the process 108 moves to state 144 wherein operator assistance is provided to route the call, provide information, or take other action as determined by the client. A negative test result determined at state 142, may arise, for example, if there is no service location within a client specified radius of the calling party. The exception handling at state 144 is for situations where the call is correctly routed, but the calling party does not get what is expected, i.e., the call is not satisfactorily completed (as in states 142, 152, and 154). In these situations, the client may select from a set of alternatives that can be handled by an automated process. An example exception handling message is as follows: "We are sorry, but there is currently no service location within your area. If you desire to talk to a representative, please press zero."

If there is a client telephone number associated with the zip+4 code 132, the process 108 advances to state 148. As an example, a segment of Client Table 106a is shown in Table 2.

TABLE 2

Example: 800-482-5426 Client Table segment

|   | ZIP + 4 | Phone # | Distance in miles |
|---|---|---|---|
|   | . | . | . |
|   | . | . | . |
|   | . | . | . |
|   | 920752060 | 6199423366 | 3.1456 |
|   | 920752062 | 6199423366 | 2.1682 |
| > | 920752064 | 6194817777 | 1.2864 |
|   | 920752065 | 6197591111 | 0.1234 |
|   | . | . | . |
|   | . | . | . |
|   | . | . | . |

10. After finding the caller's zip+4 code 132 and the corresponding service telephone number 146, the switch, at state 148, sends the information packet over the telephone network to ring at the telephone associated with the number 619-481-7777.

11. At block 150, the telephone at MyPizza located at 2688 Via De La Valle in Del Mar, Calif. 92014-1909, "Location C" 164 (FIG. 2), rings.

12. If the telephone at the client service location is "busy" 152 or there is "no answer" 154, the process 108 proceeds to the exception handling state 144 as described previously. At the client's request, the exception handling at state 144 may, for instance, route the call to the next closest service location. Otherwise, if the "busy" or "no answer" conditions are false, the telephone call is answered and the caller may, for example, order a pizza.

III. General Client Table Build Process

The process 105 (FIG. 1a) of creating or building a Client Table 106 for each client or each "800", or similar number, for the client will now be described. This process is preferably performed on a general purpose computer, e.g., a personal computer. Such a personal computer preferably has at least an Intel 80486 class processor, at least 16 Megabytes (Mb) of memory, and has a minimum of one Gigabyte of mass storage. As previously mentioned, the present invention includes definitions for three different types of service area. A build process will be discussed for each type of service area definition. An example of the process steps will be given using a fictitious food service business.

The process for each type of service area definition utilizes four input files as shown in FIG. 1a. The zip+4 centroid file and zip windows file were briefly discussed in the System Overview section. Each input file is now further described. The following discussion again refers to FIG. 1a.

A. Client Service Locations File

The first file is a client service locations file 109 containing a list of service locations provided by the client. The service locations are defined by either a latitude/longitude location with a radius, or a latitude/longitude polygon, depending on the build process type. Further detail about file 109 is provided in conjunction with state 174 of FIG. 3 (radius) and state 604 of FIG. 12a (polygon).

B. Zip+4_Lat_Lon Centroid File

The second file is the zip+4 latitude and longitude centroid file 100 or zip+4_lat_lon centroid file previously described. This file is available from the U.S. Postal Service or from, for example, Geographic Data Technology, Inc. (GDT).

C. Zip Array File

The third file is a zip array file 103 created from the zip+4 latitude and longitude centroid file 100 and provides three benefits that improve processing efficiency.

The first benefit is building an array where the row number of the array is equal to a 5-digit zip code. This provides a very efficient method of indexing to a 5-digit zip code where the 5-digit zip code number is the row number of the array.

The second benefit is once the 5-digit zip code is accessed in the array, the exact byte offset of where the first zip+4 code for this 5-digit zip code starts in the zip+4 latitude and longitude centroid file 100 is known. Using this method, it is very efficient to advance to the location of the first zip+4 record and read all the zip+4 records for a 5-digit zip code in the over 20 million record zip+4 latitude and longitude centroid file 100.

The third benefit of the zip array file 103 is that for each five digit zip code, the file contains the latitude and longitude minimums and maximums for all the zip+4 codes in the 5-digit zip code. By checking to see if a radius or a polygon service area set of extremes overlap with the 5-digit zip code extremes, testing each zip+4 in a 5-digit zip code is eliminated, if it is determined beforehand that there is no spatial overlap between the zip+4 extremes in a 5-digit zip code and the radius or polygon service area.

The zip array file 103 is created using the GDT or Post Office supplied zip+4 latitude and longitude zip+4 centroid file 100. Each record in the centroid file 100 contains a zip+4 number, and the latitude and longitude defined centroid for each zip+4. A four step, zip array file build process 101, as follows, is used to create the zip array file 103:

1.) A 32-bit integer array of 99,999 rows and 6 columns is initialized to zero. Column one is initialized to the row number which is then utilized as the 5-digit zip code.

2.) For a 5-digit zip code, every zip+4 record in the zip+4 latitude and longitude centroid file 100 is read in a sequential manner. The byte offset for the first zip+4 within the 5-digit zip code is noted. Temporary variables are initialized and then used to determine the latitude and longitude minimums and maximums of the zip+4 centroids for the current 5-digit zip code. The greatest and least of both the latitudes and longitudes among all zip+4 codes for the current 5-digit zip code are then passed on to the next step.

3.) With each change in 5-digit zip code, the byte offset for the first zip+4 within a 5-digit zip code and the latitude and longitude minimums and maximums for all zip+4 codes within a five digit zip code are written to memory for the previous 5-digit zip code to its location in the zip array file 103. The latitude and longitude minimum and maximum values are then reinitialized, and the previous and current steps are repeated with the next 5-digit zip code until the end of the zip+4 centroid file 100 is reached.

4.) Upon reaching the end of the zip+4 centroid file 100, the last 5-digit zip code record is written to memory, and then the zip array file stored in memory is written to a mass storage device such as a magnetic disk.

The column definitions for each row of the zip array file 103 are as follows:
- column(1) is the 5-digit zip code number;
- column(2) is the byte offset into the zip+4_lat_lon centroid file 100 of the location of the lowest numbered zip+4 for the 5-digit zip code of that row;
- column(3) is a minimum latitude for the zip code of that row (zip_lat_min);
- column(4) is a maximum latitude (zip_lat_max);
- column(5) is a minimum longitude (zip_lon_min); and
- column(6) is a maximum longitude (zip_lon_max).

D. Zip Windows File

The fourth file is the zip_windows file 104. The purpose of this file is to build a linkage between a latitude and longitude defined area on the earth and the zip codes that could theoretically touch this area. This linkage provides benefit by making spatial computer searches of postal geography much faster and much more efficient.

The zip_windows file 104 is created from the GDT or Post Office zip+4 latitude and longitude centroid file 100 using latitude and longitude, digitized polygon zip code boundaries. The general concept is to divide the earth into one tenth of one degree (0.1°) latitude and longitude rectangles, which, for example, are approximately 6.9 miles by 5.2 miles in dimension at 40° latitude, and then tabulate all zip codes that overlap each rectangle.

The zip_windows file 104 is created by a zip windows file build process 102 that reads each record from the over 20 million record zip+4 centroid file 100 and writes a corresponding record that contains a latitude and longitude (lat/lon) window and a 5-digit zip code. The lat/lon window field is created by multiplying the latitude in degrees times 10, taking the integer portion (INT) of the product, multiplying the integer portion by 10,000, and then adding the integer portion of the product of the longitude in degrees times 10.

For example, if the input zip+4 record is 920141909, the latitude is 32.9862 North and the longitude is 117.2522 West, the output zip_window record would be 3291172 for the lat/lon window and a zip code of 92014. After all records have been written to an initial or temporary zip_windows file (not shown), the file is then sorted by the lat/lon window value or key with the corresponding 5-digit zip code, and duplicate records are eliminated. The resultant final zip_windows file 104 is then written with each record composed of the lat/lon window key and the corresponding 5-digit zip code. Four lat/lon windows 210, 212, 214, 216, corresponding respectively to zip window keys 3301172, 3301171, 3291172, 3291171, are illustrated in FIG. 4.

Now that the input files utilized by the Client Table build process have been described, each of the three different service area definition build processes will be described.

IV. Client Table Build Process for a Radius Defined Service Area

Figure 3:
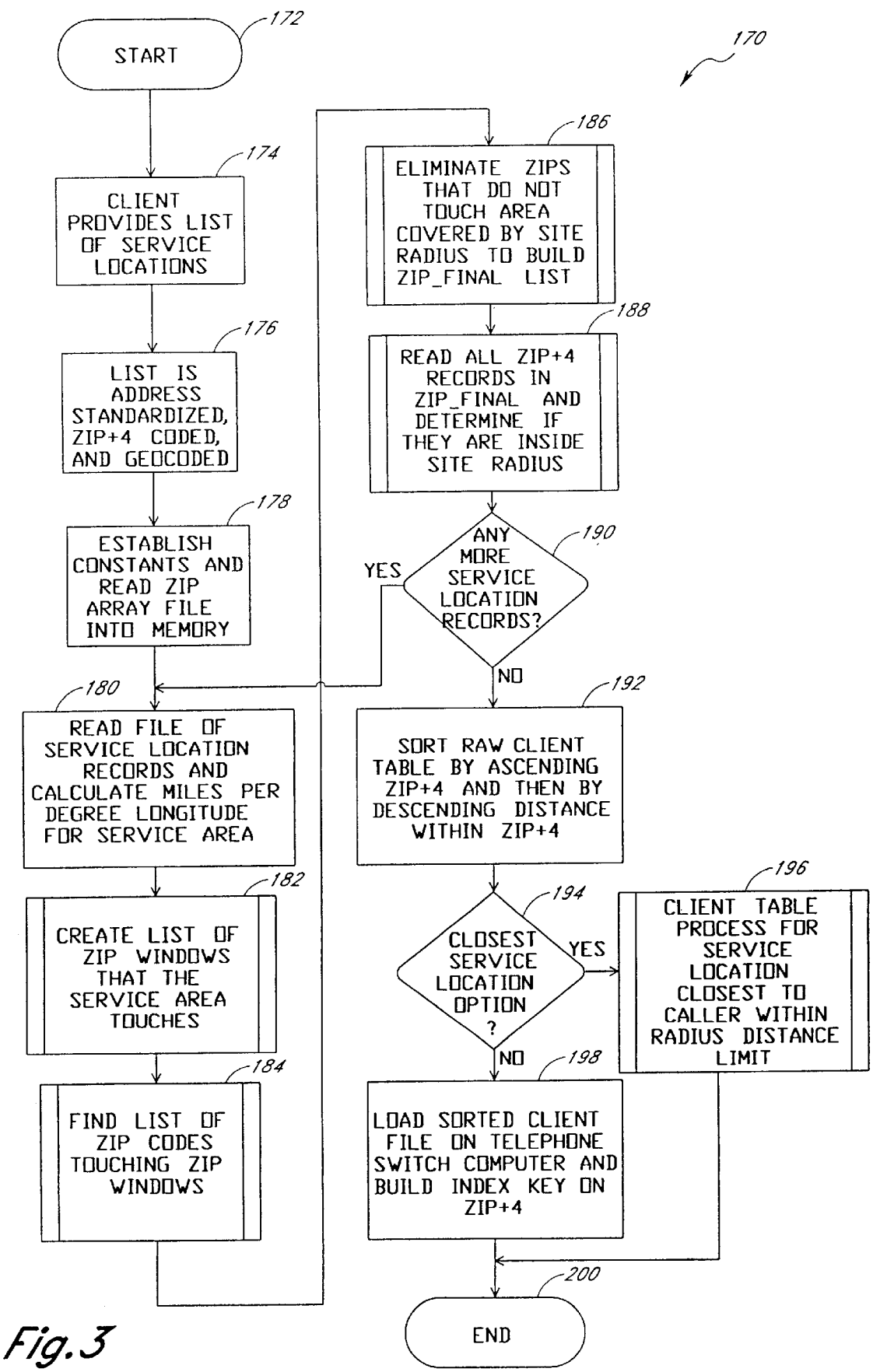
FIG. 3 is a top-level flow diagram of a process to build a client table using radius defined service areas for the system of FIG. 1c.
Figure 4:
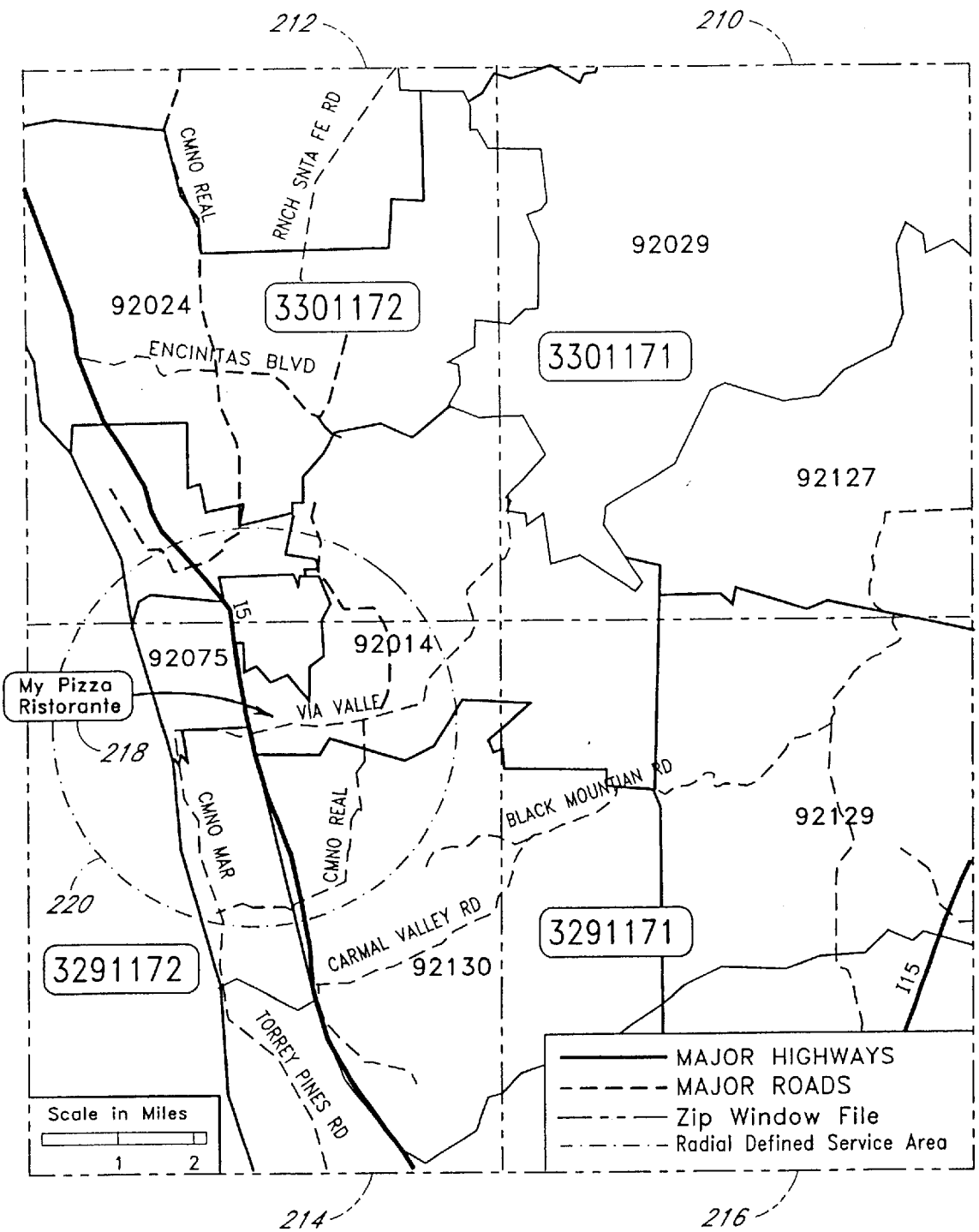
FIG. 4 is a map diagram illustrating an example area utilized in the description of the process shown in FIG. 3.

Referring generally to FIGS. 3 and 4, a Client Table Process 170 for a radius defined service area will be described. Process 170 is a specific version of the client table build process 105 shown in FIG. 1a.

The process 170 begins at a start state 172 and moves to state 174 wherein a client provides a client service locations file 109 (FIG. 1a) of service locations in machine readable form with information and format as shown in Table 3. The file 109 can be created by, for example, a commonly available word processing program or a database program, and submitted on a floppy disk or other suitable media. Table 3 includes example information for a service location 218 named MyPizza Ristorante. The map of FIG. 4 illustrates some of the same information including a circle 220 to show a 2.5 mile radius from the MyPizza Ristorante as the service area.

TABLE 3

| Record layout in ASCII Characters | |
| --- | --- |
| Name of Service Location (30) Bytes | My Pizza Ristorante |
| Address (36) Bytes | 2688 Via De La Valle |
| City (30) Bytes | Del Mar |
| State (2) Bytes | CA |
| Zip Code (9) Bytes | 92014 |
| Telephone # (10) Bytes | 6194817777 |
| Radius in tenths of miles (4) Bytes | 25 |

Of course, other forms, information, and formats may be substituted in other embodiments.

The process 170 moves to state 176 wherein the list of service locations in file 109 is address standardized, zip+4 coded, and latitude and longitude geocoded using commercially available services through companies such as Group I and Geographic Data Technology. Table 4 is an example of a standardized record with latitude and longitude appended.

TABLE 4

| | |
| --- | --- |
| Name of Service Location (30) Bytes | MY PIZZA RISTORANTE |
| Address (36) Bytes | 2688 VIA DE LA VALLE |
| City (30) Bytes | DEL MAR |
| State (2) Bytes | CA |
| Zip Code (9) Bytes | 920141909 |
| Telephone # (10) Bytes | 6194817777 |
| Radius in tenths of miles (4) Bytes | 25 |
| Latitude in degrees (10) Bytes | 32.9862 |
| Longitude in degrees (12) Bytes | −117.2522 |

Moving to state 178, the process 170 establishes the constant of 68.9404 miles per degree latitude and reads the zip array file 103 (FIG. 1a) into memory of the computer. At state 180, the process 170 reads a record from the file of service location records and calculates the number of miles per degree longitude for the service location. The miles per degree longitude=68.9404*COSINE(latitude). For the example given in Table 4, at 32.9862 degrees latitude, the result is 57.8297 miles per degree longitude.

The process 170 proceeds to a function 182 which creates a list of zip windows that the service location touches. Touching a zip window means that at least part of the service area is in or overlaps the zip window. The zip windows 210, 212, 214, 216 for the example given in Table 4 are illustrated in FIG. 4. The function 182 will be further described in conjunction with FIG. 5 hereinbelow.

Moving to a function 184, the process 170 generates a list of 5-digit zip codes that touch any of the zip windows identified by function 182. This zip list is sorted in ascending order and duplicate zip codes are removed in the function 184. The function 184 will be further described in conjunction with FIG. 7 hereinbelow.

The process 170 proceeds to a function 186 wherein 5-digit zip codes that are not within the service location site radius specified in state 174 are removed from the zip list generated by function 184, and a zip final list is created. The function 186 will be further described in conjunction with FIG. 9 hereinbelow.

Advancing to function 188, the process 170 retrieves all the zip+4 records corresponding to the zip codes in the zip final list (generated by function 186), used in conjunction with a zip pointer list (also generated by function 186), and determines if the zip+4 is at or inside the service area radius. This determination also yields the distance from the service location to the zip+4 centroid (recalling that the zip+4 centroids are stored in the zip+4 centroid file 100). If the zip+4 is determined to be at or inside the service area radius, a raw Client Table record is written that includes the zip+4 code, the client telephone number for the instant service location, and the distance of the zip+4 centroid to the service location. The function 188 will be further described in conjunction with FIG. 10 hereinbelow.

The process 170 moves to a decision state 190 to determine if additional client service records are to be processed. If so, the loop of states 180 to 188 is repeated for the next service location record. If all service location records have been processed for the instant Client Table, the process 170 advances to state 192. At state 192, the process 170 sorts the raw records, written by function 188, by ascending zip+4 code and then by descending distance if the same zip+4 code is listed more than once. The same zip+4 code could be listed more than once if there are multiple service locations, each with a different client telephone number, within the client specified, radius defined service area.

Up to decision state 194, the process for building a Client Table 106 is identical for both the radius defined service area and for the service location closest to the caller within a distance limit.

At decision state 194, if the client selects the service location closest to the caller, the process 170 moves to a function 196 to finish the Client Table build process. The function 196 will be further described in conjunction with FIG. 11 hereinbelow.

If the client selects the radius defined service area at decision state 194, the process 170 moves to a state 198 wherein the sorted Client Table from state 192 is loaded into the computer in the telephone network switch 111 (FIG. 1c), and an index key on the zip+4 codes is built. Upon completion of either function 196 or state 198, the Client Table build process ends at state 200.

Figure 5:
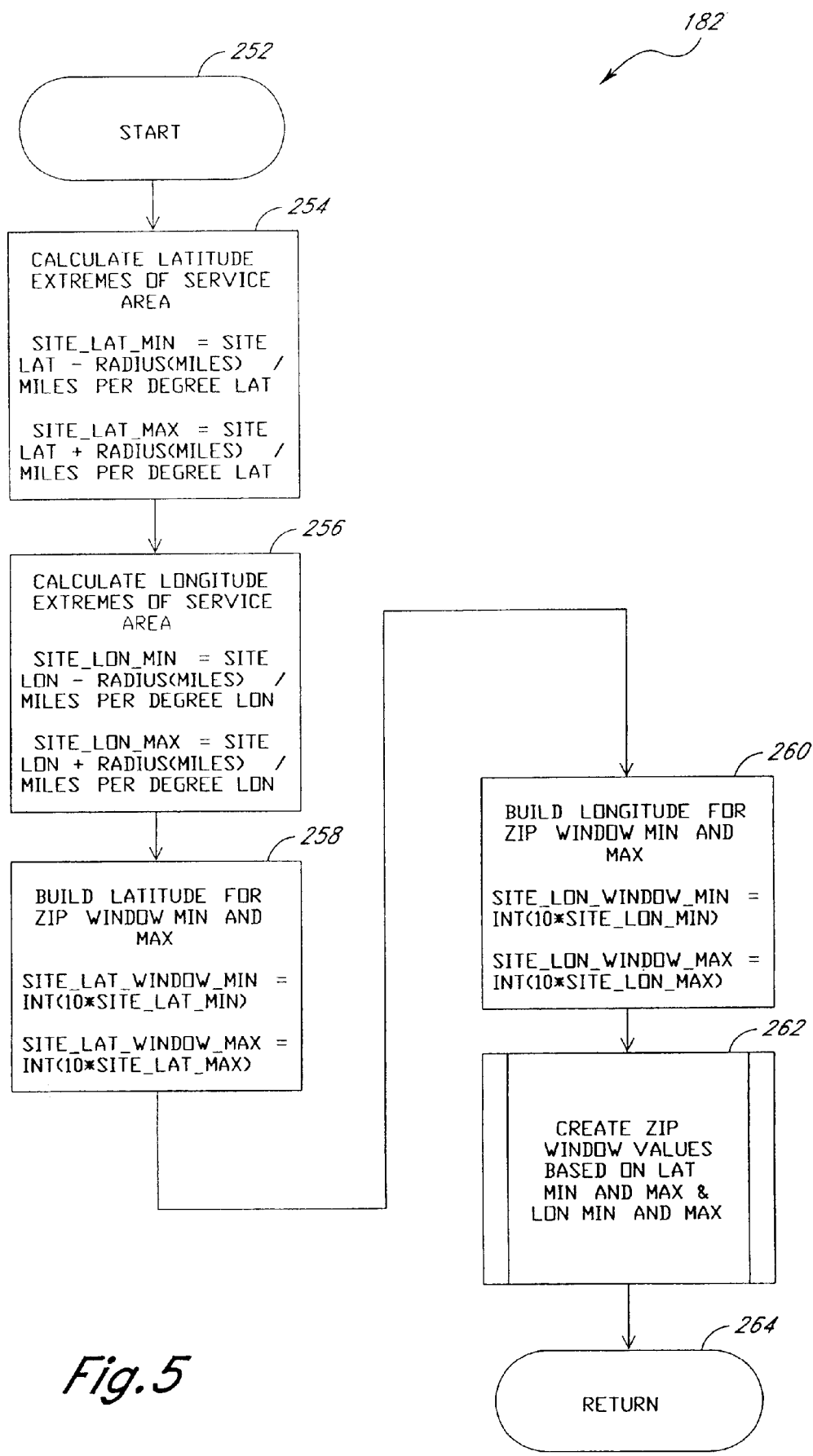
FIG. 5 is a flow diagram of the zip window list function indicated at 182 in FIG. 3.

Referring generally to FIG. 5, the function 182 defined in FIG. 3 will be described. Function 182 generates a list of zip windows that the site touches by first calculating site latitude and longitude extremes. For this calculation, the absolute value is used for both the latitude and longitude.

In another embodiment of the present invention, a prefix is assigned to the window key based on the sign of the latitude or longitude. The United States is located in the Northwest quadrant, and the key for this quadrant is zero(0). A leading zero has no impact on the value of the numeric key. The other quadrants are Northeast, east of the prime meridian at Greenwich, England in the Northern hemisphere; Southwest, west of the prime meridian in the Southern hemisphere; and Southeast, east of the prime meridian in the Southern hemisphere.

Since almost all countries of the world are only in one quadrant, using the absolute value of the latitude and longitude works well. In the few countries that are exceptions (that are in two quadrants), a different coordinate system may be used, e.g., the Ordinance Survey system used in the United Kingdom.

Beginning at a start state 252 shown in FIG. 5, the process 170 moves to a state 254 to calculate latitude extremes of the service area. Several abbreviations will be used hereinforward: "min" for minimum, "max" for maximum, "lat" for latitude, and "lon" for longitude.

$$Site\_lat\_min = site\_lat - radius(miles)/miles \text{ per degree lat};$$

$$Site\_lat\_max = site\_lat + radius(miles)/miles \text{ per degree lat}.$$

Computation for the example service location and radius given in Table 4 yields:

$$Site\_lat\_min = 32.9862 - 2.5/68.9404 = 32.9499;$$

$$Site\_lat\_max = 32.9862 + 2.5/68.9404 = 33.0228.$$

The process continues at state 256 wherein longitude extremes of the service area are calculated:

$$Site\_lon\_min = site\_lon - radius(miles)/miles \text{ per degree lon};$$

$$Site\_lon\_max = site\_lon + radius(miles)/miles \text{ per degree lon}.$$

Computation for the example service location and radius given in Table 4 yields:

$$Site\_lon\_min = 117.2522 - 2.5/57.8297 = 117.2089;$$

$$Site\_lon\_max = 117.2522 + 2.5/57.8297 = 117.2954.$$

Moving to states 258 and 260, the process 170 builds values for zip window minimum and maximum based on the site latitude and longitude, respectively. Computation using the above example and results yields:

$$Site\_lat\_window\_min = Int(10*site\_lat\_min) = 329;$$

$$Site\_lat\_window\_max = Int(10*site\_lat\_max) = 330;$$

$$Site\_lon\_window\_min = Int(10*site\_lon\_min) = 1172;$$

$$Site\_lon\_window\_min = Int(10*site\_lon\_max) = 1172.$$

Moving to a function 262, the process 170 generates zip windows based on latitude min and max values, and longitude min and max values and stores them in a zip_windows_list, which is distinct from the zip_windows file 104 (FIG. 1a). Function 262 will be further described below in conjunction with FIG. 6. The function 182 returns at state 264 to FIG. 3.

Figure 6:
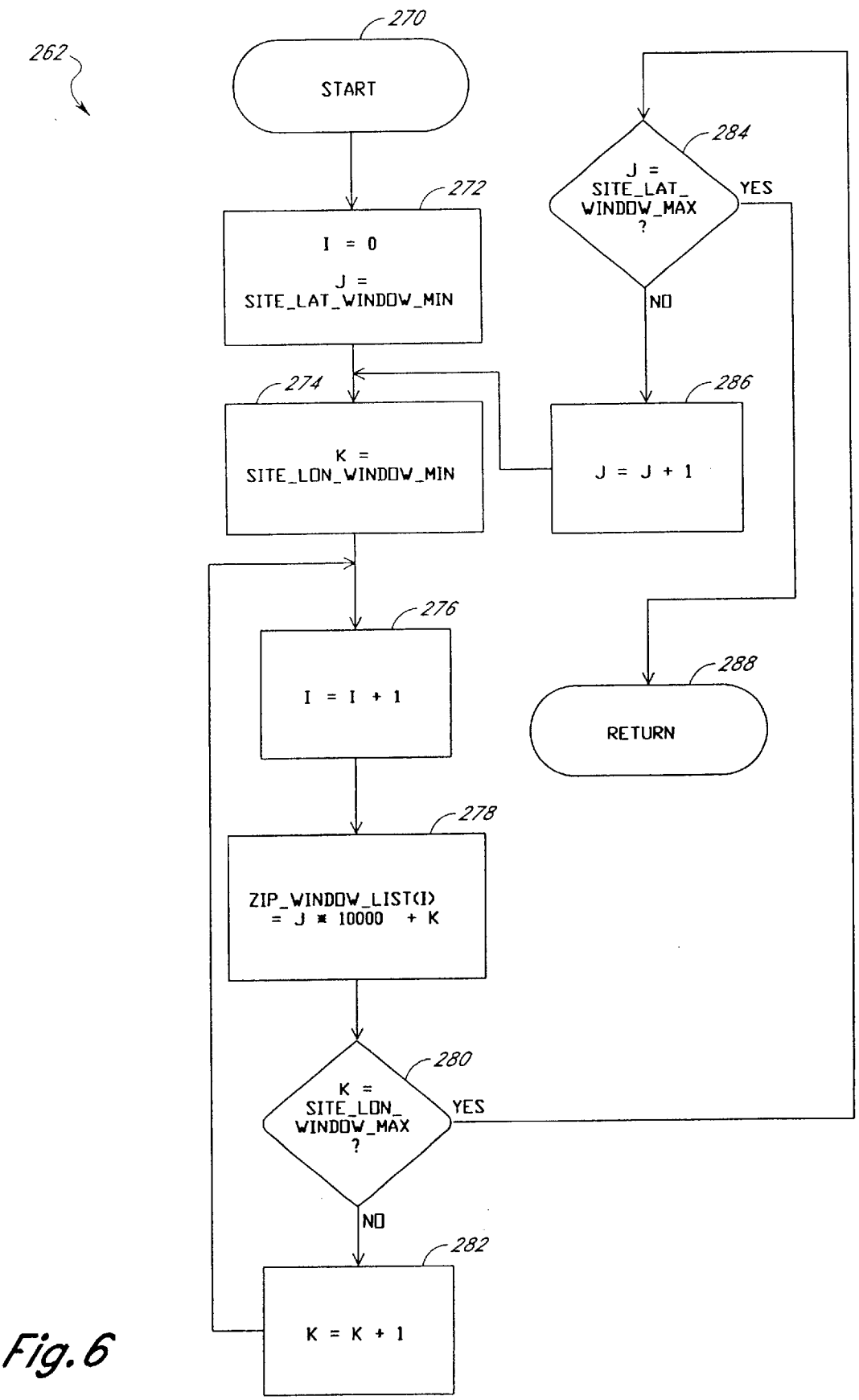
FIG. 6 is a flow diagram of the zip windows function indicated at 262 in FIG. 5.

Referring to FIG. 6, the function 262 defined in FIG. 5 will be described. Function 262 builds the actual zip_window_list for the service location. The function begins at a start state 270 and moves to state 272 wherein the variable I is set to equal zero (0), and the variable J is set to equal the value for the site latitude window minimum. After the initialization of state 272, the process 170 moves to state 274 wherein the variable K is set equal to the value for the site longitude window minimum. Moving to state 276, the value of variable I is incremented by one.

At state 278, a value of the zip_window_list, identified or addressed by the value of variable I, is calculated as the value of the variable J multiplied by 10000 and then adding the value of variable K. State 280 determines whether the value of K has reached the maximum value, and if not, the value of K is incremented by one (1) at state 282, and a loop to state 276 is performed. If K has reached the maximum site longitude value, the process 170 continues at state 284 to determine whether the value of J has reached the maximum value, and if not, the value of J is incremented by one (1) at state 286, and a loop to state 274 is performed. If J has reached the maximum site latitude value, the function 262 returns at state 288 to FIG. 5.

Continuing the example given in conjunction with FIG. 5, the result of function 262 is as follows:

Zip_window_list(1)=3291172

Zip_window_list(2)=3301172

Figure 7:
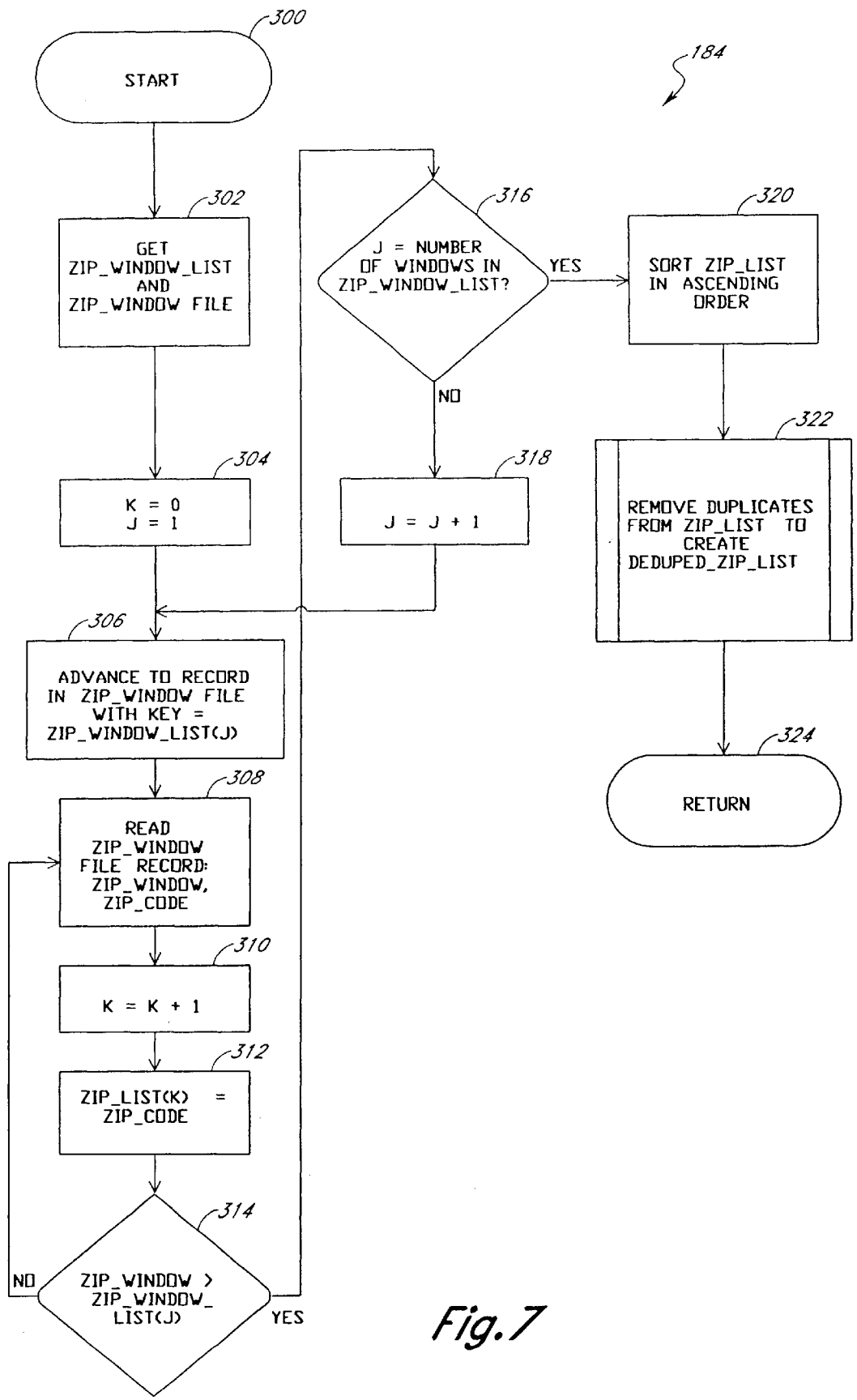
FIG. 7 is a flow diagram of the initial zip list function indicated at 184 in FIG. 3.

Referring to FIG. 7, the function 184 defined in FIG. 3 will be described. Function 184 generates a list of 5-digit zip codes touching the zip windows identified by function 182 (FIG. 5). Beginning at a start state 300, the process 170 moves to a state 302 and retrieves the zip_windows file 104 (FIG. 1a) previously described and the zip_window_list from function 182. The zip_windows file 104 is indexed by the zip_window key and contains a list of all zip codes that touch the zip window. A sample of the zip_windows file 104 is given in Table 5, which corresponds with FIG. 4.

TABLE 5

| Window | Zip_code |
|---|---|
| . | . |
| . | . |
| . | . |
| 3291172 | 92014 |
| 3291172 | 92075 |
| 3291172 | 92130 |
| . | . |
| . | . |
| . | . |
| 3301172 | 92007 |
| 3301172 | 92014 |
| 3301172 | 92024 |
| 3301172 | 92029 |
| 3301172 | 92075 |
| . | . |
| . | . |
| . | . |

Continuing at state 304, the process 170 initializes the variable K to the value of zero (0) and the variable J to the value of one (1). Then at state 306, the process 170 advances to the record in the zip_windows file 104 having the key equivalent to the value of the zip_window_list addressed by the variable J. At state 308, the record accessed at state 306 is read to get the zip_window and the associated zip code. Moving to state 310, the variable K is incremented by one (1), followed by state 312 wherein zip code read at state 308 is written to a zip_list addressed by the variable K. A check is then made at a decision state 314 to determine if the value of the zip_window from state 308 is greater than the value of the zip_window_list addressed by the variable J. If not, the next record in the zip_windows file 104 is read by looping back to state 308.

If the decision state 314 test is true, the process moves to a decision state 316 to determine if the value of J is equivalent to the number of windows in the zip_window_list. If not, the value of J is incremented by one (1) and a loop back to state 306 is performed to process the next window. If the decision state 316 is true, all windows in the zip_window_list have been processed, and the function 184 continues at state 320 wherein the zip_list of 5-digit zip codes is sorted in ascending order. For the continuing example, after state 320, the zip_list appears as follows:

92007
92014
92014
92024
92029
92075
92075
92130

Moving to a function 322, the process 170 removes duplicate entries in the zip_list to generate a deduped_zip_list. Function 322 will be further described in conjunction with FIG. 8 below. The function 184 returns at state 324 to FIG. 3.

Figure 8:
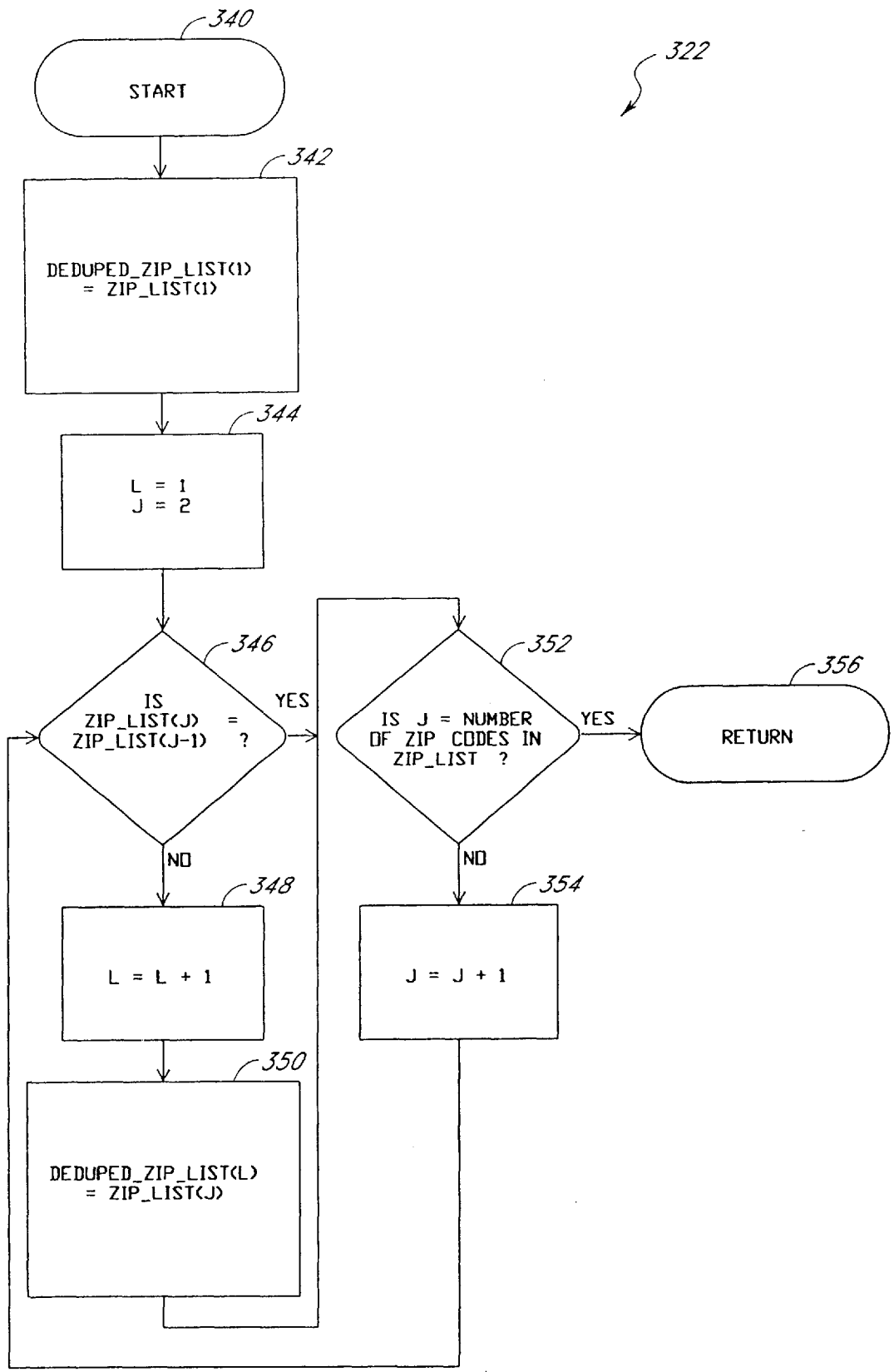
FIG. 8 is a flow diagram of the remove duplicates from zip list function indicated at 322 in FIG. 7.

Referring to FIG. 8, the function 322 defined in FIG. 7 will be described. Function 322 removes duplicate 5-digit zip codes from the zip_list as sorted in state 320 of FIG. 7. Beginning at a start state 340, the process 170 moves to a state 342, and the first entry of zip_list is defined to be the first entry of a deduped_zip_list. Proceeding to state 344, a variable L is assigned the value of one (1) and a variable J is assigned the value of two (2). Then at a decision state 346, the process 170 determines whether the value of zip_list addressed by J is equivalent to the value of zip_list addressed by "J minus one". If not, variable L is incremented by one at state 348, and the next entry in deduped_zip_list as addressed by L is written to be equivalent to the entry in the zip_list as addressed by J.

If the decision state 346 is false or at the completion of state 350, the process 170 moves to a decision state 352 to determine if the value of variable J is equal to the number of zip codes in the zip_list. If not, variable J is incremented by one at state 354, and the process 170 loops back to state 346 to check the next entry in zip_list. However, if all zip codes in zip_list are checked, as determined by state 352, the function 322 returns at state 356 to FIG. 7. For the continuing example, the deduped_zip_list at the completion of function 322 is as follows:

92007
92014
92024
92029
92075
92130

Figure 9:
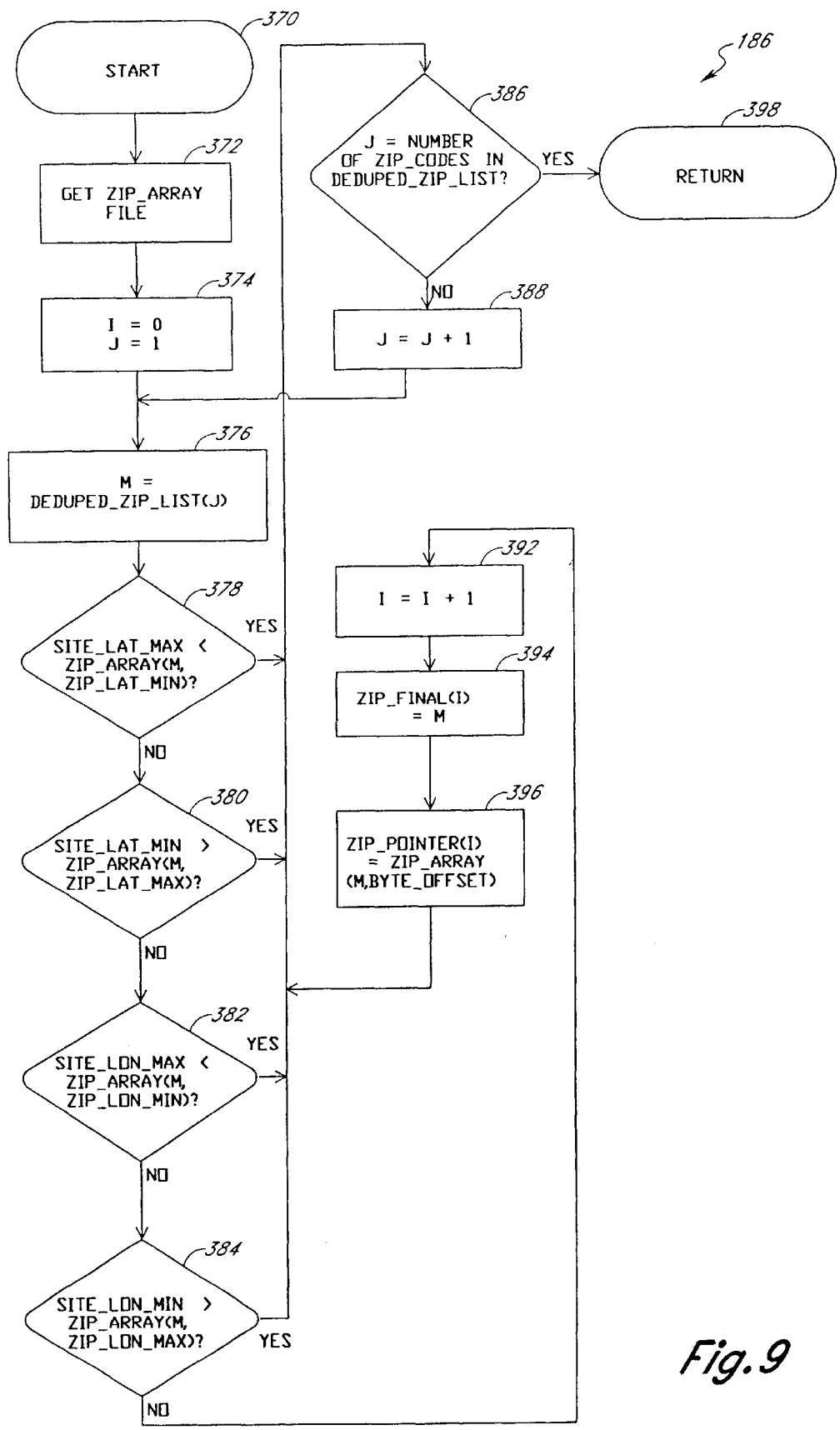
FIG. 9 is a flow diagram of the final zip list function indicated at 186 in FIG. 3.

Referring to FIG. 9, the function 186 defined in FIG. 3 will be described. Function 186 builds a zip_final list and a zip_pointer list by checking zip boundary extremes and getting an offset to the start of the zip+4_lat_lon centroid file 100 (FIG. 1a) from the zip array file 103. This procedure eliminates zip codes that do not touch the area covered by the radius of the service area. Beginning at a start state 370, the process 170 moves to a state 372 and accesses the zip array file 103 (FIG. 1a). Function 186 utilizes all columns, as previously described, of the zip array file 103 (FIG. 1a). Moving to state 374, variable I is set to a value of zero, and variable J is set to a value of one. Proceeding to state 376, variable M is set equivalent to the entry in deduped_zip_list, from function 184, addressed by J.

Using the site information calculated in Function 182 and the information from the zip array table, a series of checks are performed by decision states 378 to 384. At decision state 378, the process 170 determines whether the site_lat_max is less than the zip_lat_min for the zip array file entry addressed by the variable M. If so, the process 170 moves to a decision state 386. If not, the process continues at decision state 380. At decision state 380, the process 170 determines whether the site_lat_min is greater than the zip_lat_max for the zip array file entry addressed by the variable M. If so, the process 170 moves to decision state 386. If not, the process continues at decision state 382.

At decision state 382, the process 170 determines whether the site_lon_max is less than the zip_lon_min for the zip array file entry addressed by the variable M. If so, the process 170 moves to decision state 386. If not, the process continues at decision state 384. At decision state 384, the process 170 determines whether the site_lon_min is greater than the zip_lon_max for the zip array file entry addressed by the variable M. If so, the process 170 moves to decision state 386. If not, the process continues at state 392. To get to state 392, a determination has been made that the zip code does touch the area covered by the radius of the site. At state 392, variable I is incremented by one, and at state 394, the process 170 writes the value of M to the zip_final list entry addressed by I. Moving to state 396, the process 170 writes the value of byte_offset from the zip array file entry addressed by the variable M to the zip_pointer list entry addressed by I, and the process moves to state 386.

If any of the decision states 378 to 384 is true, the current zip code entry from deduped_zip_list is not further used. At decision state 386, a determination is made whether all entries in the deduped_zip_list have been checked. If not, J is incremented by one at state 388, and the process 170 loops back to state 376 to check the next entry. If all entries have been checked as determined by state 386, the function 186 returns at state 398 to FIG. 3. For the continuing example, the zip_final list at the completion of function 186 is as follows:

92007
92014
92075
92130

Figure 10:
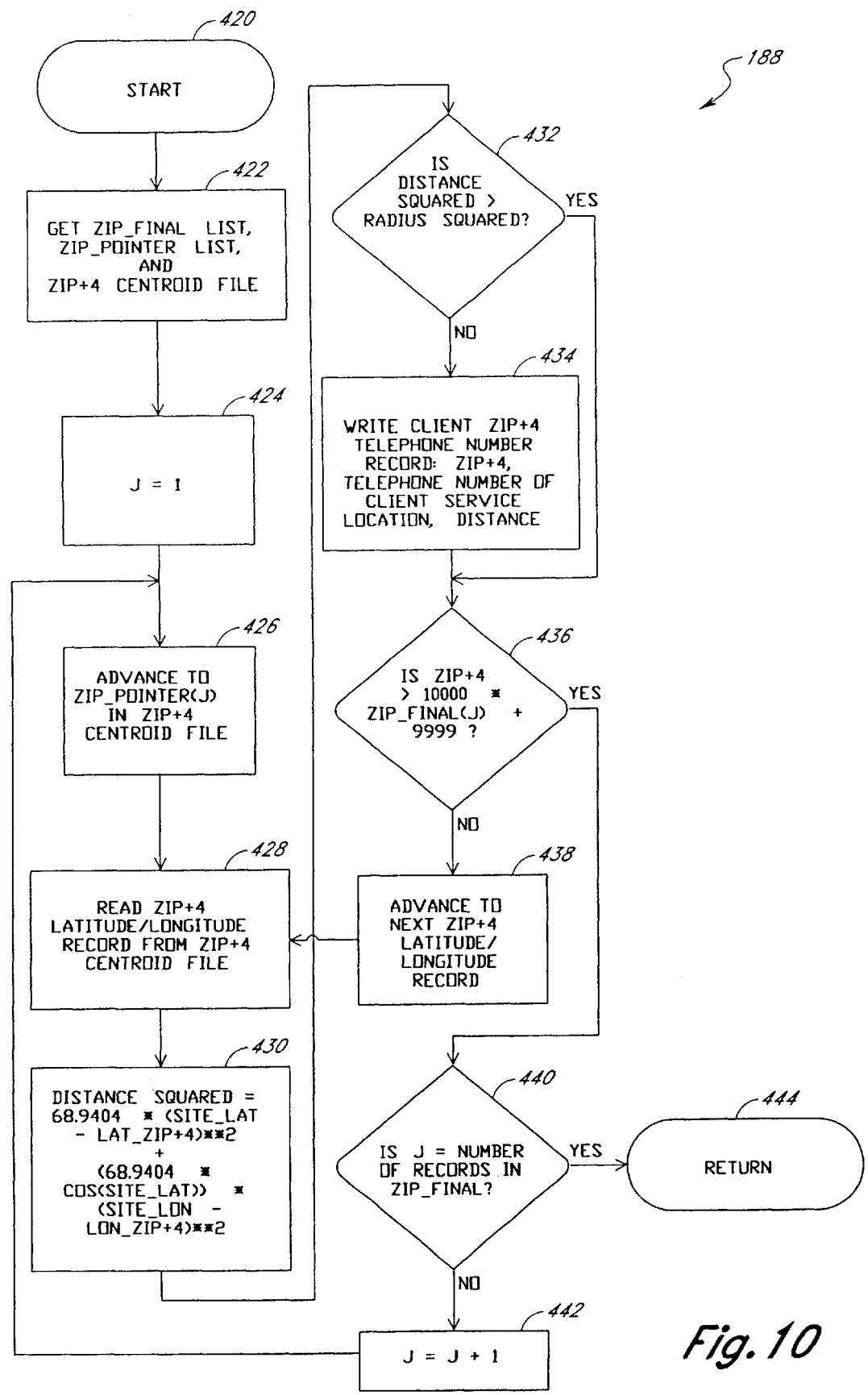
FIG. 10 is a flow diagram of the zip+4 site radius check function indicated at 188 in FIG. 3.

Referring to FIG. 10, the function 188 defined in FIG. 3 will be described. Function 188 reads all zip+4 records as identified by the combination of the zip_final list and zip_pointer list, and determines if the zip+4 centroids are inside the site radius. Beginning at a start state 420, the process 170 moves to a state 422 and gets the zip_final list, the zip_pointer list, and the zip+4 centroid file 100. At state 424, variable J is set to a value of one. Moving to state 426, the process 170 advances in the zip+4 centroid file to the address contained in the zip_pointer list addressed by the variable J. Then, at state 428, the zip+4 latitude/longitude record is read at the address from state 426. The zip+4 centroid file 100 (FIG. 1a) is sorted in ascending zip+4 order, and each record in this, file contains three fields: zip+4 code, latitude in degrees, and longitude in degrees. Moving to state 430, the process 170 calculates the distance from the service location to the zip+4 centroid. The site latitude and longitude are available from state 176 while the zip+4 latitude and longitude are available from state 428. Moving to state 432, the process 170 determines if the distance squared from state 430 is greater than the radius squared (which is available from state 174). If not, the zip+4 code is inside the site radius, and the process 170 moves to state 434 to write a raw client table zip+4 telephone number record. This record contains the zip+4 code, the telephone number of the client service location, and the square root of the distance squared.

If the distance squared is greater than the radius squared, the zip+4 code is outside the site radius, and the process moves to a decision state 436. At state 436, the process 170 determines if the current zip+4 code is greater than 10000 times the value of the zip_final list entry addressed by the variable J plus 9999. The current zip+4 is compared to a value for the highest possible numbered zip+4 for the current zip code by appending 9999 to the 5-digit zip code. For example, if the zip code is 92007, the highest possible number for a zip+4 for this zip code is 920079999. While reading the zip+4 records for zip code 92007, if the zip+4 record read is greater than 920079999, then the end of zip+4 records for the 92007 zip code is passed, and the process 170 moves to the next zip code in the zip_final list. If the decision state 436 is false, the process 170 moves to state 438 and advances to the next zip+4 record for the same 5-digit zip code in the zip+4 centroid file 100. The next record is read by looping back to state 428.

If decision state 436 is true, the process 170 moves to a decision state 440 to determine if all records in the zip_final list have been read. If not, the variable J is incremented by one at state 442, and the process loops back to state 426 and repeats the procedure for the next 5-digit zip code in the zip_final list. If all 5-digit zip codes have been processed as determined by state 440, the function 188 returns at state 444 to FIG. 3. For the continuing example, a sample record of the raw Client table at the completion of state 434 is as follows:

Sample record: 920752064 6194817777 1.2865.

V. Client Table Build Process for the Service Location Closest to the Caller Within a Distance Limit The "closest" process is identical to the process for building a Client Table 106 for a radius defined service area with the exception of the last step. For the "closest" process, function 196, as shown in FIG. 3, is used instead of state 198. The radius defined service area can result in a zip+4 code assigned to more than one service area. However, there can only be one closest service area.

States 172 to 194 in the radius defined service area process are identical for the "closest" process. Referring to FIG. 11, function 196 as defined in FIG. 3 will be described. Function 196 removes multiple assignments of a zip+4 code and keeps the one with the shortest distance. Beginning at a start state 500, function 196 accesses the sorted intermediate Client Table (not shown) which is available at the completion of state 192. Moving to state 504, a variable "last_zip+4" is set equal to the value of zero. Then, at state 506, beginning with the first record, a record is read from the intermediate Client Table. Moving to a decision state 508, a determination is made whether the zip+4 just read in the record from state 506 is equivalent to the value of last_zip+4. If not, the current record is written to the Client Table 106 at state 510, followed by setting the variable last_zip+4 equivalent to the current zip+4 code at state 512.

At the completion of state 512, a decision state 514 determines if the end of the sorted intermediate Client Table has been reached. If not, the function 196 advances to the next zip+4 code in the intermediate Client Table and loops back to state 506 to process the next record. If the end of the intermediate Client Table has been reached as determined by state 514, the Client Table 106 is loaded in the computer of the telephone switch 111 and an index key on the zip+4 code is built. Function 196 returns at state 520 to state 200 of FIG. 3 to end the "closest" process.

VI. Client Table Build Process for a Polygon Defined Service Area

In general, there are two types of polygon defined service areas. The first type is an exclusive or non-overlapping trade area, and the second type is a non-exclusive or overlapping trade area.

For a non-overlapping polygon defined service area, each franchisee has a defined trade area, such as the area in which they deliver a product. The following situation is given to illustrate this concept. A customer could be located closer to, say, Franchisee B than Franchisee A, but if the customer is in the polygon area for Franchisee A, only the telephone number for Franchisee A will be in the Client Table 106

(FIG. 1a) record corresponding to the location of the customer. However, if the service areas for Franchisee A and Franchisee B are overlapping, the Client Table 106 would have one record with the telephone number and distance for Franchisee A, and another record with the telephone number and distance for Franchisee B. Therefore, the client table build process 105 accommodates both types of polygon defined service areas.

Figure 12A:
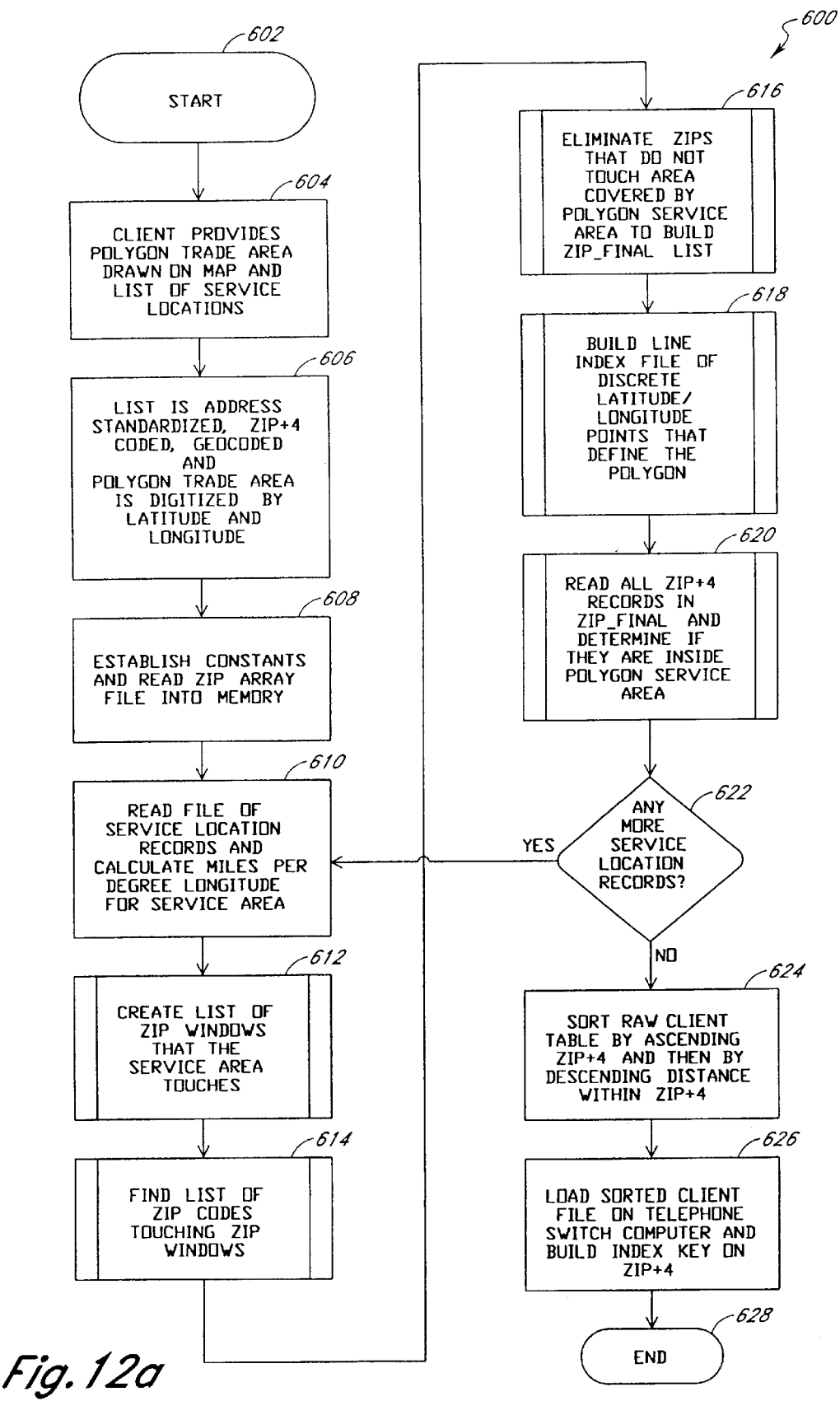
FIG. 12a is a top-level flow diagram of a process to build a client table using polygon defined service areas for the system of FIG. 1.
Figure 12B:
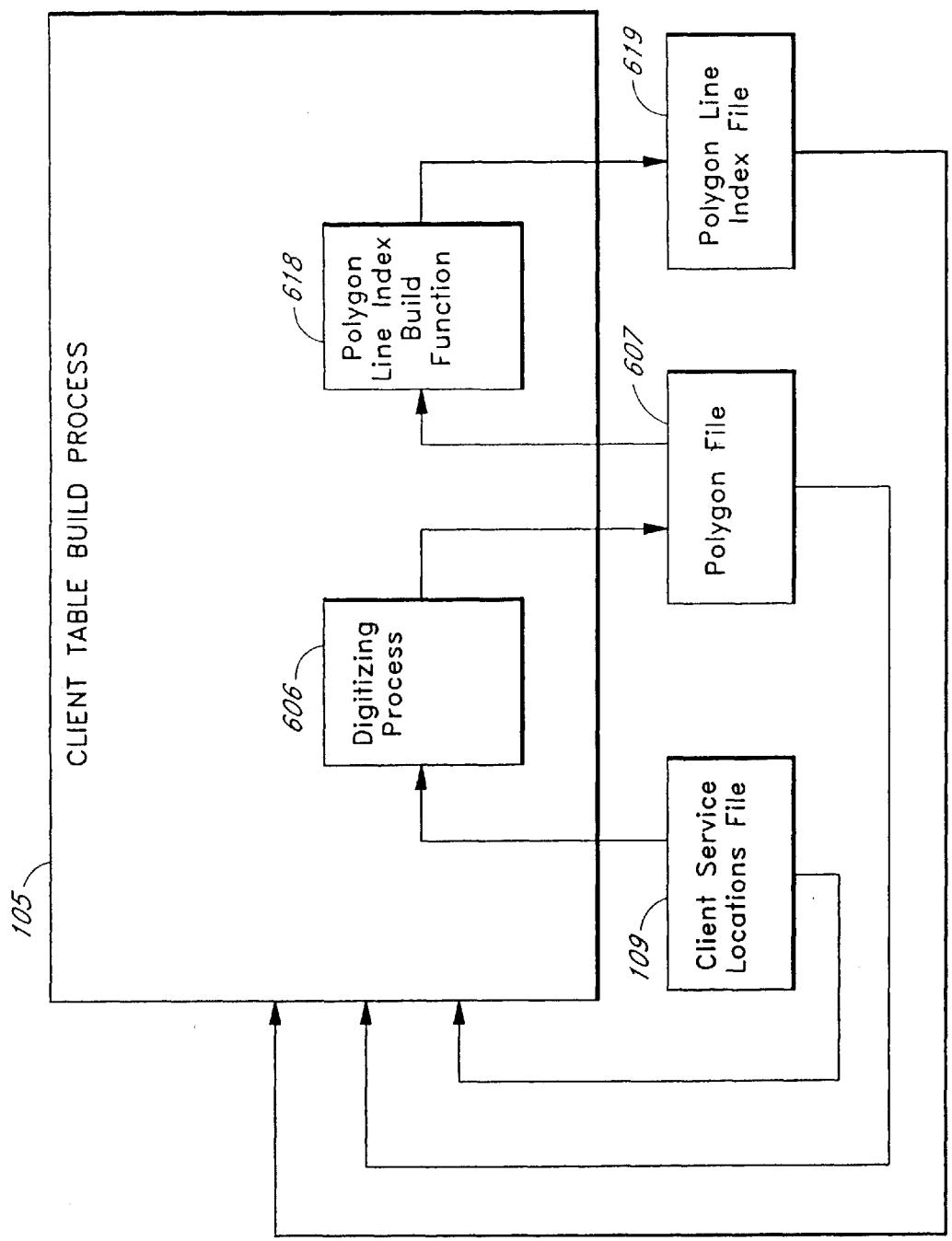
Figure 13:
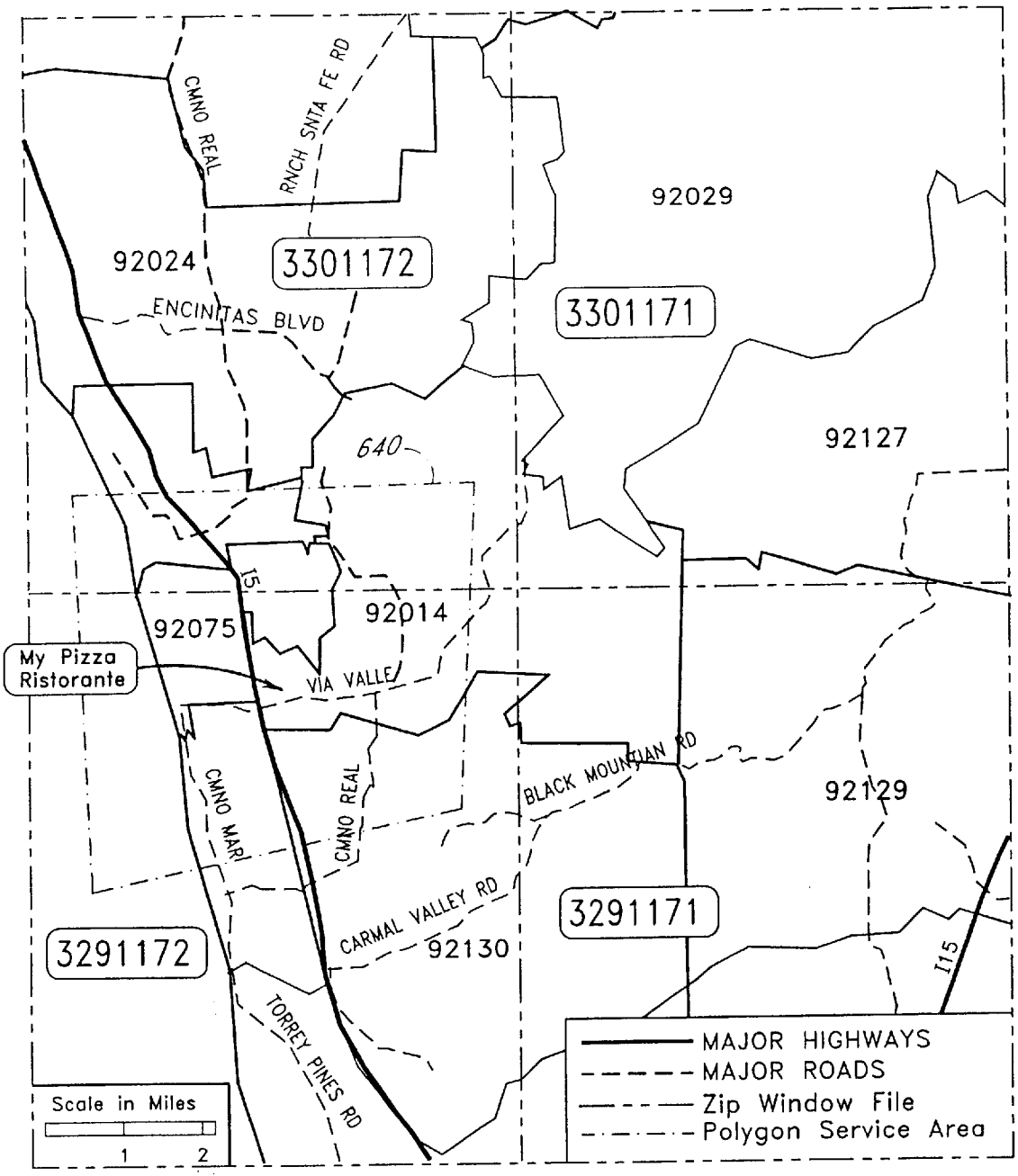

Referring generally to FIGS. 12a, 12b, and 13, a Client Table process 600 for a polygon defined service area will be described. Process 600 is another specific version of the general process 105 shown in FIG. 1a. Many parts of the polygon defined service area process 600 (also referred to as the polygon process) are identical with those of the radius defined service area process 170. Some functions have minor changes. Other functions are totally different. For functions that are almost identical only the differences will be identified and explained to avoid repetition. The new functions will be described in some detail.

The process 600 begins at a start state 602 and moves to state 604 wherein a client provides a client service locations file 109 (FIG. 1a) of service locations in machine readable form with information and format as previously shown in Table 3. The client also provides a detailed street map with the polygon service area of the service location drawn on the street map with the telephone number of the service location written inside the polygon service area. The map of FIG. 13 illustrates an example polygon service area 640.

The process 600 moves to state 606 wherein the list of service locations in file 109 is address standardized, zip+4 coded, and latitude and longitude geocoded using commercially available services through companies such as Group I and Geographic Data Technology. Table 4 is the example of a standardized record with latitude and longitude appended. In addition, the latitude and longitude vertices for the polygon service area drawn on the street map are digitized using a commercially available GIS system such as Infomark for Windows available from Equifax National Decision Systems. The digitizing process of state 606 assigns latitude and longitude coordinates for the vertices of the polygon and creates a polygon file 607 as shown in FIG. 12b. An example of the polygon file 607 is shown in Table 6 with the following data items:

TABLE 6

| Geocode: | 6194817777 |
|---|---|
| Name: | MyPizza Del Mar |
| Number of vertices: | 5 |
| Lat/Lon vertex pairs: | 33.0170 −117.2910 |
| | 32.9503 −117.2874 |
| | 32:9623 −117.2132 |
| | 33.0187 −117.2084 |
| | 33.0170 −117.2910 |

The last latitude/longitude vertex pair must equal the first pair to close the polygon. This example is for a very simple polygon. Typical franchise polygons are very complex; the polygon may follow non-linear street boundaries and contain hundreds of vertices. The geocode is the telephone number of the service location.

Moving to state 608, the process 600 establishes the constant of 68.9404 miles per degree latitude and reads the zip array file 103 (FIG. 1a) into memory of the computer. At state 610, the process 600 reads a record from the client service location file 109 and calculates the number of miles per degree longitude for the service location. The miles per degree longitude=68.9404*COSINE(latitude). For the example given in Table 4, at 32.9862 degrees latitude the result is 57.8297 miles per degree longitude.

The process 600 proceeds to a function 612 which generates a list of zip windows that the service location touches. Touching a zip window means that at least part of the service area is in or overlaps the zip window. The zip windows for the example given in Table 4 are illustrated in FIG. 13. The function 612 will be further described in conjunction with FIG. 14 hereinbelow.

Figure 16:
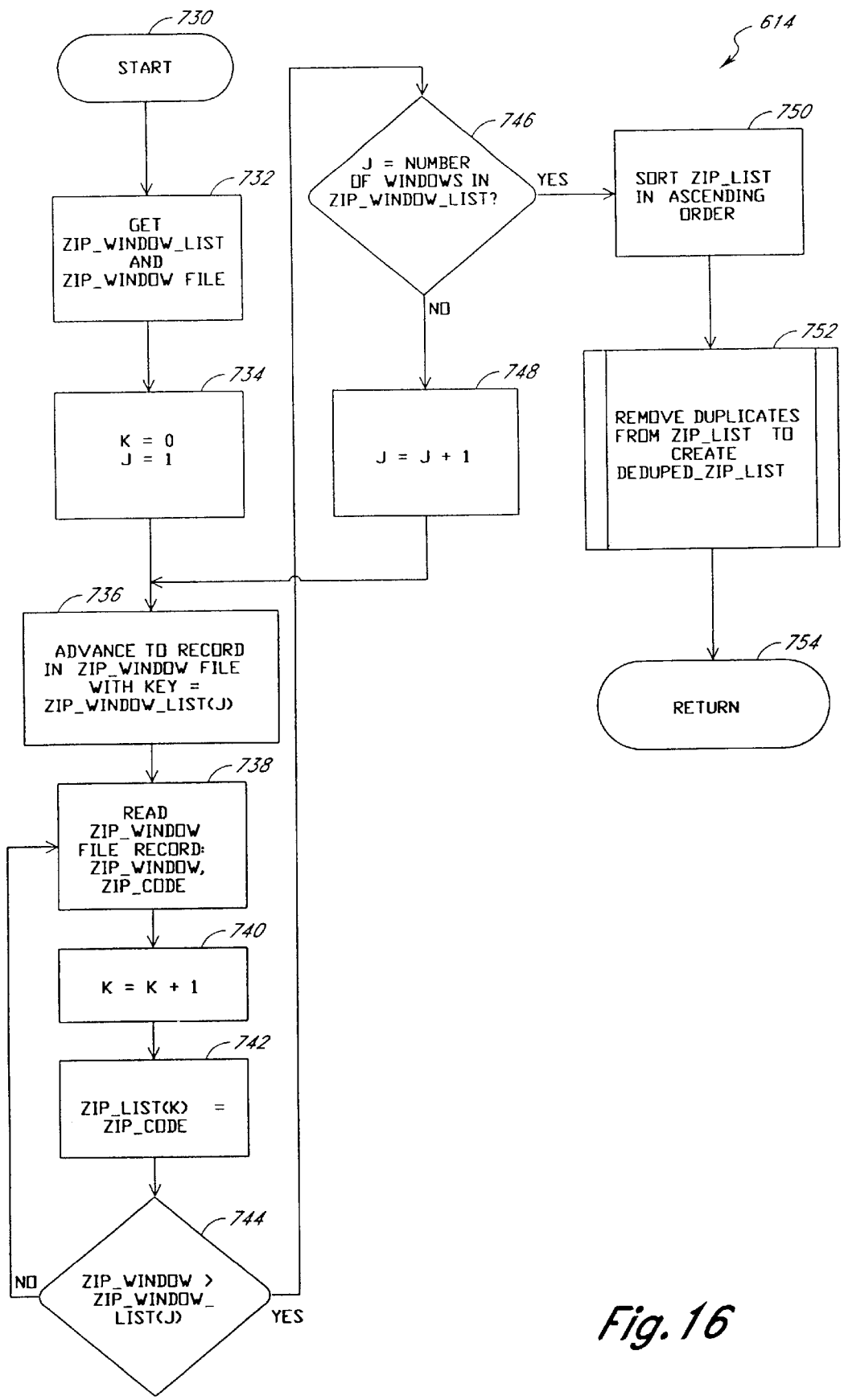

Moving to a function 614, the process 600 generates a list of 5-digit zip codes that touch any of the zip windows identified by function 612. This zip list is sorted in ascending order and duplicate zip codes are removed in function 614. The function 614 will be further described in conjunction with FIG. 16 hereinbelow.

Figure 18:
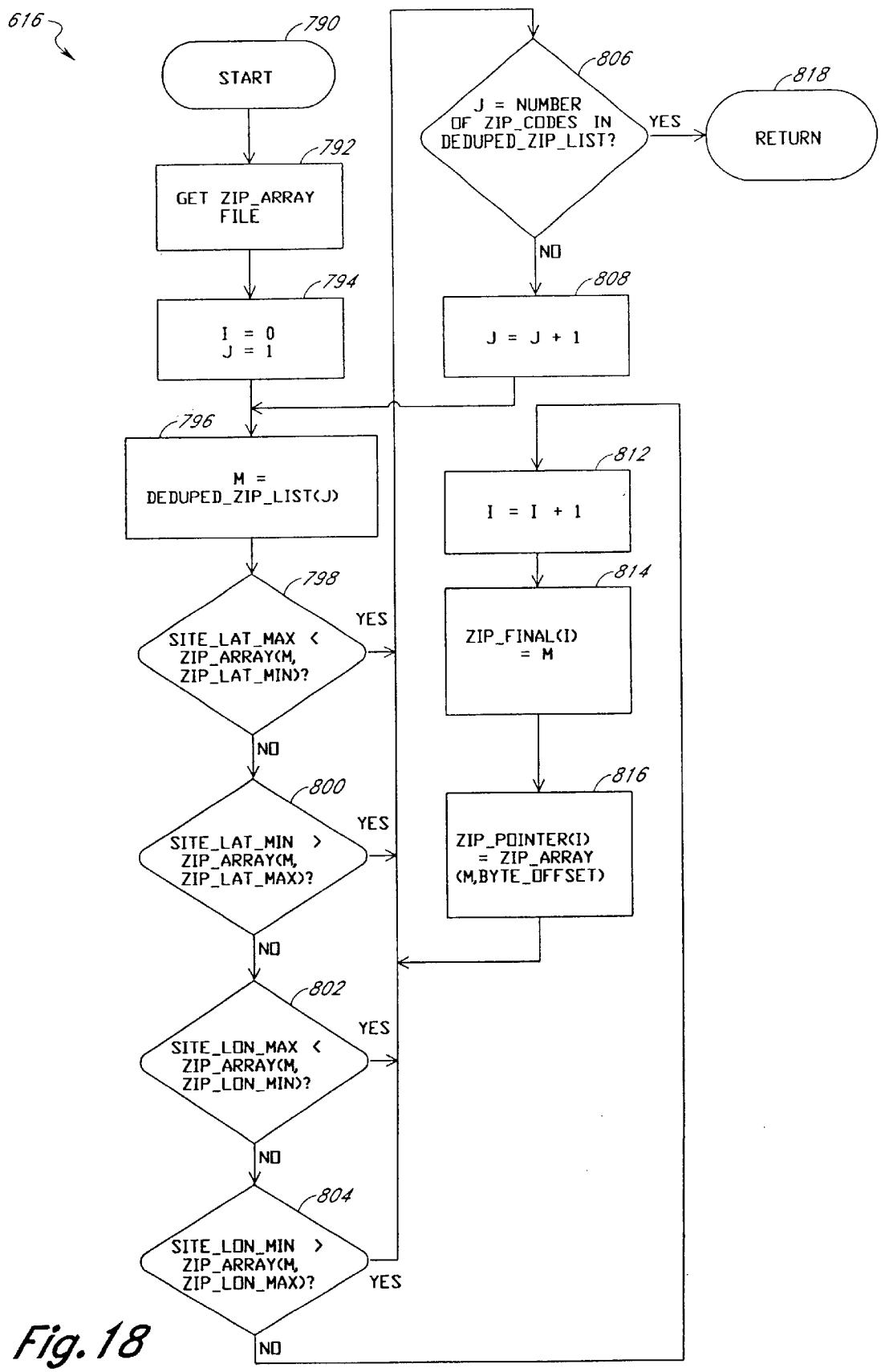

The process 600 proceeds to a function 616 wherein 5-digit zip codes that are not within the polygon service area specified in state 604 are removed from the zip list generated by function 614, and a zip final list is created. The function 616 will be further described in conjunction with FIG. 18 hereinbelow.

Advancing to function 618, the process 600 builds a line index file 619 shown in FIG. 12b of discrete latitude and longitude points that define the polygon. Function 618 will be further described in conjunction with FIG. 19a and 19b hereinbelow.

Continuing to function 620, the process 600 retrieves all the zip+4 records corresponding to the zip codes in the zip final list generated by function 616 and determines if the zip+4 code is at or inside the polygon service area. If so, a record is written in a raw Client Table (not shown) that includes the zip+4 code, the client telephone number for the instant service location, and the distance of the zip+4 centroid to the service location. The function 620 will be further described in conjunction with FIG. 20 hereinbelow.

The process 600 moves to a decision state 622 to determine if additional client service records are to be processed. If so, the loop of states 610 to 620 is repeated for the next service location record. If all service location records have been processed for the instant raw Client Table, the process 600 advances to state 624. At state 624, the process 600 sorts the raw records, written by function 620, by ascending zip+4 code and then by descending distance, if the same zip+4 code is listed more than once. The same zip+4 code could be listed more than once if there are multiple overlapping polygon service locations, each with a different client telephone number.

The process 600 then moves to a state 626 wherein the sorted Client Table from state 624 is loaded onto the computer of the telephone network switch 111, and an index key on the zip+4 codes is built. Upon completion of state 626, the Client Table build process 600 for a polygon defined service area ends at state 628.

Figure 14:
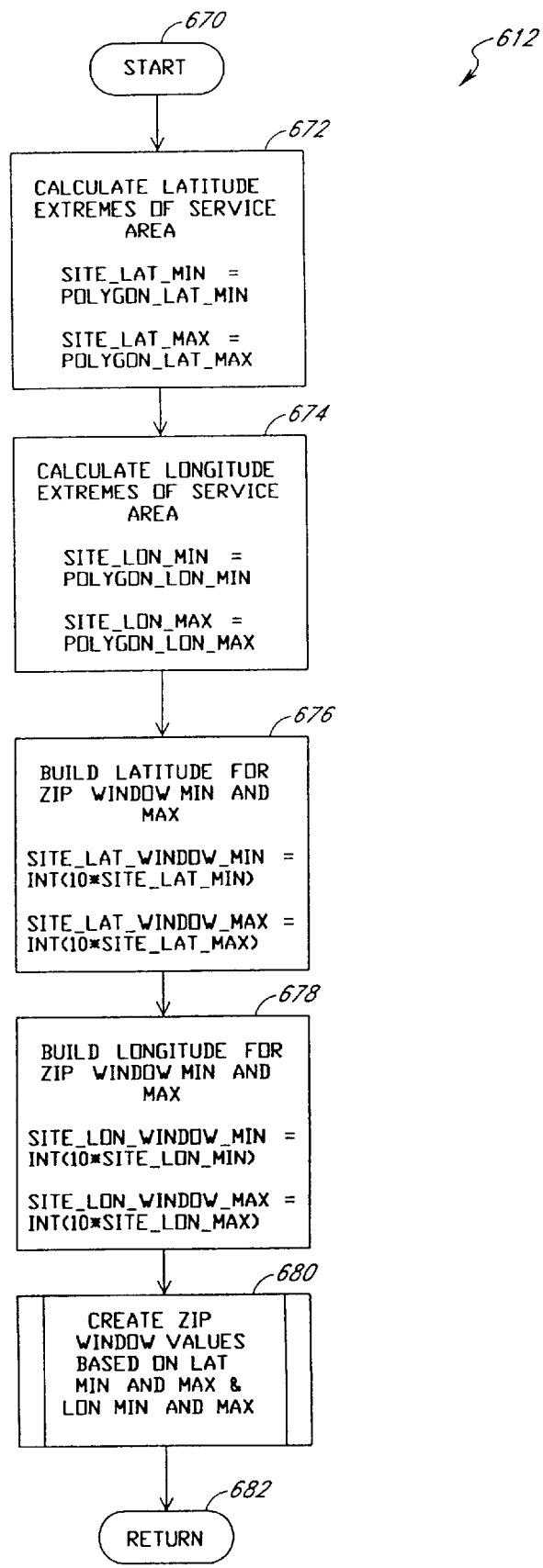

Referring generally to FIG. 14, the function 612 defined in FIG. 12a will be described. Function 612 generates a list of zip windows that the site touches by first calculating site latitude and longitude extremes. For this function, the absolute value is used for both the latitude and longitude.

Beginning at a start state 670, the process 600 moves to a state 672 to establish latitude extremes of the service area. The polygon file 607 is accessed to retrieve the polygon vertices latitude minimum and maximum values.

Site_lat_min=polygon_lat_min;

Site_lat_max=polygon_lat_max.

For the example service location and polygon given in Table 6, the results are as follows:

Site_lat_min=32.9503;

Site_lat_max=33.0187.

The process continues at state 674 wherein longitude extremes of the service area are established. The polygon vertices longitude minimum and maximum values are retrieved from the polygon file 607.

Site_lon_min=polygon_lon_min;

Site_lon_max=polygon_lon_max.

For the example service location and polygon given in Table 6, the results are as follows:

Site_lon_min=117.2084;

Site_lon_max=117.2910.

Figure 15:
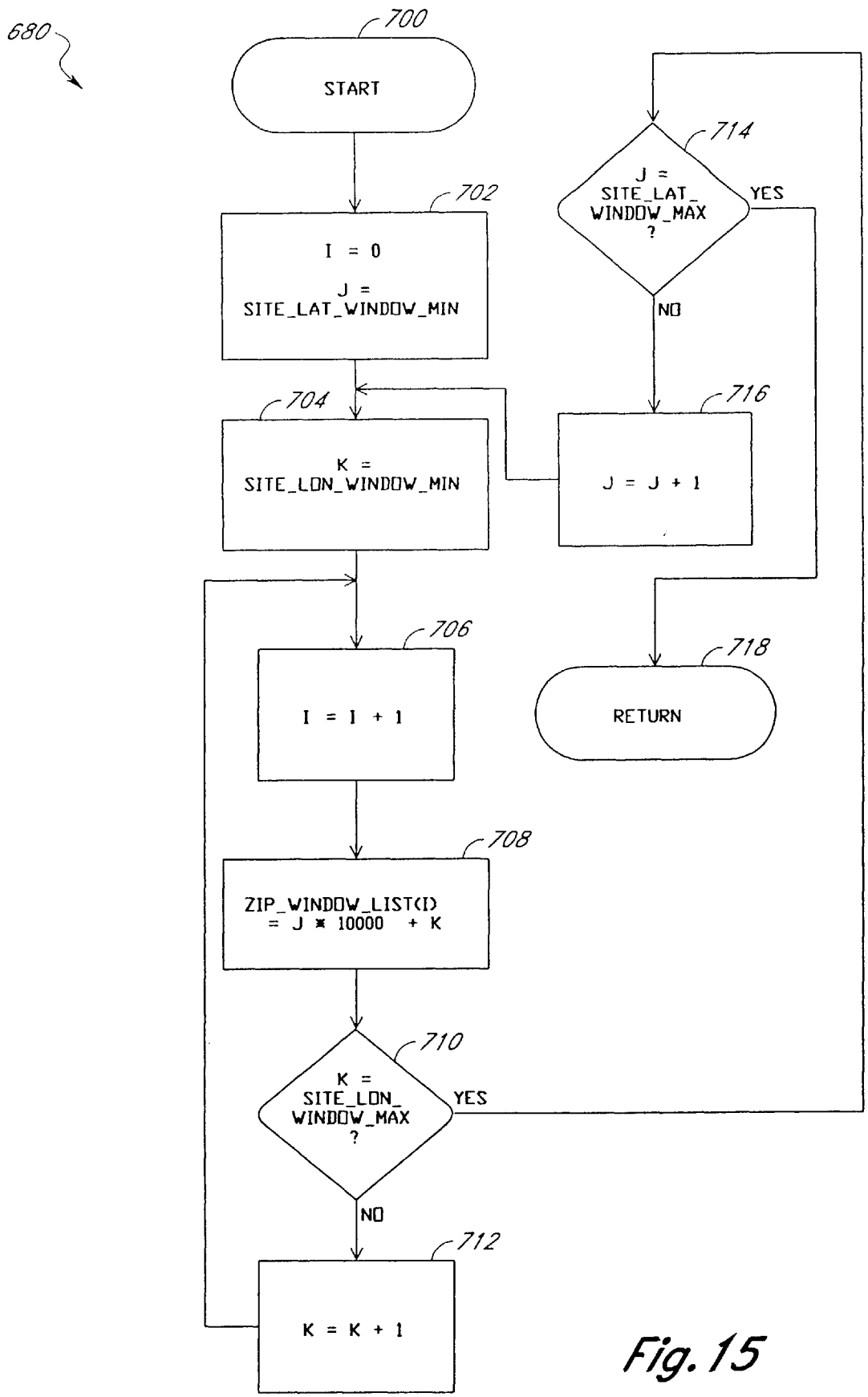
FIG. 15 is a flow diagram of the zip windows function indicated at 680 in FIG. 14.

States 676 and 678 are identical to states 258 and 260 of function 182 (FIG. 5). As defined in FIG. 14, function 680 (FIG. 15) is identical to function 262 (FIG. 6). Function 612 returns at state 682 to FIG. 12a.

Figure 17:
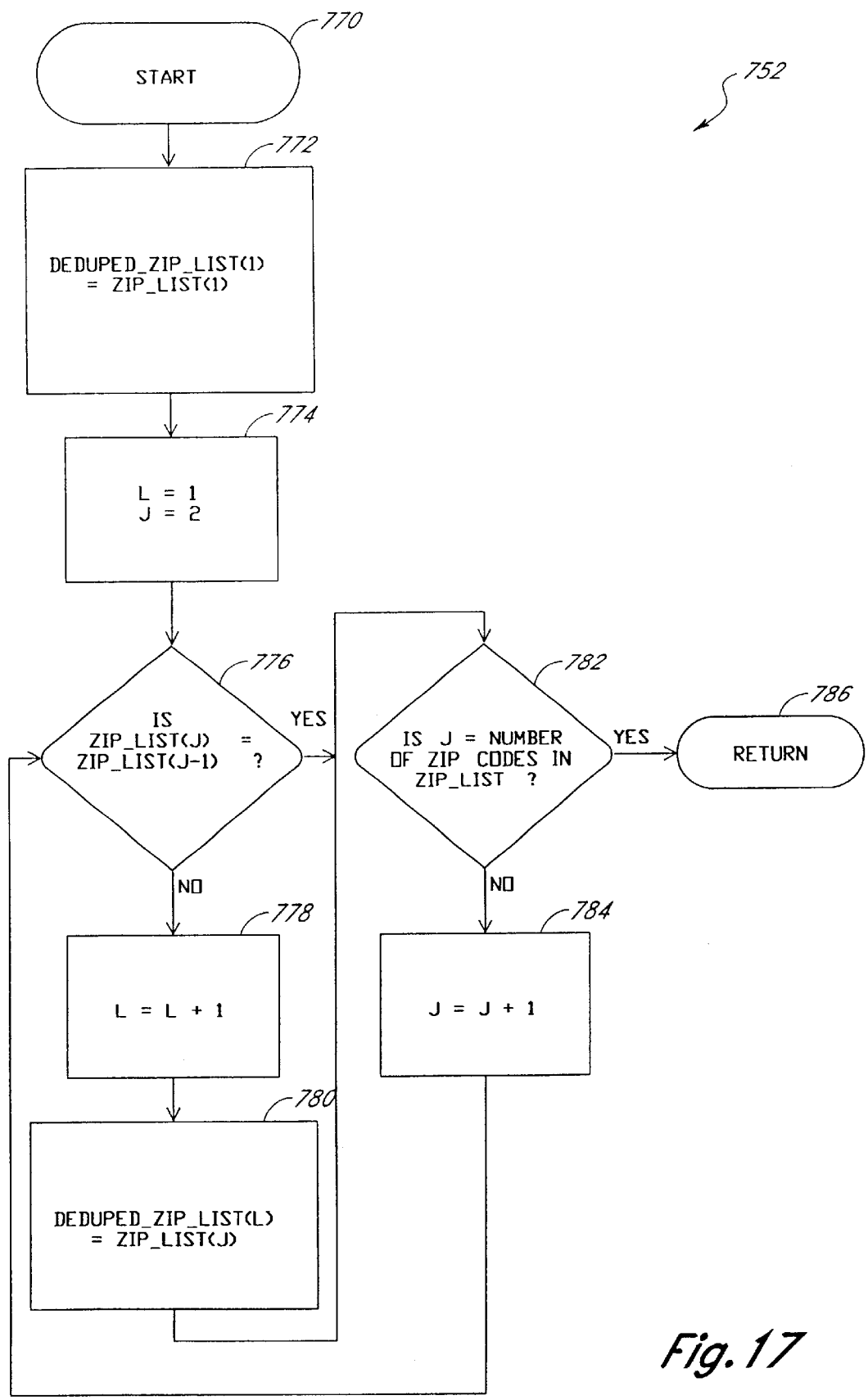
FIG. 17 is a flow diagram of the remove duplicates from zip list function indicated at 752 in FIG. 16.

As defined in FIG. 12a, function 614 (FIG. 16) is identical to function 184 (FIG. 7). As defined in FIG. 16, function 752 (FIG. 17) is identical to function 322 (FIG. 8). As defined in FIG. 12a, function 616 (FIG. 18) is identical to function 186 (FIG. 9).

Figure 19A:
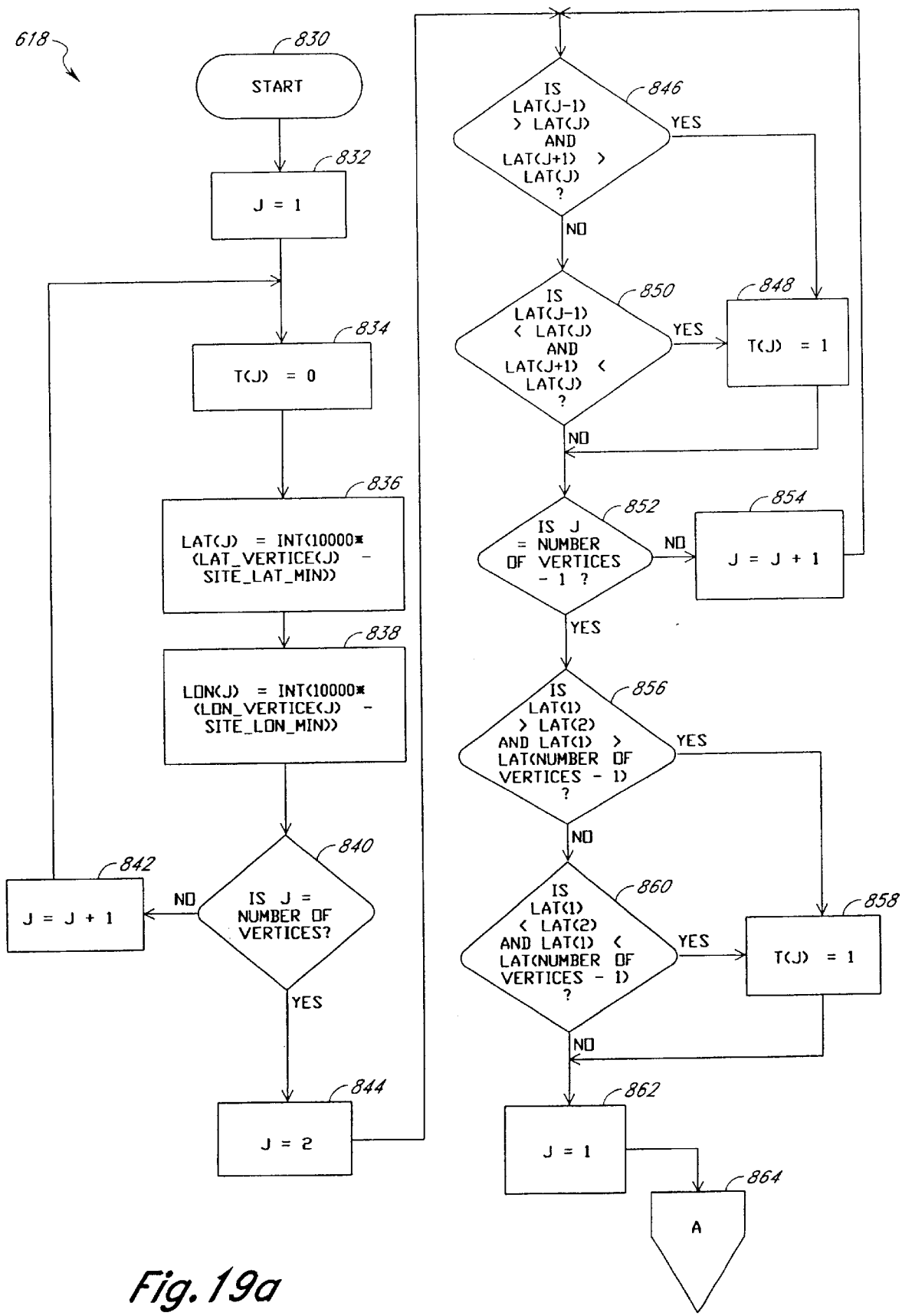
Figure 19B:
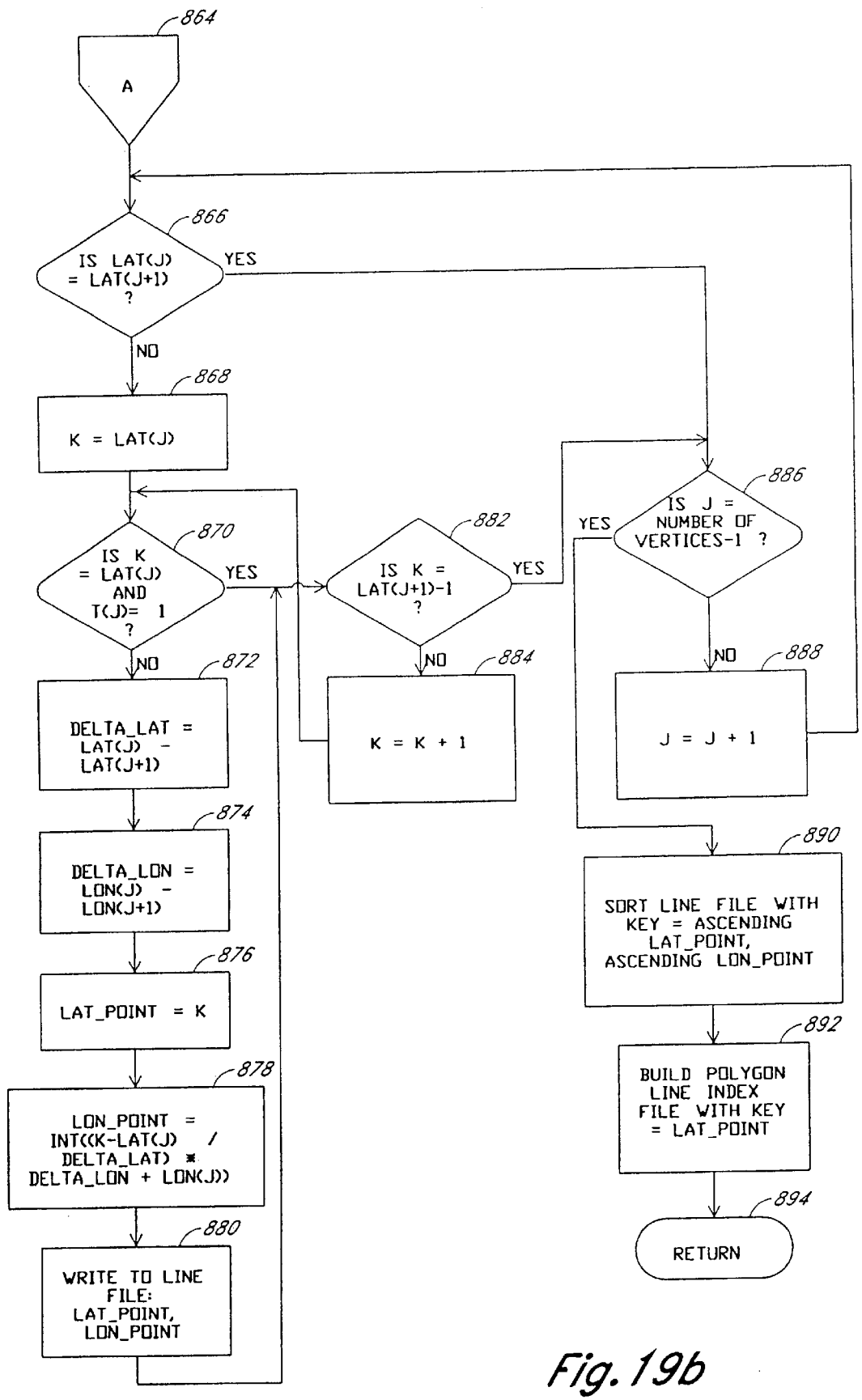

Referring to FIGS. 19a and 19b, the function 618 defined in FIG. 12a will be described. Function 618 builds the line index file 619 by rounding all modified polygon vertices latitudes and longitudes to an integer value, thereby creating a record of every discrete point along the line generated by connecting adjacent vertices listed in the polygon file 607. The modification performed to the polygon vertices is subtracting the site_lat_min or site_lon_min as will be seen below.

Beginning at a start state 830, the process 600 moves to a state 832 and initializes a variable J to equal the value one. Moving to state 834, the process 600 initializes a tangent (denoted by "T" in FIG. 19) array element addressed by the variable J to equal the value zero. At state 836, a latitude array (denoted by "LAT" in FIG. 19) element addressed by J is written to the value calculated by: subtracting site_lat_min (available from function 612, FIG. 14) from the vertices latitude (lat_vertices) addressed by J in the polygon file 607 (available from state 606), multiplying the result by 10,000, and then taking the integer (INT) portion of the product. Advancing to state 838, a longitude array (denoted by "LON" in FIG. 19) element addressed by J is written to the value calculated by: subtracting site_lon_min (available from function 612, FIG. 14) from the vertices longitude (lon_vertices) addressed by J in the polygon file 607 (available from state 606), multiplying the result by 10,000, and then taking the integer portion of the product.

At a decision state 840, the process 600 determines if all vertices in the polygon file 607 have been processed. The number of vertices is available from state 606 as shown in the example in Table 6. If not, variable J is incremented by one at state 842, and the process 600 loops back to state 834 to process the next vertices. If all vertices have been processed, variable J is set equal to the value two at state 844.

States 846 through 860 are used to find vertices that are tangent to a latitude line. States 846 through 854 form a loop to sequence through all elements of the LAT array to determine if either of the conditions of decision states 846 or 850 are met. If so, the element of the tangent array addressed by J is set equal to one. If not, the next element is checked, by incrementing J at state 854 and looping back to state 846, until the end of the LAT array is reached, i.e., all vertices are tested, and decision state 852 is true. Decision state 846 determines whether the values of the elements of array LAT immediately before and immediately after the current element are greater than the value of the current element. In other words, decision state 846 determines whether a latitude line is tangent to vertex(J). Decision state 850 determines whether the values of the elements of array LAT immediately before and immediately after the current element are less than the value of the current element. In other words, decision state 850 determines whether a latitude line is tangent to vertex(J).

When J equals the number of vertices minus one, the process 600 moves to states 856 through 860 to perform the follow tests:

decision state 856: If LAT(1)>LAT(2) AND
LAT(1)>LAT(number_vertices−1) then T(J)=1;

decision state 860: If LAT(1)<LAT(2) AND
LAT(1)<LAT(number_vertices−1) then T(J)=1.

Number_vertices is used to represent the number of vertices as available from state 606. Decision states 856 through 860 test for a special case of previous states 846 through 854 to determine if vertex(1) is tangent to a latitude line. If so, the element of the tangent array addressed by J is set equal to one.

At state 862, the process 600 sets variable J equal to one. Block 864 is an off page connector from FIG. 19a to FIG. 19b. Continuing on from block 864 on FIG. 19b, the process 600 generates a pseudo-line of discrete latitude points connecting the polygon vertices. Each point that defines the line is described by an X,Y coordinate. Each Y coordinate or latitude point is one ten-thousandth of a degree latitude apart on the Y axis.

Decision state 866 checks for parallel latitude lines, and if true, the process 600 moves to decision state 886 to determine if all vertices have been processed. If not, J is incremented by one at state 888, and the process loops back to decision state 866 to check the next element of array LAT. If LAT(J) does not equal LAT(J+1) as determined by decision state 866, the process 600 moves to state 868, sets a variable K to equal the value of LAT(J), and moves to state 870.

State 870 is used to leave out latitude tangent vertices points. State 870 determines if K is equivalent to LAT(J) and T(J) equals one. If so, the process 600 moves to decision state 882 to determine if K should be incremented by one at state 884, or if K has reached the value "LAT(J+1)−1" and decision state 886 is to be performed. If K is incremented at state 884, the process 600 loops back to decision state 870.

If decision state 870 is false, the process 600 moves to state 872 to calculate a variable "delta_lat" to be "LAT(J)−LAT(J+1)". At state 874, a variable "delta_lon" is calculated as the difference between the value of the array LON element addressed by J and the value of the array LON element addressed by J plus one. Moving to state 876, a variable "lat_point" is set equivalent to the value of variable K. State 878 is used to calculate a longitude (variable "lon_point") for latitude line point using the following equation:

lon_point=INT((K-LAT(J)/delta_lat)*delta_lon+LON(J)).

Moving to state 880, the process 600 writes the values of lat_point and lon_point to the line index file and then loops back to decision state 882 to check on the value of K.

At decision state 886, if J equals the number of vertices minus one, all vertices have been processed, and the process 600 moves to state 890. At state 890, the process 600 sorts the line index file by ascending latitude point, and then by ascending longitude point within the latitude point. Moving to state 894, process 600 builds the polygon line index file 619 using the latitude point as the indexing key. Function 618 returns at state 894 to FIG. 12a.

Figure 20:
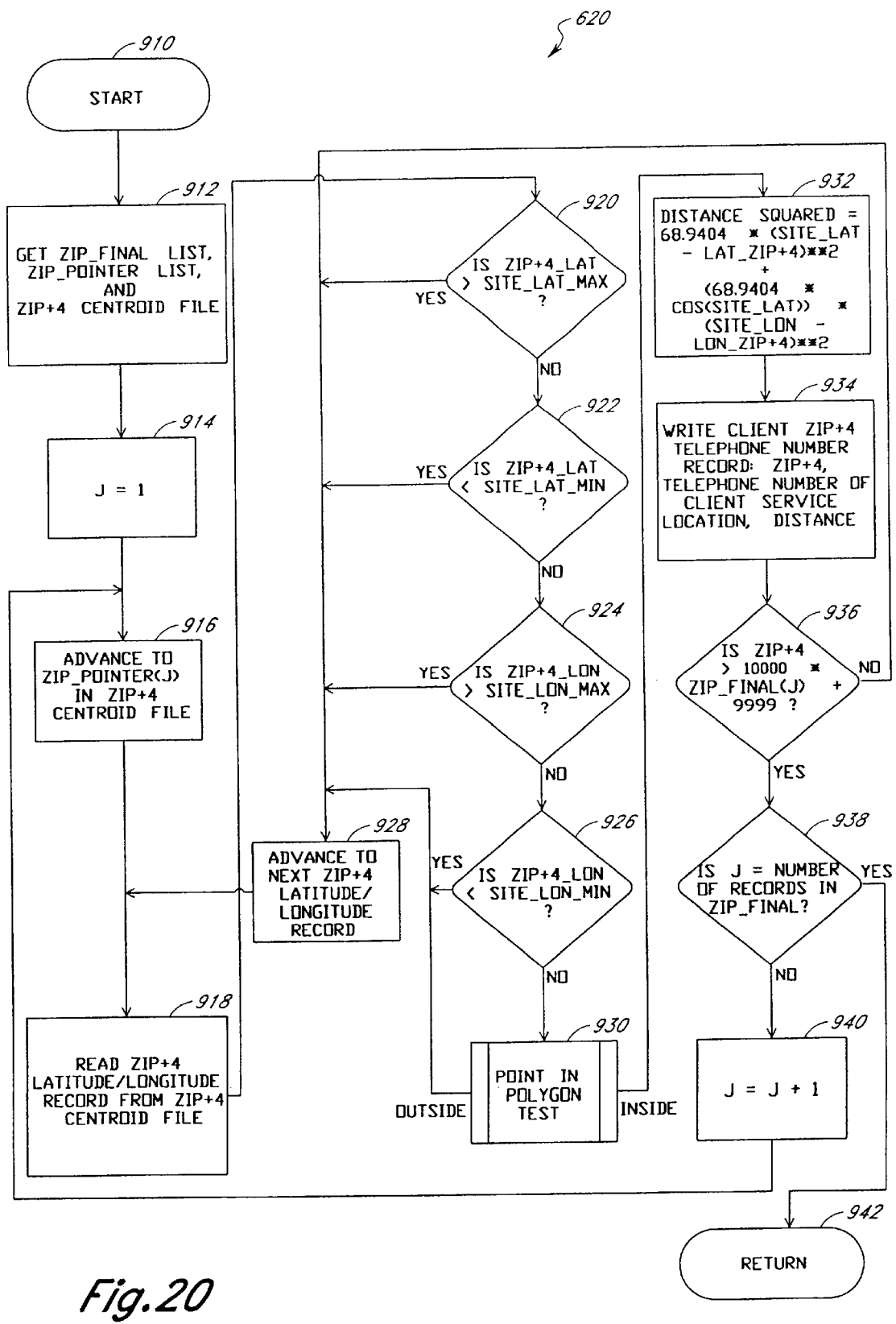

Referring to FIG. 20, the function 620 defined in FIG. 12a will be described. Function 620 reads all zip+4 records as identified by the combination of the zip_final list and zip_pointer list, and determines if the zip+4 centroids are inside the polygon service area.

Beginning at a start state 910, the states 912 through 918 are identical to states 422 through 428 of function 188 (FIG. 10). Then beginning at state 920 through state 926, the process 600 compares the latitude and longitude of the zip+4 centroid to the minimums and maximums of the site latitude and longitude available from function 612 (FIG. 14). In other words, the process 600 determines if the zip+4 centroid is inside the latitude and longitude extremes of the polygon service area. If not, at state 928 the process 600 advances to point to the next zip+4 record and then loops back to state 918 to read the zip+4 record.

However, if the zip+4 centroid is determined to be inside the latitude and longitude extremes of the polygon service area by states 920 through 926, the process 600 moves a function 930. Function 930 is a final test to determine if the zip+4 centroid is indeed inside the polygon. The point-in-polygon test of function 930 returns with either an "inside" flag or "outside" flag. If the zip+4 centroid is not inside the polygon, the "outside" flag is set by function 930, and the process 600 moves to state 928 to advance to the next zip+4 record. However, if the zip+4 centroid is inside the polygon, the "inside" flag is set by function 930, and the process 600 moves to state 932 to perform a distance calculation. State 932 is identical to state 430 of function 188 (FIG. 10). States 934 through 940 and 928 are identical to states 434 through 442 of function 188. Function 620 returns at state 942 to FIG. 12a.

Figure 21:
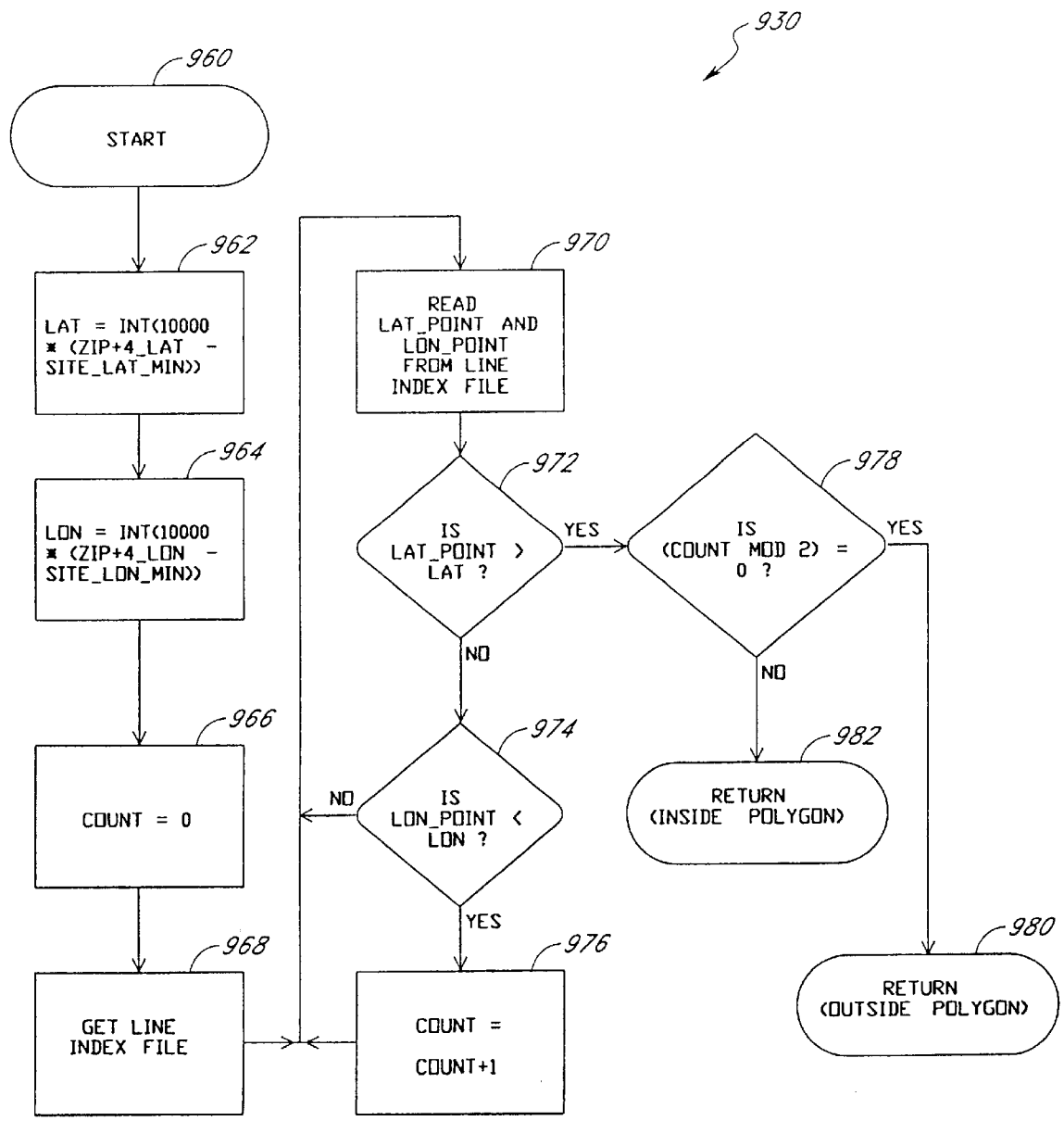
FIG. 21 is a flow diagram of the point in polygon test function indicated at 930 in FIG. 20.

Referring to FIG. 21, the function 930 defined in FIG. 20 will be described. Function 930 tests to determine if the zip+4 centroid is inside the polygon. Function 930 conceptually draws a line from the zip+4 latitude in a negative longitude direction and then counts the number of times the line crosses the polygon boundary. If the line crosses an odd number of times, the zip+4 centroid is inside the polygon, but an even number of line crossings determines that the zip+4 centroid is outside the polygon.

Beginning at a start state 960, the process 600 moves to state 962 to calculate a value for a variable "lat" by: subtracting site_lat_min (available from function 612, FIG. 14) from zip+4_lat (available from the zip+4 centroid file 100), multiplying the result by 10,000, and then taking the integer (INT) portion of the product. Moving to state 964, the process 600 calculates a value for a variable "lon" by: subtracting site_lon_min (available from function 612) from zip+4_lon (available from the zip+4 centroid file 100), multiplying the result by 10,000, and then taking the integer portion of the product.

Moving to state 966, the process 600 initializes the variable "count" to a value of zero and proceeds to state 968 to access the line index file 619. At state 970, the process 600 reads the polygon line index file 619 (available from function 618, FIG. 19) to retrieve the values for the variables "lat_point" and "lon_point". The process 600 advances in the polygon line index file 619 to the first occurrence of "lat" in the file by use of the file ISAM index. Moving to a decision state 972, the process 600 determines if "lat_point" is greater than "lat". If "lat_point" is greater than "lat", then all records in the polygon line index file 619 have been read. If not, a test is performed at a decision state 974 to determine if "lon_point" is less than "lon". If "lon_point" is less than "lon", a line drawn from the zip+4 centroid toward negative infinity is defined to cross a polygon line. At state 976, "count" is incremented by one to indicate the line crossing exists, and the process 600 loops back to state 970. However, if decision state 974 is false, the process 600 loops back to state 970 to perform the next read of the line index file 619.

If process 600 determines at decision state 972 that "lat_point" is greater than "lat", process 600 moves to a decision state 978 to check if "count MODULUS 2" is equal to zero. If so, an even number of line crossings exist, the "outside" flag is then set, and the function 930 returns at state 980 to FIG. 20. If decision state 978 is false, i.e., "count MODULUS 2" is not equal to zero, an odd number of line crossings exist which denotes that the zip+4 centroid is inside the polygon. The process 600 sets the "inside" flag, and the function 930 returns at state 982 to FIG. 20.

VII. Summary

The present invention utilizes ANI information as an index to a table containing partitions of a country into small geographic areas, such as postal service zip+4 codes. These partitions are further utilized to access one of a plurality of service locations that may be anywhere within the country.

The automated telephone routing system of the present invention provides the ability to reduce costs by routing a very high percentage of calls made to a single national telephone number without any human intervention and the marketing advantage for a client of a single, easy to remember, toll free or nominal fee national telephone number. The system also provides geographically precise results due to the use of all ten digits of the calling and called telephone numbers which correspond with the zip+4 codes for the locations of these numbers. The automated routing system provides the ability for a business to choose among different types of destination service area definitions. Preferably, these service area definitions include the closest service location to the caller within a predefined distance; all service locations within a specific radius of the caller; and a service location whose service area is defined as an irregular shaped polygon that may or may not overlap with any other polygons.

The present invention provides a method of routing all published and unpublished telephone numbers, including unlisted numbers, secondary unpublished business lines, and public pay phones without any violation of federal, state and local laws. The present invention also provides a method for legally conforming to contracted franchise territory definitions executed between franchisers and franchisees by routing customer's calls precisely to the correct legal franchisee area. Additionally, the present invention provides a method for precisely routing telephone calls based on any geographic definition including postal geography, census geography, telecommunications geography, special grid coordinate geography, and all custom geography.

The present invention provides a method for automatically routing and processing customer calls that do not meet the pre-set client protocols. This "exceptions handling" process routes to a "live" operator who executes preset exceptions handling protocols. The present invention also provides for a method of integrating unrelated geographic information systems and database technology, telecommunications systems and database technology, postal systems and database technology, and computer technology into a common applications driven architecture. Additionally, the present invention provides a method for dynamically and instantaneously updating and integrating Client and Master Tables with no time lags. Furthermore, the present invention provides a method for automating the processing of information that is input by a customer using a customer interface that automatically routes telephone calls to customer requested destinations.

While the above detailed description has shown, described, and pointed out the fundamental novel features of the invention as applied to various embodiments, it will be understood that various omissions and substitutions and changes in the form and details of the device illustrated may be made by those skilled in the art, without departing from the spirit of the invention.

What is claimed is:

1. A method of determining information about a second location relatively near a first location, the second location being selected from a plurality of possible second locations based on a location identifier received during communication over a network and based on information derived from the United States Census Bureau Topological Integrated Geographic Encoding and Referencing (TIGER) files, the method comprising:
   receiving a location identifier associated with a first location over a network during communication with a first party;
   linking the received location identifier to a relatively spatially near second location selected from a plurality of possible second locations based on information obtained at least in part from the TIGER files, the second location having a spatial location definition of any size or shape;
   retrieving information associated with said second location in accordance with said linking; and
   providing the retrieved information to the network.

2. The method of claim 1, wherein the location identifier corresponds to a telephone number.

3. The method of claim 1, wherein the location identifier corresponds to a street address.

4. The method of claim 1, wherein the location identifier corresponds to a coordinate address.

5. The method of claim 1, wherein the location identifier is provided by the network.

6. The method of claim 1, wherein the location identifier is provided by the first party.

7. The method of claim 1, wherein the location identifier corresponds to an address of the first party.

8. The method of claim 1, wherein the location identifier corresponds to an address of a second party.

9. The method of claim 1, wherein the spatial location definition includes a coordinate.

10. The method of claim 1, wherein the spatial location definition includes a polygon.

11. The method of claim 1, wherein the spatial location definition includes a radius.

12. The method of claim 1, wherein the spatial location definition encompasses all possible address locations.

13. The method of claim 1, wherein the spatial location definition is client defined.

14. The method of claim 1, wherein linking the received location identifier to a relatively spatially near second location comprises linking to a location with a polygonal spatial location definition that contains the location associated with the location identifier.

15. The method of claim 1, wherein linking the received location identifier to a relatively spatially near second location comprises linking to a location nearest to the location associated with the location identifier.

16. The method of claim 1, wherein linking the received location identifier to a relatively spatially near second location comprises linking to a location with a radius-defined spatial location definition that contains the location associated with the location identifier.

17. The method of claim 1, wherein linking the received location identifier to a relatively spatially near second location comprises linking to a list of relatively spatially near second locations.

18. The method of claim 1, wherein linking based on information obtained at least in part from the TIGER files comprises using data from a file derived from the TIGER files.

19. The method of claim 1, wherein linking based on information obtained at least in part from the TIGER files comprises using information from the TIGER files to obtain information associated with one of: the location identifier associated with the first location and the relatively spatially near second location.

20. The method of claim 1, wherein linking based on information obtained at least in part from the TIGER files comprises using information from the TIGER files to obtain information associated with both the location identifier associated with the first location and the relatively spatially near second location.

21. The method of claim 1, wherein retrieving information associated with said second location includes retrieving information based on data obtained from the U.S. Post Office.

22. The method of claim 21, wherein the data obtained from the U.S. Post Office comprises information from an Address Coding Guide.

23. The method of claim 1, wherein the information associated with said second location includes a second location telephone number.

24. The method of claim 23, further comprising connecting a telephone call from the first party to the second location telephone number.

25. A method of locating a nearby location over a communications network based on information derived from the United States Census Bureau Topological Integrated Geographic Encoding and Referencing (TIGER) files, the method comprising:
   receiving a telephone number during a communications session;
   determining a location corresponding to the telephone number;
   linking the location corresponding to the telephone number to a relatively spatially near second location based on information obtained at least in part from the United States Census Bureau TIGER files;
   retrieving information associated with said second location in accordance with said linking; and
   providing the retrieved information over the communications network.

26. The method of claim 25, wherein receiving the telephone number comprises capturing a telephone number provided by the communications network.

27. The method of claim 25, wherein receiving the telephone number comprises capturing a telephone number provided by a party using the communications network.

28. The method of claim 25, wherein linking the location corresponding to the telephone number to a relatively spatially near second location comprises linking the location corresponding to the telephone number to a list of relatively spatially near second locations.

29. The method of claim 25, wherein providing the retrieved information over the communications network comprises providing the telephone number to the communications network to connect a telephone call.

30. A method of enabling a first party to order products or services from a second location relatively nearby a first location, the second location being selected from a plurality of possible second locations based on a first location identifier received during communication over a network, the method comprising:
receiving a location identifier associated with a first location over a network during communication with a first party;
selecting a relatively spatially nearby order-accepting second location from a plurality of possible second locations using the received location identifier and information obtained at least in part from a file containing a majority of all street links in the United States, including latitude and longitude coordinates at each end of each street link in the file;
retrieving information associated with the selected second location; and
providing the retrieved information to the network to enable the first party to place an order with the selected spatially nearby second location.

31. The method of claim 30, wherein the file containing the majority of all the street links in the United States includes street names and address ranges for the links.

32. The method of claim 30, wherein the file containing the majority of all the street links in the United States comprises a United States Census Bureau Topological Integrated Geographic Encoding and Referencing (TIGER) file.

33. The method of claim 30, wherein the order is for a service.

34. The method of claim 30, wherein the order is for a product.

35. The method of claim 30, wherein the order is for food.

36. The method of claim 30, wherein the order is for pizza.

37. The method of claim 30, wherein the order is for delivery.

38. A method of associating servicing locations with serviced locations in a network communication system based on address information corresponding to a particular serviced location, the method comprising:
providing a first database of servicing locations including spatial data and other identifying data for the servicing locations;
providing a second database of serviced locations including spatial data and other identifying data for the serviced locations; and
generating, for transmission in a communication network, a list of at least one servicing location related to a particular serviced location based on the spatial data of the particular serviced location and the spatial data of servicing locations from the first database;
wherein the spatial data from at least one of the first and second databases is derived from a Topological Integrated Geographic Encoding and Referencing (TIGER) file.

39. The method defined in claim 38, wherein the servicing location spatial data and the serviced location spatial data comprise latitude and longitude data.

40. The method defined in claim 38, wherein the servicing location spatial data and serviced location spatial data comprise zip code data.

41. The method defined in claim 40, wherein the zip code data comprises zip+4 data.

42. The method defined in claim 40, wherein the zip code data comprises zip+6 data.

43. The method defined in claim 38, wherein the identifying data for the servicing location comprises a service area.

44. The method defined in claim 43, wherein the service area comprises a polygon.

45. The method defined in claim 43, wherein the service area comprises a center point and a radius.

46. The method defined in claim 38, wherein the identifying data for the serviced location comprises a service area.

47. The method defined in claim 46, wherein the service area comprises a polygon.

48. The method defined in claim 46, wherein the service area comprises a center point and a radius.

49. The method defined in claim 38, further comprising providing a service area definition associated with the particular serviced location, and wherein the generating generates the list of at least one servicing location related to a particular serviced location based on the service area definition.

50. The method defined in claim 49, wherein the service area definition comprises a polygon.

51. The method defined in claim 49, wherein the service area definition comprises a center point.

52. The method defined in claim 49, wherein the service area definition comprises a center point and a radius.

53. The method defined in claim 38, wherein a single database comprises the first and second databases.

54. The method defined in claim 38, wherein the generating is preceded by selecting the particular serviced location corresponding to a telephone number.

55. The method defined in claim 38, wherein the generating is preceded by selecting the particular serviced location corresponding to a street address.

56. The method defined in claim 38, wherein the generating is preceded by selecting the particular serviced location corresponding to a zip code.

57. The method defined in claim 38, wherein the generating comprises generating a list of servicing locations that are nearest to the particular serviced location.

58. The method defined in claim 57, wherein the list of servicing locations that are nearest to the particular serviced location is ordered by distance from serviced location.

59. The method defined in claim 57, wherein the list of servicing locations that are nearest to the particular serviced location includes a distance from serviced location to each servicing location in the list.

60. A method of associating servicing locations with serviced locations in a network communication system based on address information corresponding to a particular serviced location, the method comprising:
providing a first database of servicing locations including spatial data and other identifying data for the servicing locations;
providing a second database of serviced locations including spatial data and other identifying data for the serviced locations; and
generating, for transmission in a communication network, a list of at least one serviced location related to a particular servicing location based on the spatial data of the particular servicing location and the spatial data of serviced locations from the second database;

wherein the spatial data from at least one of the first and second databases is derived from a Topological Integrated Geographic Encoding and Referencing (TIGER) file.

61. The method defined in claim 60, wherein the servicing location spatial data and the serviced location spatial data comprise latitude and longitude data.

62. The method defined in claim 60, wherein the servicing location spatial data and the serviced location spatial data comprises zip code data.

63. The method defined in claim 60, further comprising providing a service area definition associated with the particular servicing location, and wherein the generating generates the list of at least one serviced location related to a particular servicing location based on the service area definition.

64. The method defined in claim 63, wherein the service area definition comprises a polygon.

65. The method defined in claim 60, wherein a single database comprises the first and second databases.

66. The method defined in claim 60, wherein the generating is preceded by selecting the particular servicing location corresponding to a telephone number.

67. The method defined in claim 60, wherein the generating is preceded by selecting the particular servicing location corresponding to a street address.

68. The method defined in claim 60, wherein the generating is preceded by selecting the particular servicing location corresponding to a zip code.

69. The method defined in claim 60, wherein the generating comprises generating a list of serviced locations that are nearest to the particular servicing location.

70. The method defined in claim 69, wherein the list of serviced locations that are nearest to the particular servicing location is ordered by distance from servicing location.

71. The method defined in claim 69, wherein the list of serviced locations that are nearest to the particular servicing location includes a distance from the servicing location to each serviced location in the list.

* * * * *